(12) United States Patent
Yoshida et al.

(10) Patent No.: US 10,764,502 B2
(45) Date of Patent: Sep. 1, 2020

(54) IMAGING APPARATUS

(71) Applicant: CANON KABUSHIKI KAISHA, Tokyo (JP)

(72) Inventors: Koji Yoshida, Fujisawa (JP); Jun Kamiya, Kawasaki (JP); Haruhisa Ueda, Tokyo (JP); Takahiro Akimoto, Kawasaki (JP); Kimihiro Masuyama, Kamakura (JP); Takuma Iwagami, Yokohama (JP); Hirokazu Izuoka, Kawasaki (JP); Takuro Miyajima, Kawasaki (JP); Daiyu Ueno, Kawasaki (JP); Ryu Wakui, Tokyo (JP); Eriko Sato, Kawasaki (JP); Takeshi Kikkawa, Yokohama (JP); Shotaro Yanai, Yokohama (JP); Kenji Yokoyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/181,534

(22) Filed: Nov. 6, 2018

(65) Prior Publication Data

US 2019/0141258 A1 May 9, 2019

(30) Foreign Application Priority Data

Nov. 8, 2017 (JP) .................................. 2017-215914
Jun. 29, 2018 (JP) .................................. 2018-125380

(51) Int. Cl.
*H04N 5/232* (2006.01)
*H04N 5/225* (2006.01)

(52) U.S. Cl.
CPC ..... *H04N 5/232933* (2018.08); *H04N 5/2252* (2013.01); *H04N 5/22525* (2018.08);
(Continued)

(58) Field of Classification Search
None
See application file for complete search history.

(56) References Cited

U.S. PATENT DOCUMENTS

2003/0146981 A1 8/2003 Bean et al.
2006/0181639 A1* 8/2006 Ueda .................... H04N 5/2251
348/376

(Continued)

FOREIGN PATENT DOCUMENTS

CN 101626500 A 1/2010
CN 103970272 A 8/2014
(Continued)

OTHER PUBLICATIONS

The above patent documents were cited in a European Search Report dated Mar. 13, 2019, which is enclosed, that issued in the corresponding European Patent Application No. 18204813.2.

(Continued)

*Primary Examiner* — Mark T Monk
(74) *Attorney, Agent, or Firm* — Cowan, Liebowitz & Latman, P.C.

(57) ABSTRACT

An imaging apparatus includes: a finder; a grip portion on a side of a first direction relative to the finder; a touch operation member provided on a rear surface of the imaging apparatus on a side of the first direction relative to the finder, on a side of a second direction relative to the grip portion, the second direction being opposite to the first direction, and on a side of a third direction relative to a center of the imaging apparatus, the third direction being perpendicular to the first direction and being oriented from the center toward the finder; and a control unit configured to control the imaging apparatus so as to execute a first function in (Continued)

accordance with a slide operation in the first direction and to execute a second function in accordance with a slide operation in the second direction.

19 Claims, 32 Drawing Sheets

(52) U.S. Cl.
CPC ......... *H04N 5/232* (2013.01); *H04N 5/23216* (2013.01); *H04N 5/232939* (2018.08)

(56) References Cited

U.S. PATENT DOCUMENTS

| | | |
|---|---|---|
| 2010/0295970 A1 | 11/2010 | Suzuki et al. |
| 2011/0292268 A1* | 12/2011 | Mann ................. B62D 1/046 348/333.01 |
| 2013/0100336 A1 | 4/2013 | Shintani |
| 2015/0103198 A1* | 4/2015 | Kunishige .......... H04N 5/23245 348/220.1 |
| 2015/0195452 A1 | 7/2015 | Saito |
| 2016/0269674 A1 | 9/2016 | Rathore et al. |
| 2016/0309069 A1* | 10/2016 | Steinberg ............. H04N 5/2256 |

FOREIGN PATENT DOCUMENTS

| | | |
|---|---|---|
| JP | 2002-148693 A | 5/2002 |
| JP | 2008-236765 A | 10/2008 |
| JP | 2010-141582 A | 6/2010 |

OTHER PUBLICATIONS

The above foreign patent documents were cited in a Jun. 3, 2020 Chinese Office Action, which is enclosed with an English Translation, that issued in Chinese Patent Application No. 201811317489. X.

* cited by examiner

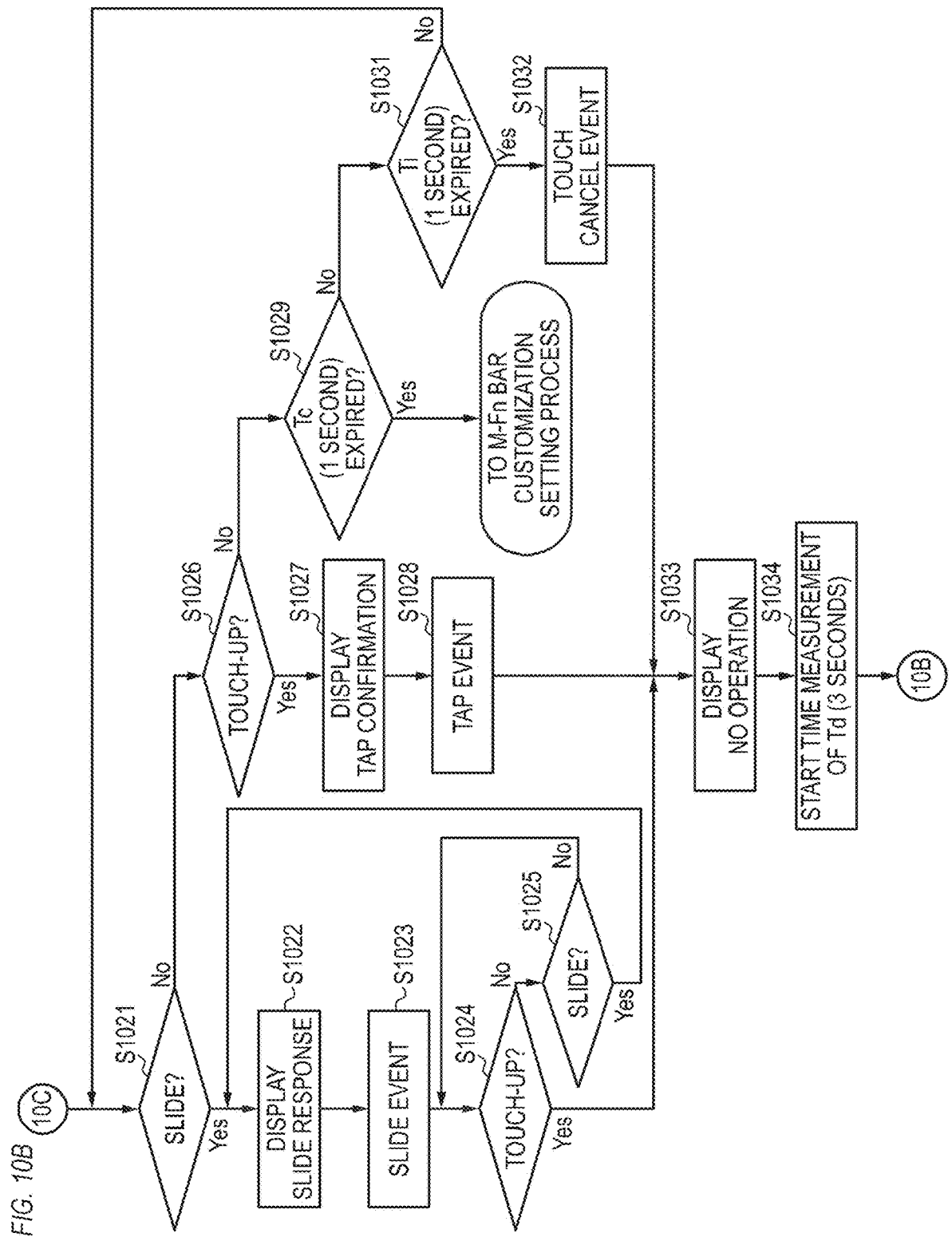

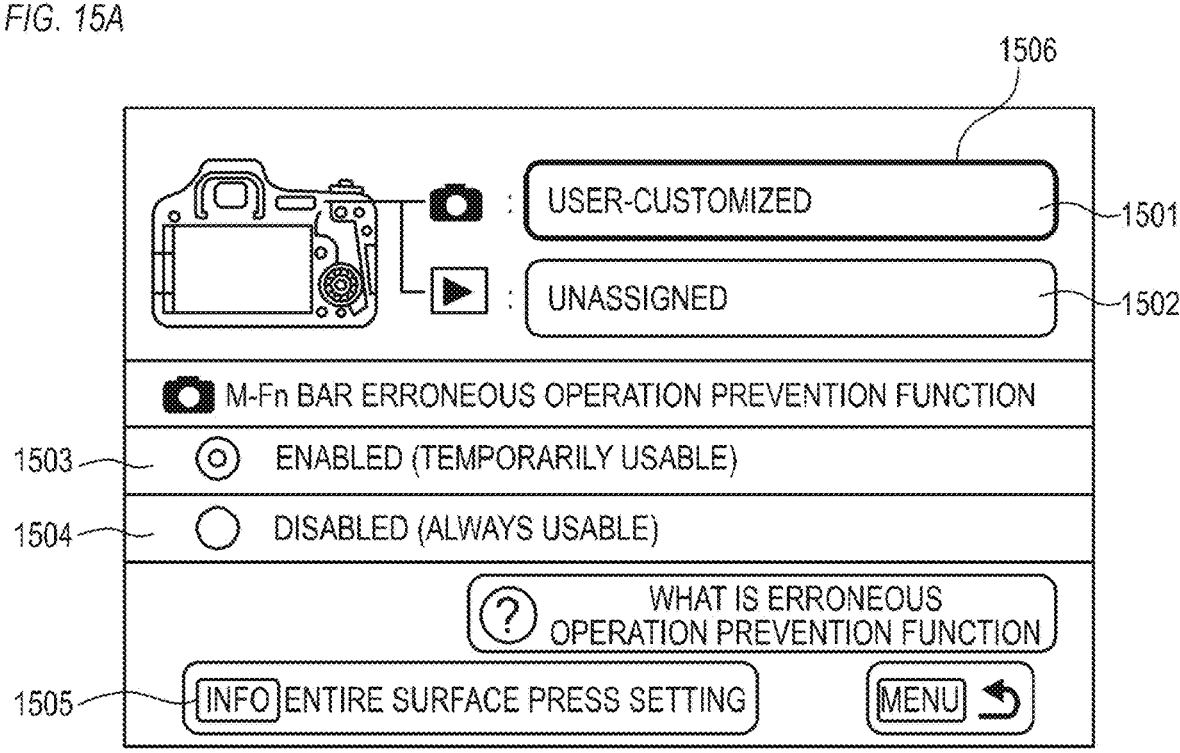

FIG. 16A

| FUNCTION GROUP | SLIDE | LEFT TAP | RIGHT TAP |
|---|---|---|---|
| UNASSIGNED ○ | DISABLED | DISABLED | DISABLED |
| ISO SENSITIVITY | CHANGE ISO SENSITIVITY ○ | SHIFT ONE SETTING TO LEFT ○ | SHIFT ONE SETTING TO RIGHT ○ |
| ISO SENSITIVITY | DISABLED | CHANGE ISO SENSITIVITY TO AUTO | CHANGE ISO SENSITIVITY TO AUTO |
| ISO SENSITIVITY | | CHANGE ISO SENSITIVITY TO ARBITRARY ISO SENSITIVITY | CHANGE ISO SENSITIVITY TO ARBITRARY ISO SENSITIVITY |
| WHITE BALANCE | CHANGE WHITE BALANCE ○ | SHIFT ONE SETTING TO LEFT ○ | SHIFT ONE SETTING TO RIGHT ○ |
| WHITE BALANCE | CHANGE COLOR TEMPERATURE | AUTO WB (PRIORITIZE FEEL↔PRIORITIZE WHITE) | AUTO WB (PRIORITIZE FEEL↔PRIORITIZE WHITE) |
| WHITE BALANCE | DISABLED | CHANGE WB TO ARBITRARY WB | CHANGE WB TO ARBITRARY WB |
| WHITE BALANCE | | TRANSITION TO WB CORRECTION/BKT CORRECTION SETTING | TRANSITION TO WB CORRECTION/BKT CORRECTION SETTING |
| WHITE BALANCE | | DISABLED | DISABLED |

FIG. 16B

| FUNCTION GROUP | | SLIDE | LEFT TAP | RIGHT TAP |
|---|---|---|---|---|
| FOCUS/ INFORMATION DISPLAY | | REDUCE/ENLARGE ○ | SHIFT ONE SETTING TO LEFT ○ | SHIFT ONE SETTING TO RIGHT ○ |
| | | DISABLED | ENLARGE/REDUCE | ENLARGE/REDUCE |
| | | | FOCUS GUIDE DISPLAY ON/OFF | FOCUS GUIDE DISPLAY ON/OFF |
| | | | MF PEAKING DISPLAY ON/OFF | MF PEAKING DISPLAY ON/OFF |
| | | | LEVEL DISPLAY ON/OFF | LEVEL DISPLAY ON/OFF |
| | | | HISTOGRAM DISPLAY ON/OFF | HISTOGRAM DISPLAY ON/OFF |
| | | | DISABLED | DISABLED |
| MOVING IMAGE PHOTOGRAPHY | | CHANGE RECORDING LEVEL ○ | SHIFT ONE SETTING TO LEFT ○ | SHIFT ONE SETTING TO RIGHT ○ |
| | | CHANGE HEADPHONE VOLUME | MF PEAKING DISPLAY ON/OFF | MF PEAKING DISPLAY ON/OFF |
| | | CHANGE APERTURE VALUE | FOCUS GUIDE DISPLAY ON/OFF | FOCUS GUIDE DISPLAY ON/OFF |
| | | DISABLED | MOVING IMAGE SERVO AF PAUSE/RESTART | MOVING IMAGE SERVO AF PAUSE/RESTART |
| | | | LEVEL DISPLAY ON/OFF | LEVEL DISPLAY ON/OFF |
| | | | HISTOGRAM DISPLAY ON/OFF | HISTOGRAM DISPLAY ON/OFF |
| | | | DISABLED | DISABLED |

FIG. 16C

| FUNCTION GROUP | SLIDE | LEFT TAP | RIGHT TAP |
|---|---|---|---|
| FLEXIBLE AE | CHANGE SELECTED ITEM ○ | CHANGE ONE SELECTED ITEM TO LEFT ○ | CHANGE ONE SELECTED ITEM TO RIGHT ○ |
|  | DISABLED | RESET VALUES OF ALL SETTING ITEMS | RESET VALUES OF ALL SETTING ITEMS |
|  |  | RESET VALUE OF SELECTED ITEM | RESET VALUE OF SELECTED ITEM |
|  |  | CHANGE SELECTED ITEM TO ARBITRARY SETTING ITEM | CHANGE SELECTED ITEM TO ARBITRARY SETTING ITEM |
|  |  | DISABLED | DISABLED |
| AF | CHANGE AF SYSTEM ○ | SHIFT ONE SETTING TO LEFT ○ | SHIFT ONE SETTING TO RIGHT ○ |
|  |  | PUPIL AF ON/OFF | PUPIL AF ON/OFF |
|  |  | AF FRAME SIZE STANDARD/SMALL | AF FRAME SIZE STANDARD/SMALL |
|  |  | TOUCH & DRAG AF ON/OFF | TOUCH & DRAG AF ON/OFF |
|  |  | FOCUS GUIDE DISPLAY ON/OFF | FOCUS GUIDE DISPLAY ON/OFF |
|  |  | DISABLED | DISABLED |
| USER-CUSTOMIZED | (ALL OF FUNCTIONS SELECTABLE) | (ALL OF FUNCTIONS SELECTABLE) | (ALL OF FUNCTIONS SELECTABLE) |

FIG. 17

| FUNCTION GROUP | SLIDE | LEFT TAP | RIGHT TAP |
|---|---|---|---|
| UNASSIGNED ○ | DISABLED | DISABLED | DISABLED |
| FUNCTION SHORTCUT | IMAGE FEEDING ○ | RATING ○ | RATING |
| | DISABLED | PROTECT | PROTECT ○ |
| | | DISABLED | DISABLED |
| IMAGE FEEDING | IMAGE FEEDING ○ | REWIND IMAGE BY ONE FRAME ○ | REWIND IMAGE BY ONE FRAME |
| | DISABLED | FEED IMAGE BY ONE FRAME | FEED IMAGE BY ONE FRAME ○ |
| | | DISABLED | DISABLED |

IMAGING APPARATUS

BACKGROUND OF THE INVENTION

Field of the Invention

The present invention relates to an imaging apparatus mounted with a touch operation member.

Description of the Related Art

Conventionally, there are imaging apparatuses mounted with a touch operation member. According to a technique disclosed in Japanese Patent Application Laid-open No. 2008-236765, two touch operation members are arranged in an L-shape parallel to two sides of a rear monitor.

SUMMARY OF THE INVENTION

However, with the conventional art disclosed in Japanese Patent Application Laid-open No. 2008-236765, since a position of the touch operation member is not suitable to be operated while looking through a finder, it is difficult to operate the touch operation member while looking through a finder.

In consideration thereof, the present invention provides an imaging apparatus which enables a touch operation member to be readily operated while looking through a finder.

An imaging apparatus according to the present invention, includes:

a finder;

a grip portion on a side of a first direction relative to the finder;

a touch operation member provided on a rear surface of the imaging apparatus on a side of the first direction relative to the finder, on a side of a second direction relative to the grip portion, the second direction being opposite to the first direction, and on a side of a third direction relative to a center of the imaging apparatus, the third direction being perpendicular to the first direction and being oriented from the center toward the finder; and a memory and at least one processor and/or at least one circuit to perform the operations of the following units:

a control unit configured to control the imaging apparatus so as to execute a first function in accordance with a slide operation in the first direction with respect to the touch operation member and to execute a second function in accordance with a slide operation in the second direction with respect to the touch operation member.

According to the present invention, a touch operation member can be readily operated while looking through a finder.

Further features of the present invention will become apparent from the following description of exemplary embodiments with reference to the attached drawings.

BRIEF DESCRIPTION OF THE DRAWINGS

FIGS. 10A and 10B are flow charts of a process when always usable;

FIG. 15A represents a display example of an M-Fn bar customization setting screen.

FIGS. 16A to 16C represent lists of functions assignable as functions in a photography mode;

FIG. 17 represents a list of functions assignable as functions in a playback mode.

DESCRIPTION OF THE EMBODIMENTS

External View of Digital Camera 100

Figure 1A:
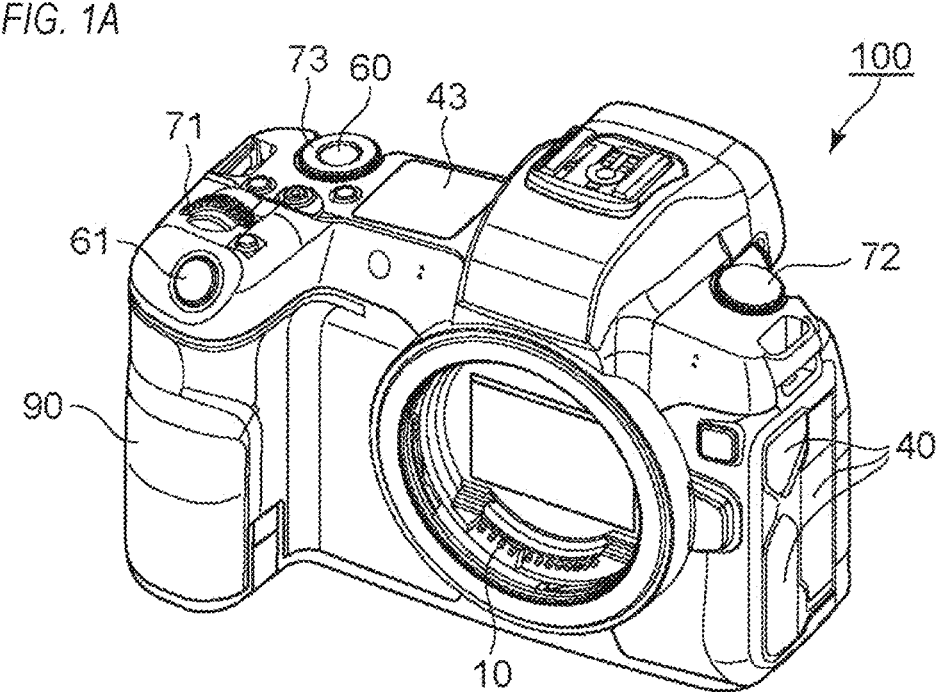
FIGS. 1A and 1B are external views of a digital camera 100.
Figure 1B:
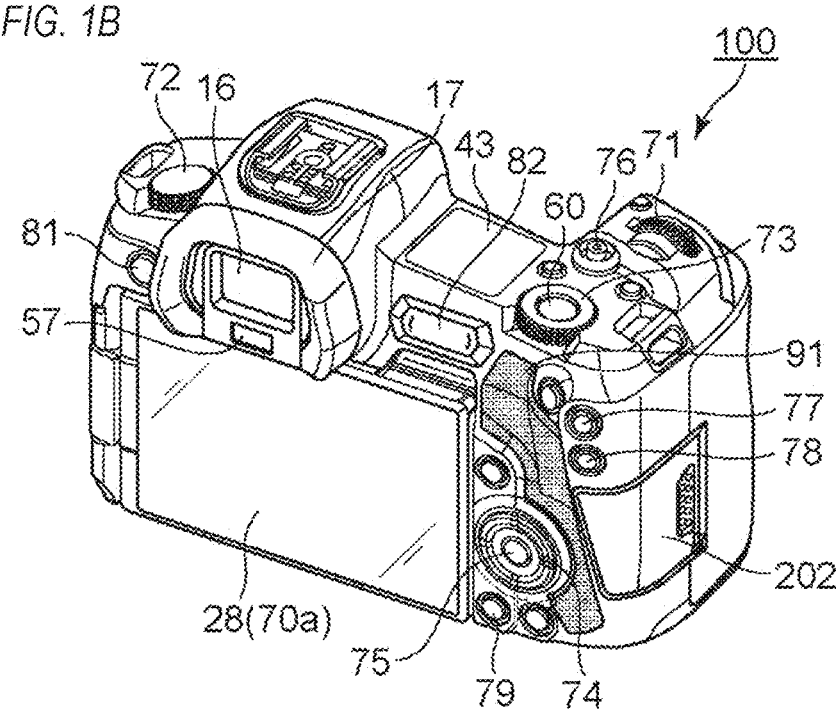

Hereinafter, a preferred embodiment of the present invention will be described with reference to the drawings. FIGS. 1A and 1B show external views of a digital camera 100 as an example of an apparatus to which the present invention can be applied. FIG. 1A is a front perspective view of the digital camera 100, and FIG. 1B is a rear perspective view of the digital camera 100.

A display unit 28 is a display unit provided on a rear surface of the digital camera 100 for displaying images and various types of information. A touch panel 70a is capable of detecting a touch operation performed on a display surface (a touch operation surface) of the display unit 28. A finder outer display unit 43 is a display unit provided on an upper surface of the digital camera 100 for displaying various setting values of the digital camera 100 including a shutter speed and an aperture. A shutter button 61 is an operation member for issuing a photography instruction. A mode changeover switch 60 is an operation member for switching between various modes. A terminal cover 40 is a cover for protecting a connector (not shown) to which is connected a connection cable or the like for connecting the digital camera 100 to an external device.

A main electronic dial 71 is a rotating operation member and, by turning the main electronic dial 71, setting values such as a shutter speed and an aperture can be changed. A power switch 72 is an operation member for switching power of the digital camera 100 on and off. A sub electronic dial 73 is a rotating operation member and, by turning the sub electronic dial 73, operations such as moving a selection frame (cursor) and image feeding can be performed. A four-way key 74 is configured such that upper, lower, left, and right portions thereof are respectively depressible, and enables a process corresponding to a depressed portion of the four-way key 74 to be performed. A SET button 75 is a push button mainly used to determine a selected item.

A moving image button 76 is used to issue instructions to start or stop moving image photography (recording). An AE lock button 77 is a push button, and by depressing the AE lock button 77 in a photography standby state, an exposure state can be fixed. An enlargement button 78 is an operation button for switching an enlargement mode on and off in a live view display (LV display) in a photography mode. By operating the main electronic dial 71 after switching on the enlargement mode, a live view image (LV image) be enlarged or reduced. In a playback mode, the enlargement button 78 functions as an operation button for enlarging a playback image or increasing an enlargement rate of the playback image. A playback button 79 is an operation button for switching between the photography mode and the playback mode. By depressing the playback button 79 in the photography mode, a transition can be made to the playback mode and a latest image among images recorded in a recording medium 200 (to be described later) can be displayed on the display unit 28. A menu button 81 is a push button used for performing an instruction operation to display a menu screen and, when the menu button 81 is pushed, a menu screen enabling various settings to be performed is displayed on the display unit 28. A user can intuitively perform various settings using the menu screen displayed on the display unit 28, the four-way key 74, and the SET button 75.

A touch bar 82 (multi-function bar: M-Fn bar) is a linear touch operation member (line touch sensor) capable of accepting a touch operation. The touch bar 82 is arranged at a position where a touch operation can be performed on the touch bar 82 (where the touch bar 82 is touchable) by the thumb of a right hand gripping a grip portion 90 in a normal grip (a grip recommended by a manufacturer). The touch bar 82 is an accepting unit capable of accepting a tap operation (an operation involving touching and then releasing the touch without movement within a prescribed period of time), leftward and rightward slide operations (operations involving touching and then moving a touch position while maintaining the touch), and the like with respect to the touch bar 82. The touch bar 82 is an operation member that differs from the touch panel 70*a* and is not equipped with a display function.

A communication terminal 10 is a communication terminal used by the digital camera 100 to communicate with a lens unit 150 (to be described later; attachable and detachable). An eyepiece 16 is an eyepiece of an eyepiece finder 17 (a look-in finder), and the user can visually confirm, via the eyepiece 16, an image displayed on an internal EVF 29 (to be described later). An eye proximity detecting unit 57 is an eye proximity detection sensor that detects whether or not the eye of the user (photographer) is approaching the eyepiece 16. A lid 202 is a lid of a slot in which the recording medium 200 (to be described later) is stored. The grip portion 90 is a holding portion configured in a shape readily gripped by the right hand of the user when holding the digital camera 100. The shutter button 61 and the main electronic dial 71 are arranged at positions where the shutter button 61 and the main electronic dial 71 can be operated by the index finger of the right hand in a state where the digital camera 100 is held by gripping the grip portion 90 with the little finger, the ring finger, and the middle finger of the right hand. In addition, the sub electronic dial 73 and the touch bar 82 are arranged at positions where the sub electronic dial 73 and the touch bar 82 can be operated by the right thumb in a same state. A thumb rest portion 91 (a thumb standby position) is a grip member provided at a location where the thumb of the right hand gripping the grip portion 90 can be readily placed on a rear side of the digital camera 100 in a state where none of the operation members are being operated. The thumb rest portion 91 is constituted by a rubber member or the like in order to enhance holding force (grip feeling).

Configuration Block Diagram of Digital Camera 100

Figure 2:
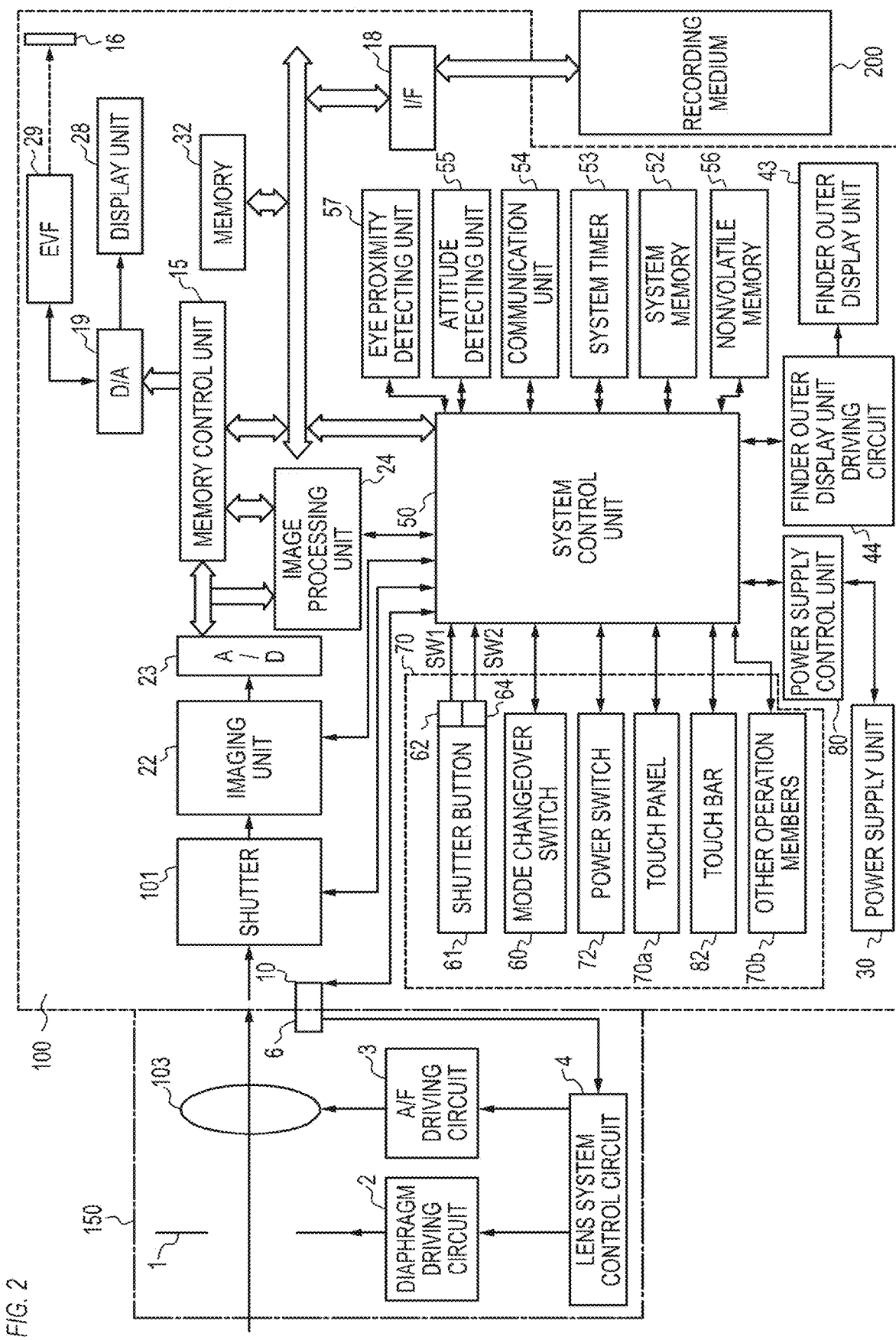
FIG. 2 is a block diagram of the digital camera 100.

FIG. 2 is a block diagram showing a configuration example of a digital camera 100. The lens unit 150 is a lens unit mounted with a replaceable photographing lens. While the lens 103 is usually configured by a plurality of lenses, in FIG. 2, the lens 103 is shown simplified with only one lens. A communication terminal 6 is a communication terminal used by the lens unit 150 to communicate with the digital camera 100, and a communication terminal 10 is a communication terminal used by the digital camera 100 to communicate with the lens unit 150. The lens unit 150 communicates with a system control unit 50 via the communication terminals 6 and 10. In addition, the lens unit 150 controls a diaphragm 1 via a diaphragm driving circuit 2 using an internal lens system control circuit 4. Furthermore, the lens unit 150 performs focusing by displacing a position of the lens 103 via an AF driving circuit 3 using the lens system control circuit 4.

A shutter 101 is a focal plane shutter capable of freely controlling an exposure time of an imaging unit 22 under the control of the system control unit 50.

The imaging unit 22 is an imaging element constituted by a CCD, a CMOS element, or the like which converts an optical image into an electrical signal. The imaging unit 22 may have an imaging surface phase difference sensor that outputs information on a defocusing amount to the system control unit 50. An A/D converter 23 converts an analog signal output from the imaging unit 22 into a digital signal.

An image processing unit 24 performs prescribed processes (pixel interpolation, a resizing process such as reduction, a color conversion process, and the like) on data from the A/D converter 23 or data from a memory control unit 15. In addition, the image processing unit 24 performs a prescribed computing process using image data of a captured image, and the system control unit 50 performs exposure control and ranging control based on a computation result obtained by the image processing unit 24. Accordingly, processes such as an AF (automatic focusing) process, an AE (automatic exposure) process, and an EF (preliminary light emission before flash) process in a TTL (through-the-lens) system are performed. The image processing unit 24 further performs a prescribed computing process using image data of a captured image and performs an AWB (automatic white balance) process in the TTL system based on an obtained computation result.

Output data from the A/D converter 23 is written into a memory 32 via the image processing unit 24 and the memory control unit 15. Alternatively, output data from the A/D converter 23 is written into the memory 32 via the memory control unit 15 without involving the image processing unit 24. The memory 32 stores image data obtained by the imaging unit 22 and converted into digital data by the A/D converter 23 and image data to be displayed on the display unit 28 and the EVF 29. The memory 32 has sufficient storage capacity for storing a prescribed number of still images, a prescribed time's worth of moving images, and audio.

In addition, the memory 32 also doubles as a memory (video memory) for image display. A D/A converter 19 converts data for image display stored in the memory 32 into an analog signal and supplies the analog signal to the display unit 28 and the EVF 29. In this manner, image data for display having been written into the memory 32 is displayed by the display unit 28 and the EVF 29 via the D/A converter 19. The display unit 28 and the EVF 29 each perform display in accordance with the analog signal from the D/A converter 19 on a display such as an LCD, an organic EL, or the like. A live view display (LV) can be performed by converting digital signals subjected to A/D conversion by the AD converter 23 and accumulated in the memory 32 into analog signals with the D/A converter 19, and sequentially transmitting and displaying the analog signals to the display unit 28 or the EVE 29. Hereinafter, an image displayed in a live view display will be referred to as a live view image (IN image).

Various setting values of the camera including a shutter speed and an aperture are displayed on the finder outer display unit 43 via a finder outer display unit driving circuit 44.

A nonvolatile memory 56 is an electrically erasable and recordable memory and is, for example, an EEPROM. Constants, a program, and the like for operations of the system control unit 50 are recorded in the nonvolatile memory 56. In this case, the program refers to a program for executing the various flow charts described later in the present embodiment.

The system control unit 50 is a control unit which is constituted by at least one processor or circuit and which controls the entire digital camera 100. The system control unit 50 realizes the respective processes of the present embodiment (to be described later) by executing a program recorded in the nonvolatile memory 56 described earlier. A system memory 52 is, for example, a RAM, and the system control unit 50 deploys constants and variables for the operations of the system control unit 50, the program read from the nonvolatile memory 56, and the like on the system memory 52. In addition, the system control unit 50 also performs display control by controlling the memory 32, the D/A converter 19, the display unit 28, and the like.

A system timer 53 is a time measuring unit for measuring time used in various control and time according to an internal clock.

A power supply control unit 80 is constituted by a battery detection circuit, a DC-DC converter, a switching circuit for switching between blocks to be energized, and the like, and detects whether or not a battery is mounted, a type of the battery, a remaining battery level, and the like. In addition, the power supply control unit 80 controls the DC-DC converter based on detection results thereof and an instruction from the system control unit 50 and supplies respective units including the recording medium 200 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

A communication unit 54 transmits and receives video signals and audio signals to and from an external device connected wirelessly or by a wired cable. The communication unit 54 is also capable of connecting to a wireless LAN (Local Area Network) or the Internet. In addition, the communication unit 54 is also capable of communicating with an external device by Bluetooth (registered trademark) or Bluetooth Low Energy. The communication unit 54 is capable of transmitting images (including LV images) captured by the imaging unit 22 and images recorded on the recording medium 200 and receiving image data and various other types of information from an external device.

An attitude detecting unit 55 detects an attitude of the digital camera 100 relative to a direction of gravitational force. Based on the attitude detected by the attitude detecting unit 55, a determination can be made as to whether an image photographed by the imaging unit 22 is an image photographed while holding the digital camera 100 horizontally or an image photographed while holding the digital camera 100 vertically. The system control unit 50 can add direction information in accordance with the attitude detected by the attitude detecting unit 55 to an image file of the image captured by the imaging unit 22 and record a rotated version of the image. An acceleration sensor, a gyro sensor, or the like can be used as the attitude detecting unit 55. A motion (a pan, a tilt, an uplift, whether stationary or not, and the like) of the digital camera 100 can be detected using the acceleration sensor or the gyro sensor that is the attitude detecting unit 55.

The eye proximity detecting unit 57 is an eye proximity detection sensor which detects (approach detection) an approach (eye approach) and a separation (eye separation) of an eye (object) with respect to the eyepiece 16 of the eyepiece finder 17 (hereinafter, simply referred to as a "finder"). The system control unit 50 switches between setting the display unit 28 and the EVF 29 to display (displayed state) and hide (hidden state) in accordance with the state detected by the eye proximity detecting unit 57. More specifically, at least when a current state is the photography standby state and when a display destination is to be automatically switched, the display unit 28 as the display destination is set to display and the EVF 29 is set to hide when unapproached by the eye. In addition, during an eye approach, the EVF 29 as the display destination is set to display and the display unit 28 is set to hide. As the eye proximity detecting unit 57, for example, an infrared proximity sensor can be used to detect an approach of any object with respect to the eyepiece 16 of the finder 17 incorporating the EVF 29. When an object approaches, infrared light projected from a light projecting portion (not shown) of the eye proximity detecting unit 57 is reflected by the object and received by a light receiving portion (not shown) of the infrared proximity sensor. Based on an amount of received infrared light, how close the object is from the eyepiece 16 (eye proximity distance) can be determined. In this manner, the eye proximity detecting unit 57 performs eye proximity detection in which a distance of approach of an object with respect to the eyepiece 16 is detected. An eye approach is to be detected when an object having approached the eyepiece 16 to within a prescribed distance from an eye-unapproached state (unapproached state) is detected. An eye separation is to be detected when an object of which an approach has been detected recedes to a prescribed distance or more from an eye-approached state (approached state). A threshold for detecting an eye approach and a threshold for detecting an eye separation may differ from each other by, for example, setting a hysteresis. In addition, after detecting an eye approach, an eye-approached state is assumed until an eye separation is detected. After detecting an eye separation, an eye-unapproached state is assumed until an eye approach is detected. It should be noted that an infrared proximity sensor is simply an example and other sensors may be adopted as the eye proximity detecting unit 57 as long as an approach by an eye or an object which can be regarded as an eye approach can be detected.

An operating unit 70 is an input unit for accepting an operation (a user operation) by the user and is used to input various operation instructions to the system control unit 50. As shown in FIG. 2, the operating unit 70 includes the mode changeover switch 60, the shutter button 61, the power switch 72, the touch panel 70a, and the touch bar 82. As other operation members 70b, the operating unit 70 also includes the main electronic dial 71, the sub electronic dial 73, the four-way key 74, the SET button 75, the moving image button 76, the AE lock button 77, the enlargement button 78, the playback button 79, and the menu button 81.

The mode changeover switch 60 switches an operating mode of the system control unit 50 to any of a still image photography anode, a moving image photography mode, a playback mode, and the like. Modes included in the still image photography mode are an automatic photography mode, an automatic scene determination mode, a manual mode, an aperture priority mode (Av mode), a shutter speed priority mode (Tv mode), and a program AE mode (P mode). Other available modes include various scene modes that constitute photography settings for different photography scenes as well as custom modes. Using the mode changeover switch 60, the user can directly switch to any of these modes. Alternatively, after temporarily switching to a list screen of the photography mode using the mode changeover switch 60, another operation member may be used to selectively switch to any of a plurality of displayed modes. In a similar manner, the moving image photography mode may also include a plurality of modes.

The shutter button 61 includes a first shutter switch 62 and a second shutter switch 64. The first shutter switch 62 is turned on during an operation of the shutter button 61 by a so-called half-press (a photography preparation instruction) and generates a first shutter switch signal SW1. In accordance with the first shutter switch signal SW1, the system control unit 50 starts a photography preparation operation of an AF (automatic focusing) process, an AE (automatic exposure) process, an AWB (automatic white balance) process, an EF (preliminary light emission before flash) process, and the like. The second shutter switch 64 is turned on upon completion of an operation of the shutter button 61 by a so-called full-press (a photography instruction) and generates a second shutter switch signal SW2. In accordance with the second shutter switch signal SW2, the system control unit 50 starts a series of operations of a photography process from reading a signal from the imaging unit 22 to writing a captured image into the recording medium 200 as an image file.

The touch panel 70a and the display unit 28 can be integrally configured. For example, the touch panel 70a is configured such that transmittance of light does not obstruct display by the display unit 28 and is mounted to an upper layer of a display surface of the display unit 28. Subsequently, an input coordinate on the touch panel 70a and a display coordinate on the display surface of the display unit 28 are associated with each other. Accordingly, a GUI (graphical user interface) can be provided which enables the user to feel as if a screen displayed on the display unit 28 can be directly manipulated. The system control unit 50 is capable of detecting the following operations to the touch panel 70a or the following states of the touch panel 70a.

A new touch on the touch panel 70a by a finger or a stylus previously not in touch with the touch panel 70a or, in other words, a start of a touch (hereinafter, referred to as a touch-down)

A state where the touch parcel 70a is being touched by a finger or a stylus (hereinafter, referred to as a touch-on)

A finger or a stylus moving while in touch with the touch panel 70a (hereinafter, referred to as a touch-move)

A separation (release) from the touch panel 70a by a finger or a stylus previously in touch with the touch panel 70a or, in other words, an end of a touch (hereinafter, referred to as a touch-up)

A state where nothing is touching the touch panel 70a (hereinafter, referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as a position coordinate where a finger or a stylus touches the touch panel 70a through an internal bus. In addition, based on the notified information, the system control unit 50 determines what kind of operation (touch operation) has been performed on the touch panel 70a. With respect to a touch-move, a movement direction of a finger or a stylus moving on the touch panel 70a can also be determined for each of a vertical component and a horizontal component on the touch panel 70a based on a change in the position coordinate. When a touch-move of a prescribed distance or more is detected, it is determined that a slide operation has been performed. An operation involving quickly moving a finger on the touch panel 70a for a certain distance while keeping the finger in touch with the touch panel 70a and then releasing the finger is referred to as a flick. In other words, a flick is an operation in which a finger quickly traces the surface of the touch panel 70a as though flicking at the touch panel 70a. A determination that a flick has been performed can be made (a determination that a flick has occurred following a slide operation can be made) when a detection of a touch-move of a prescribed distance or more at a prescribed speed or more is followed by a detection of a touch-up. Furthermore, a touch operation involving touching (multi-touching) a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). The touch panel 70a may adopt any touch panel system among various systems including a resistive film system, a capacitance system, a surface acoustic wave system, an infrared system, an electromagnetic induction system, an image recognition system, and an optical sensor system. Any of a system in which a touch is detected when contact is made with the touch panel and a system in which a touch is detected when a finger or a stylus approaches the touch panel may be adopted.

In addition, the system control unit 50 is capable of detecting the following operations to the touch bar 82 or the following states of the touch bar 82.

A new touch on the touch bar 82 by a finger previously not in touch with the touch bar 82 or, in other words, a start of a touch (hereinafter, referred to as a touch-down)

A state where the touch bar 82 is being touched by a finger (hereinafter, referred to as a touch-on)

A finger moving while in touch with the touch bar 82 (hereinafter, referred to as a touch-move)

A separation (release) from the touch bar 82 by a finger previously in touch with the touch bar 82 or, in other words, an end of a touch (hereinafter, referred to as a touch-up)

A state where nothing is touching the touch bar 82 (hereinafter, referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as a position coordinate where a finger touches the touch bar 82 through an internal bus and, based on the notified information, the system control unit 50 determines what kind of operation (touch operation) has been performed on the touch bar 82. With respect to a touch-move, a movement in a horizontal direction (left-right direction) on the touch bar 82 is detected. When a movement of a touch position by a prescribed distance or more (a movement of a prescribed amount or more) is detected, it is determined that a slide operation has been performed. A determination that a tap operation has been performed is to be made when an operation is performed in which the touch bar 82 is touched by a finger and the touch is released within a prescribed period of time without performing a slide operation. In the present embodiment, the touch bar 82 is assumed to be a capacitance-system touch sensor. Alternatively, touch sensors of other systems including a resistive film system, a surface acoustic wave system, an infrared system, an electromagnetic induction system, an image recognition system, and an optical sensor system may be used as the touch bar 82.

Arrangement and Operation of Touch Bar 82

Figure 3A:
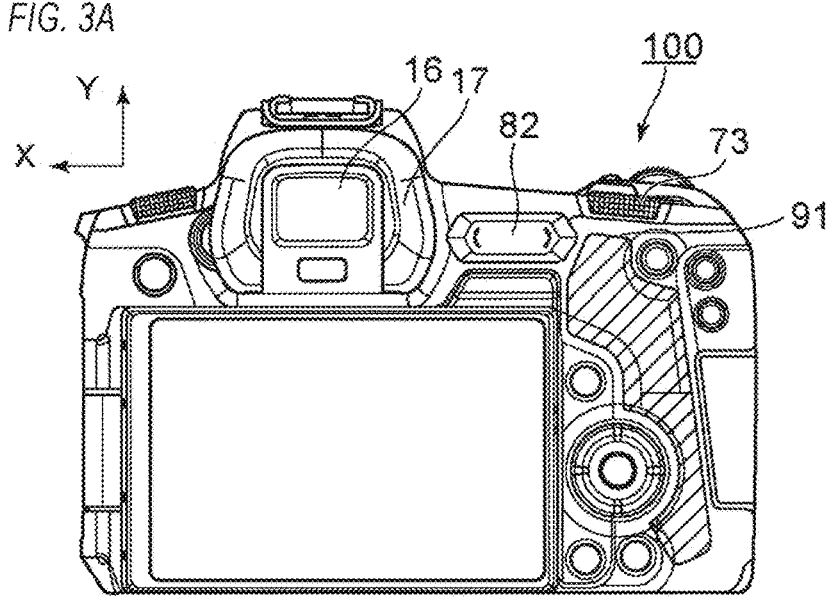
FIGS. 3A to 3D are diagrams showing details of a touch bar 82.

FIG. 3A is a diagram showing an arrangement of the touch bar 82. As shown in FIG. 3A, the touch bar 82 is arranged adjacent to the finder 17 on a rear side of the digital camera 100. In addition, the touch bar 82 is arranged also adjacent to the sub electronic dial 73 and to the thumb rest portion 91 where the thumb is to be positioned when holding the digital camera 100 by gripping the grip portion 90 with the right hand. The thumb rest portion 91 is generally present in an upper part of a region created by projecting the grip portion 90 on a front side of the digital camera 100 to the rear side thereof. Furthermore, as shown in FIG. 3A, a piece of rubber or the like is often pasted in order to indicate the thumb rest portion 91 and to improve grip thereof.

In the present embodiment, the touch bar 82 is provided as described above in order to satisfy conditions 1 to 3 below.

Condition 1: The touch bar 82 is provided on a right side (a side of the first direction) relative to the finder 17 on a rear surface of the digital camera 100.

Condition 2: The touch bar 82 is provided on a left side (a side of the second direction) relative to the grip portion 90 on the rear surface of the digital camera 100.

Condition 3: The touch bar 82 is provided on an upper side (a side of the third direction from a center toward the finder in a direction perpendicular to the first direction) relative to a center of the digital camera 100.

Accordingly, the touch bar 82 can be readily operated while looking through the finder 17. Specifically, by positioning the touch bar 82 adjacent to the thumb rest portion 91, a tap operation, a slide operation to the left or right (in an X direction), and the like of the touch bar 82 can be readily performed with the right thumb while gripping the grip portion 90. The touch bar 82 is an immobile operation member and, as shown in FIG. 3A, a single operation member covered by a single keytop (cover) This is because, when an operation member in a capacitance system has a movable mechanism or a split structure, there is a possibility that a contact made by an operating finger does not stabilize and operability or linearity during a slide operation is inhibited.

In addition, to enable the touch bar 82 to be readily used in combination with another dial member, a slide direction of the touch bar 82 coincides with an operation direction (a rotation direction) when rotating the sub electronic dial 73. In other words, the slide direction of the touch bar 82 is perpendicular to a rotational axis of the sub electronic dial 73. Furthermore, to enable the slide direction (left-right direction) of the touch bar 82 to be intuitively understood and to make the touch bar 82 readily slidable, a width of the touch bar 82 in the left-right direction is set longer than a width of the touch bar 82 in an up-down direction. In addition, in order to prevent the touch bar 82 from being unintentionally touched, the touch bar 82 is provided on an uppermost side among the plurality of operation members provided on the rear surface of the digital camera 100. Furthermore, in order to prevent the touch bar 82 from being unintentionally touched, the touch bar 82 is provided on a leftmost side among the plurality of operation members provided on the rear surface of the digital camera 100 and on a right side of the finder 17 with the exception of the touch panel 70a.

Figure 3B:
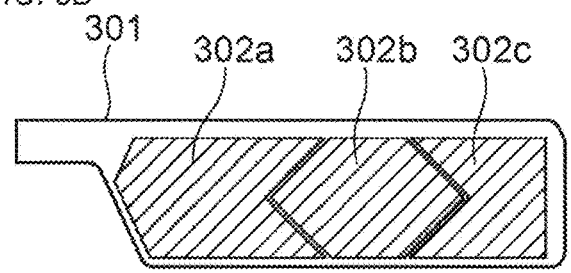

FIG. 3B is an enlarged view showing an inside (a keytop lower layer) of the touch bar 82. As shown in FIG. 3B, three touch sensor electrodes 302a, 302b, and 302c are arranged inside the touch bar 82. Each of the touch sensor electrodes 302a, 302b, and 302c is constituted by copper foil wiring of a printed circuit board 301 or the like and has an electrode profile such as that shown in FIG. 3B. The system control unit 50 is capable of reading voltage (a voltage output value) of each of the touch sensor electrodes 302a, 302b, and 302c. In addition, for each of the touch sensor electrodes 302a, 302b, and 302c, the system control unit 50 can detect a voltage variation amount which is a variation amount of voltage from a base voltage (a reference value adjusted or calibrated in accordance with the environment). The system control unit 50 calculates a weighted average of the voltage variation amount (a variation amount of capacitance) detected for each of the touch sensor electrodes 302a, 302b, and 302c and acquires a signal (a touch coordinate) which indicates a touch position in the X axis direction (a transverse direction) in 256 scales of 0 to 255. 0 represents a leftmost (on the side of the finder 17) position and 255 represents a rightmost (on the side of the thumb rest portion 91) position. Moreover, while three electrodes are depicted in FIG. 3B, the number of electrodes is not limited to three. In addition, the electrode profile is not limited to the profile shown in FIG. 3B. Furthermore, a touch coordinate is not limited to a 256-scale value.

Figure 3C:
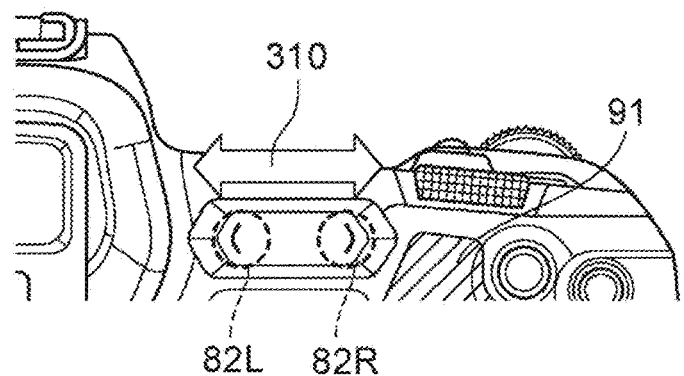

FIG. 3C is an enlarged view showing a basic operation of the touch bar 82. Functions corresponding to an operating position and an operating method can be assigned to the touch bar 82. On a touch detection surface (keytop) of the touch bar 82, functions can be individually assigned to a tap operation (hereinafter, a left tap) toward a left-side portion 82L that is a partial region on the left side and to a tap operation (hereinafter, a right tap) toward a right-side portion 82R that is a partial region on the right side instead of the entire touch detection screen (keytop). In addition, functions can be assigned distinctively from a left tap and a right tap to slide operations to the left and the right (directions indicated an arrow 310) on the keytop of the touch bar 82. In other words, a different function can be registered for each operating location and each operating method (each operation type) of the touch bar 82. A left tap and a right tap can be distinguished from each other by determining, for example, a tap with a touch coordinate of 128 or smaller (left side of center) as a left tap and a tap with a touch coordinate of 129 or larger (right side of center) as a right tap. Alternatively, a tap to center may be determined to be neither a left tap nor a right tap and, for example, a tap with a touch coordinate of 100 or smaller may be determined as a left tap and a tap with a touch coordinate of 155 or larger may be determined as a right tap.

An example of functions assigned to these operations will be described. A function of setting photographic ISO sensitivity of the digital camera 100 to a sensitivity that is lower by ⅓ stages is assigned to a left tap and a function of setting the photographic ISO sensitivity of the digital camera 100 to a sensitivity that is higher by ⅓ stages is assigned to a right tap. In addition, a slide (slide operation) is assigned a function of incrementing or decrementing the photographic ISO sensitivity of the digital camera 100 by ⅓ stages for each stage of the slide (every time a touch coordinate moves a reference distance such as 43).

Furthermore, the functions assigned to these operations can be customized by the user. For example, assigned functions can be changed so that a function of automatically setting the photographic ISO sensitivity of the digital camera 100 is assigned to a left tap and a function of setting photographic ISO sensitivity to a highest photographic ISO sensitivity is assigned to a right tap. The touch bar 82 can be assigned a wide variety of other functions and many functions can be executed using the touch bar 82. Details will be provided later with reference to FIGS. 16A to 16C and 17.

Figure 3D:
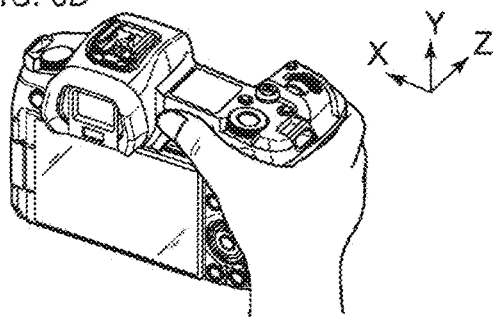

In addition, when the voltage variation amount exceeds a certain threshold for all of the touch sensor electrodes 302a, 302b, and 302c of the touch bar 82, the system control unit 50 determines that a finger is covering an entire surface of the touch bar 82 and determines the touch operation as an entire surface touch. As shown in FIG. 3D, the entire surface touch is an operating method which assumes that the touch bar 82 is to be touched by an entire ball of the thumb of the right hand gripping the grip portion 90. While the functions assigned to a slide, a left tap, and a right hand can be customized by the user, a unique function is assigned to the entire surface touch and the function assigned to the entire surface touch cannot be changed. Accordingly, the function of the entire surface touch and functions of basic operations (slide and tap) can be activated immediately. Moreover, a setting for enabling or disabling the operation of the entire surface touch itself may be adopted.

The entire surface touch has the following features.

The entire surface touch is a special operation requiring that an entire portion of the thumb that is an operating finger up to the first joint thereof be brought into contact in a horizontal direction (X direction).

Since a contact state of the entire surface touch is a special contact state that is unlikely to occur during normal operations, the possibility that the entire surface touch is performed by an unintentional operation is low.

Since a fixed function (to be described later) is always set to the entire surface touch, the user need not memorize a set function all over again.

Since the function of the entire surface touch remains the same regardless of what kind of functions are assigned to a left tap, a right tap, and a slide, the user can perform the entire surface touch with an easy mind.

The system control unit 50 determines a user operation to the touch bar 82 and, in response to the determined user operation, executes an assigned function stored in the nonvolatile memory 56 in advance. For example, the system control unit 50 performs a setting change (such as a change to at least any photographic setting including a setting related to exposure, a setting related to WB, and a setting related to AF) assigned by the user for each touch operation. The touch bar 82 can be operated while looking through the finder 17. Therefore, although the user may operate the touch bar 82 without visually confirming the touch bar 82, since erroneously changing the parameters of photographic settings described above adversely affects photography, erroneous operation prevention is required. In consideration thereof, the following erroneous operation prevention control is performed. Touch operations to the touch bar 82 are switched between an enabled state (unlocked state or unrestricted state) and a disabled state (locked state or a restricted state). In the locked state, left tap, right tap, and slide operations to the touch bar 82 are ignored and, even if left tap, right tap, and slide operations are performed, a function assigned to each operation is not executed. In the locked state, in accordance with a stationary touch (long touch) of 0.5 seconds without performing a slide (a performance of a lock release operation) with respect to the keytop left-side portion 82L of the touch bar 82, the locked state is released and a transition is made to the enabled state. In addition, in the enabled state, in accordance with a long touch of 2 seconds performed (a performance of a lock operation) with respect to the keytop left-side portion 82L or in accordance with a non-operation period of 10 seconds, a transition is made to the locked state. Furthermore, even when the touch bar 82 is in the enabled state, a long touch of a certain time (in the present embodiment, 1 second) or longer is ignored regardless of the touch position, and even if a left tap, a right tap, or a slide is performed by the same touch operation, functions assigned to the operations are not executed (touch cancel). The function assigned to the entire surface touch is executed in response to the entire surface touch regardless of whether the current state is the enabled state or the locked state. Details of these controls will be described later with reference to flow charts.

As described above, in the present embodiment, an operation for switching between the enabled state and the locked state is standardized by a long touch (a touch continuation operation) which is relatively unlikely to occur during normal use of the digital camera 100. Accordingly, unintentional switching between the locked state and the enabled state can be made less likely to occur and switching between the locked state and the enabled state can be performed with high accuracy. Since a long touch in which a touch is continued for a prescribed time or longer is a relatively simple operation, an operating method for switching between the enabled state and the locked state is easily memorized and the likelihood that the user forgets the operating method is low. In addition, since the enabled state and the locked state can be switched by an operation with respect to the touch bar 82, another operation member for switching between the enabled state and the locked state need not be provided and a simple configuration may suffice. Furthermore, in the present embodiment, by setting a touch continuation time for making a transition to the enabled state shorter than a touch continuation time for making a transition to the locked state, the locked state can be swiftly released and an operation (such as photography) after the locked state can be swiftly performed.

A reason for adopting the left-side portion 82L of the keytop as an operation region (specific region) for switching between the enabled state and the locked state will now be described. When the user grips the grip portion 9C with the right hand and operates the touch bar 82 with the right thumb, a region that is relatively distant from the grip portion 90 such as the keytop left-side portion 82L of the touch bar 82 is a region that is difficult to touch unless done intentionally. Therefore, since the presence of an intention to lock or lock release can be determined when a long touch of the keytop left-side portion 82L is performed, the keytop left-side portion 82L is adopted as the operation region for switching between the locked state and the enabled state. In addition, the keytop left-side portion 82L can be described as a region relatively close to the finder 17. A region relatively close to a projected portion that projects from the keytop such as the finder 17 is adopted as the operation region for switching between the locked state and the enabled state. In other words, on the touch detection surface of the touch bar 82, the left-side portion 82L that is a region closer to a side of the projected portion (a left side) than regions (such as the right-side portion 82R) other than the left-side portion 82L is adopted as the operation region for switching between the locked state and the enabled state. Accordingly, even when an abdominal area and the rear surface of the digital camera 100 come into contact with each other when the digital camera 100 is suspended from the neck using a strap, since the projected portion acts as a prop, it is unlikely that the abdominal area comes into contact with the left-side portion 82L of the touch bar 82 which is relatively lower than the projected portion and an erroneous lock release is unlikely to occur. Furthermore, since fingers bump into the projected portion (a projected portion in a direction perpendicular to the touch surface of the touch bar 82), it is most difficult to bring a finger into contact with a region (left side) that is close to the finder 17 among the regions of the touch bar 82 and, consequently, an intention of lock or lock release can be comprehended with high accuracy. Moreover, the finder 17 is at least projected to a height that cannot be cleared by the thumb of a hand holding the grip portion 90 when a leftward slide is performed by the thumb on a surface provided with the keytop of the touch bar 82 on the rear surface side of the digital camera 100. In addition, the finder 17 is a projected portion which is closest to the touch bar 82 and which projects from the operation surface.

Moreover, the sub electronic dial 73 is arranged as a rotating operation member arranged closest to the touch bar 82 on the right side of the touch bar 82. When turning the sub electronic dial 73 by moving the thumb of a hand holding the grip portion 90 from right to left, momentum may cause the thumb to erroneously conic into contact with the keytop right-side portion 82R of the touch bar 82. Even when a slide switch capable of accepting a slide operation in which an operating finger is brought close to the side of the touch bar 82 is arranged close to the touch bar 82 in place of a rotating operation member at a similar position, a similar erroneous contact may occur. In addition, the thumb rest portion 91 (a thumb placement portion) where the thumb is to be placed when no operation member is being operated by the thumb is present on the right side of the touch bar 82 at a position closer to the touch bar 82 than any other operation member (a position more to the left than any other operation member on the right side of the touch bar 82). Furthermore, even a slight movement of the thumb from the thumb rest portion 91 may cause the thumb to erroneously come into contact with the keytop right-side portion 82R. Consequently, when the locked state is released by a touch operation to the keytop right-side portion 82R, there is a risk that the locked state is released by an unintentional touch operation by the user with respect to the touch bar 82 and a setting change not intended by the user may end up being performed. Therefore, a touch operation to the keytop right-side portion 82R is not used as a trigger operation for releasing the locked state. In other words, switching from the locked state to the enabled state is not performed even when there is a long touch of 0.5 seconds with respect to the right-side portion 82R and switching from the enabled state to the locked state is not performed even when there is a long touch of 2 seconds with respect to the right-side portion 82R.

As described above, providing an operation region for switching between the locked state and the enabled state on the left side of the touch surface of the touch bar 82 has a particular significance.

Locked State Process

Figure 4A:
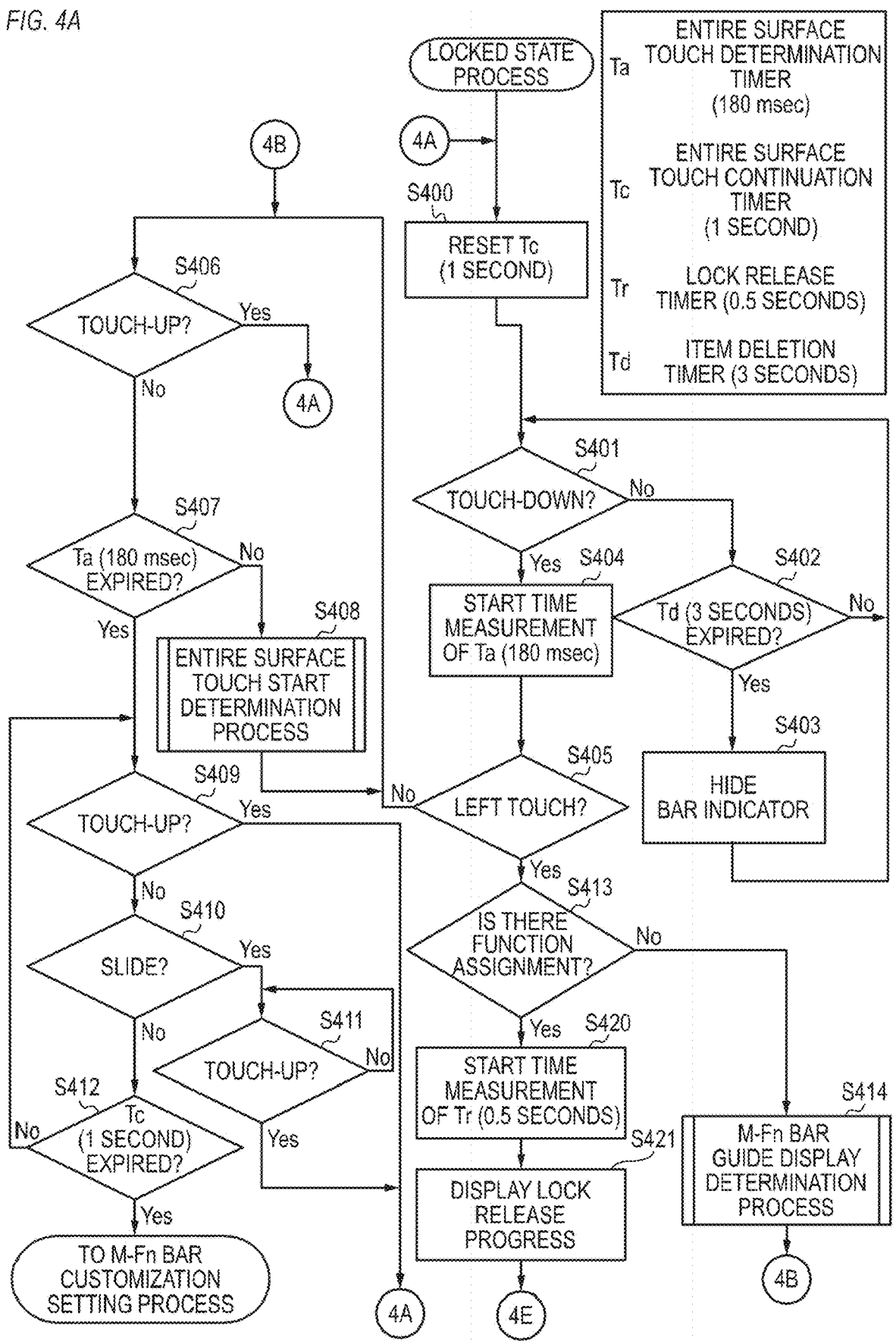
FIGS. 4A and 4B are flow charts of a locked state process.
Figure 4B:
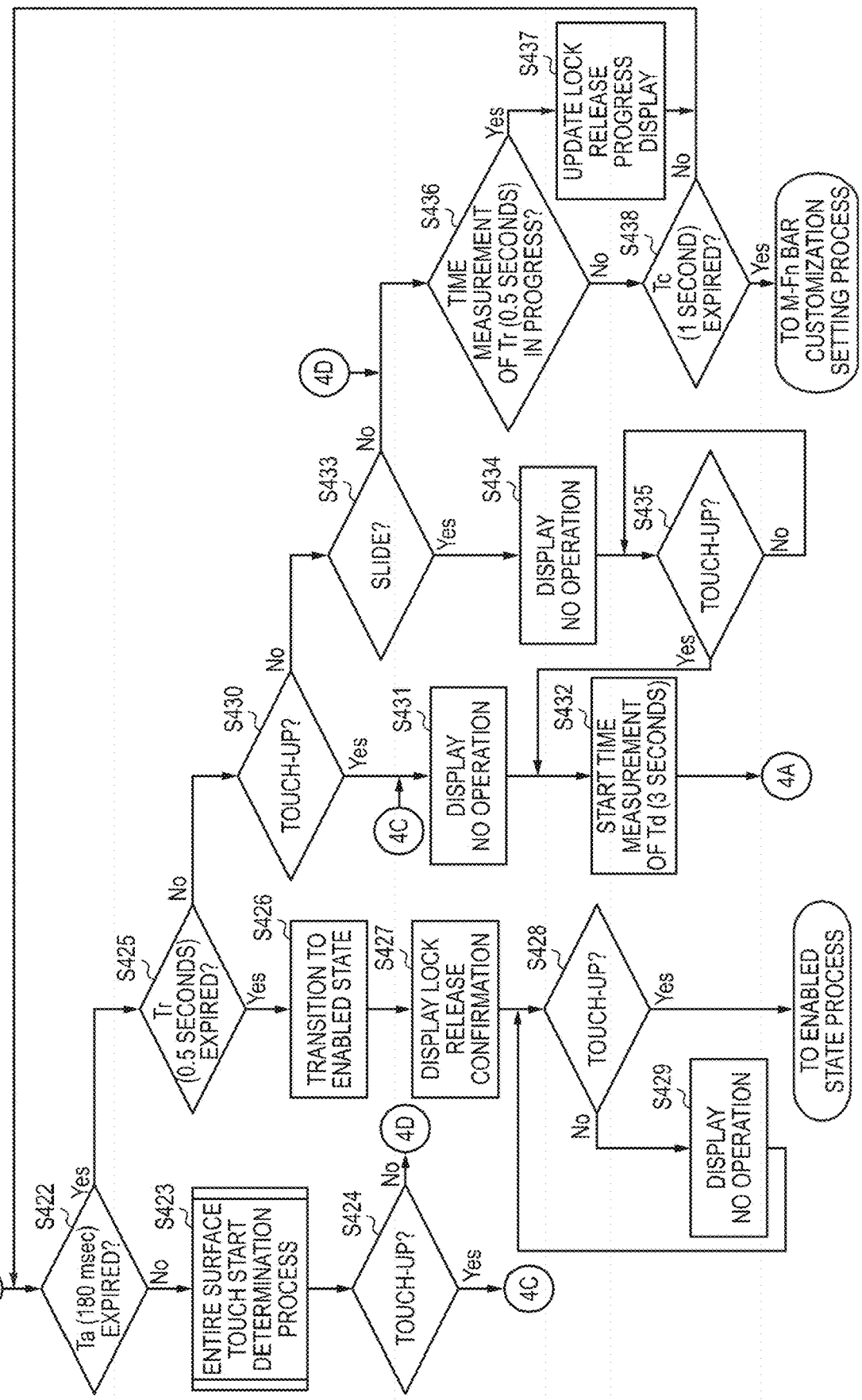
Figure 10A:
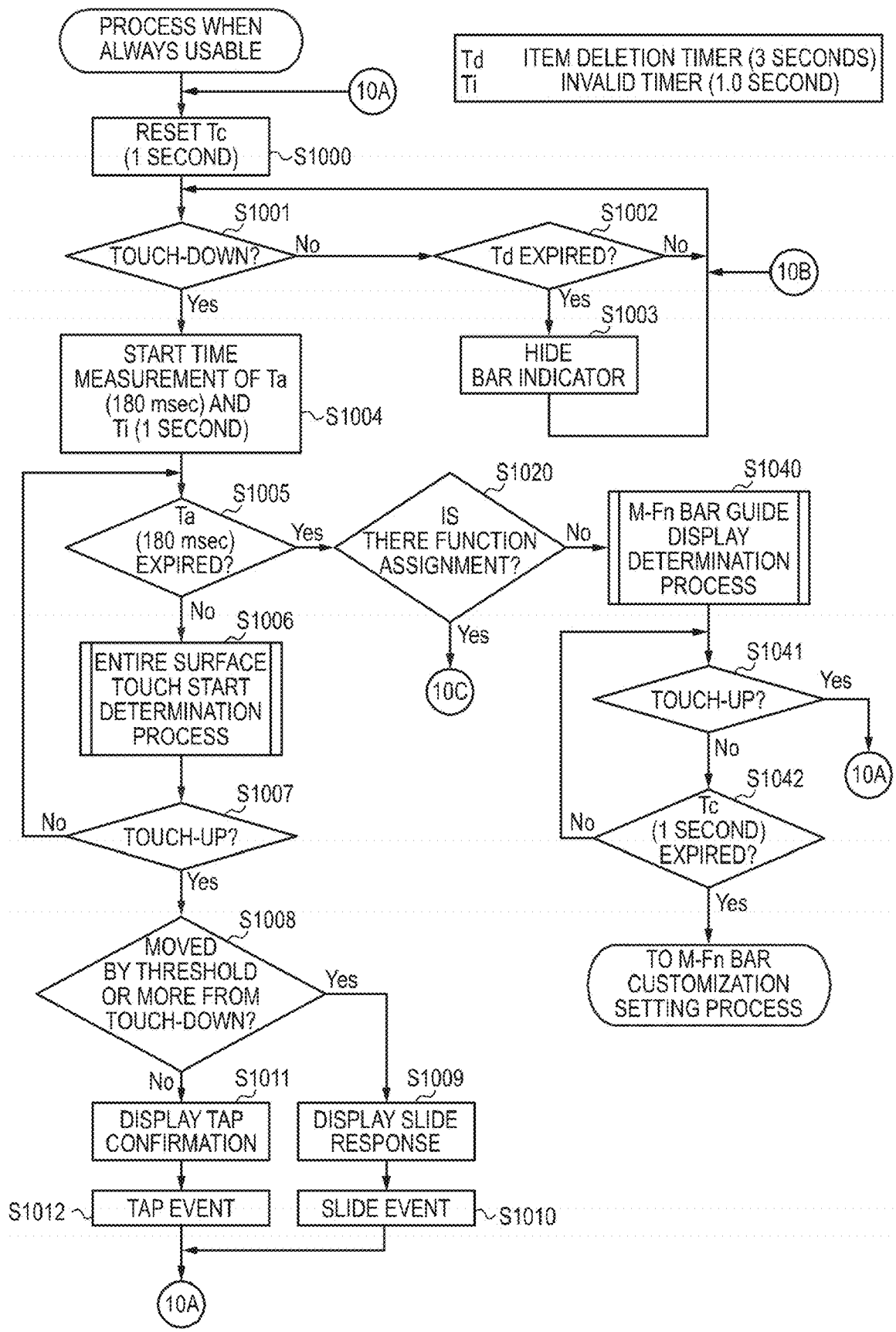

FIGS. 4A and 4B are flow charts showing details of a locked state process performed in the digital camera 100. This process is realized as the system control unit 50 deploys a program recorded in the nonvolatile memory 56 on the system memory 52 and executes the program. The process shown in FIGS. 4A and 4B is started when the M-Fn bar (touch bar 82) erroneous operation prevention function is set to "enabled (temporarily usable)" and the touch bar 82 is in the locked state (the M-Fn bar erroneous operation prevention function will be described later). When M-Fn bar erroneous operation prevention function is set to "enabled (temporarily usable)", an initial state after power is turned on is the locked state. Therefore, activating the digital camera 100 in the photography mode when the M-Fn bar erroneous operation prevention function is set to "enabled (temporarily usable)" starts the process shown in FIGS. 4A and 4B. An initial factory setting is a state where "enabled (temporarily usable)" is set. Moreover, when the M-Fn bar erroneous operation prevention function is set to "disabled (always usable)", the process shown in FIGS. 4A and 4B is not performed and a process shown in FIGS. 10A and 10B is performed instead.

In S400, the system control unit 50 resets an entire surface touch continuation timer Tc for measuring a continuation time of an entire surface touch to the touch bar 82. This is performed in order to stop the entire surface touch continuation timer Tc when the process is returned to S400 from S406, S409, S411, S432, and the like. The entire surface touch continuation timer Tc may be stopped not only when the process is returned to S400 from S406, S409, S411, S432, and the like but also when the entire surface touch to the touch bar 82 ends. In the present embodiment, the entire surface touch continuation timer Tc is set to 1 second.

In S401, the system control unit 50 determines whether or not a touch-down on the touch bar 82 has been performed. When a touch-down has been performed, the system control unit 50 advances to S404, but otherwise the system control unit 50 advances to S402.

In S402, the system control unit 50 determines whether or not an item deletion timer Td (in the present embodiment, 3 seconds) until a bar indicator is to be hidden has expired.

When the item deletion timer Td has expired, the system control unit 50 advances to S403, but otherwise the system control unit 50 advances to S401. FIG. 7D shows a display example of a bar indicator 702. When a lock release operation is started in the locked state, the bar indicator 702 is displayed superimposed on an LV image 700 to indicate various operating states. When a touch operation is stopped while maintaining the locked state (without releasing the lock) and a state of non-operation with respect to the touch bar 82 continues for a prescribed period of time (a period of the item deletion timer Td), the bar indicator 702 is hidden. In other words, the bar indicator 702 is hidden when a prescribed period of time elapses after a touch is last performed on the touch bar 82. Accordingly, the locked state in which tap and slide operations to the touch bar 82 cannot be accepted is indicated.

Figure 7A:
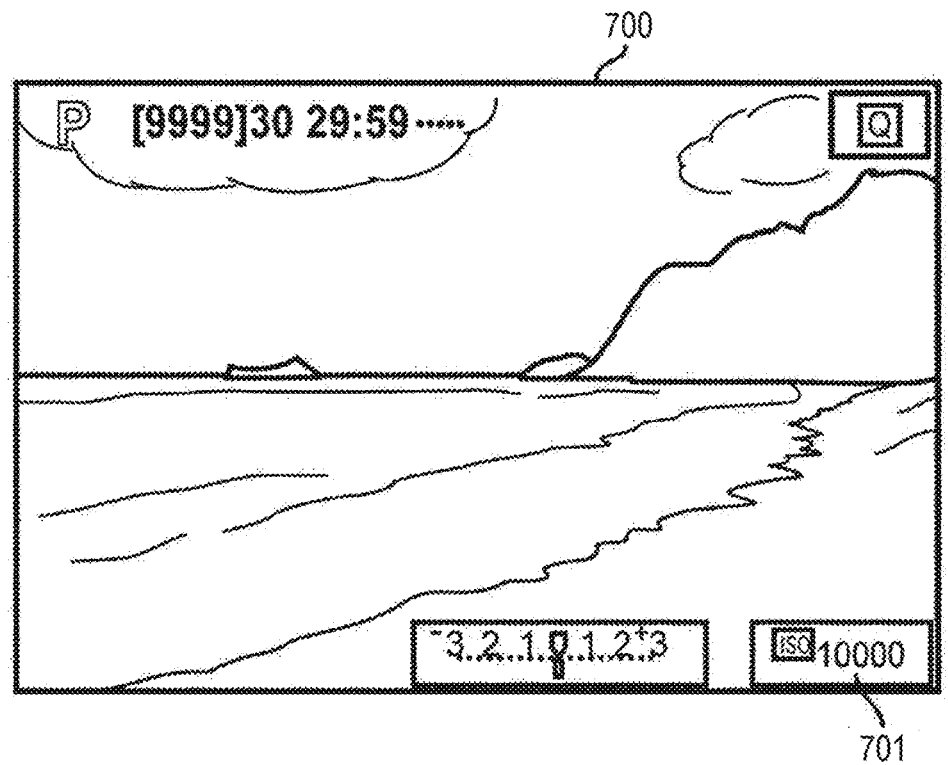
FIGS. 7A to 7F represent display examples of an operation response display with respect to a lock release operation and a lock operation.

In S403, the system control unit 50 hides the bar indicator 702 having been displayed on the photography standby screen and displays the photography standby screen such as that shown in FIG. 7A on the display unit 28 or the EVF 29. On the photography standby screen, a setting display item 701 indicating a photographic setting status is displayed superimposed on the LV image 700. In the example shown in FIG. 7A, the setting display item 701 indicates that a currently set ISO value is 10000. Since the user sets a composition and photographing parameters while looking at the LV image 700, desirably, as less unnecessary items as possible are displayed on the live view image. Therefore, obstruction of visual confirmation of the LV image 700 is prevented by hiding the bar indicator 702 when no operation is performed for a while with respect to the touch bar 82 in the locked state. In addition, hiding the bar indicator 702 enables the user to visually confirm that the touch bar 82 is not in the enabled state.

In S404, the system control unit 50 resets and then starts time measurement of an entire surface touch determination timer Ta. Whether or not an entire surface touch to the touch bar 82 is started is only determined during time measurement (during a count or, in other words, during a period of Ta from start of touch) of the entire surface touch determination timer Ta. In addition, whether or not a slide has been performed on the touch bar 82 is not determined during time measurement of the entire surface touch determination timer Ta. Accordingly, when the user intentionally performs an entire surface touch, an erroneous operation determined as a slide due to shapes of the fingers and peculiarities of contact motions of the user can be prevented. In the present embodiment, the function assigned to the entire surface touch is a display of the M-Fn bar customization setting screen which is a fixed screen. In other words, the entire surface touch is a shortcut operation for displaying the M-Fn bar customization setting screen. Therefore, whether or not an entire surface touch has been performed is only determined after a touch-down to the touch bar 82. Moreover, in the present embodiment, the entire surface touch determination timer Ta is 180 msec (0.18 seconds). When the entire surface touch determination timer Ta is too long, since a process in response to a slide is not performed even if the slide is performed during the period, the user may feel that responsiveness to a slide operation is low. According to an experiment carried out by the applicants of the present invention, there were users who felt that responsiveness with respect to a slide operation is low when the entire surface touch determination timer Ta was set to 240 msec (0.24 seconds). Conversely, when the entire surface touch determination timer Ta is too short, depending on the shape of a finger, the entire surface touch determination timer Ta is more likely to expire before an entire surface of the finger is pressed onto the screen, making it difficult to detect an entire surface touch. Alternatively, the possibility of a slide being erroneously determined during an operation for performing an entire surface touch increases. According to an experiment carried out by the applicants of the present invention, there were examinees who felt that responsiveness with respect to a slide operation is low when the entire surface touch determination timer Ta was set to 360 msec. In addition, there were examinees attempting to perform an operation of an entire surface touch who felt that the entire surface touch cannot be successfully activated when the entire surface touch determination timer Ta was set to 100 msec. By setting the entire surface touch determination timer Ta as long as possible, an operation of an entire surface touch can be successfully activated. Therefore, the entire surface touch determination timer Ta is preferably longer than 100 msec and shorter than 240 msec.

In S405, the system control unit 50 determines whether or not a position of the touch-down in S401 is the keytop left-side portion 82L of the touch bar 82. When the touch-down position is the keytop left-side portion 82L, since there is a possibility that the touch-down of S401 is an operation for switching the touch bar 82 from the locked state to the enabled state, the system control unit 50 advances to S413. When the touch-down position is not the keytop left-side portion 82L, although the touch-down of S401 is not an operation for switching the touch bar 82 from the locked state to the enabled state, since the touch-down may possibly be an entire surface touch, the system control unit 50 advances to S406.

In S406, the system control unit 50 determines whether or not a touch-up from the touch bar 82 has been performed. When a touch-up has been performed, the system control unit 50 advances to S400, but otherwise (when a touch-on to the touch bar 82 continues) the system control unit 50 advances to S407.

In S407, the system control unit 50 determines whether or not the entire surface touch determination timer Ta has expired. When the entire surface touch determination timer Ta has expired (when the period Ta has elapsed from the start of touch), the system control unit 50 advances to S409, but otherwise the system control unit 50 advances to S408.

In S408, the system control unit 50 performs an entire surface touch start determination process (a determination process of whether or not an entire surface touch to the touch bar has been started). Details of the entire surface touch start determination process will be provided later with reference to FIG. 6. A long touch is assumed as an entire surface touch in order to prevent an erroneous determination of an entire surface touch, and when the start of an entire surface touch is determined in S408, time measurement of an entire surface touch continuation timer Tc (in the present embodiment, 1 second) is started. When a touch to the touch bar 82 is continuing, S406 and S407 are repetitively performed until the entire surface touch determination timer Ta expires. Once the entire surface touch determination timer Ta expires, the system control unit 50 advances from S407 to S409.

S409 to S412 represent a process of waiting for the entire surface touch continuation timer Tc to expire. When the entire surface touch to the touch bar 82 does not continue until the entire surface touch continuation timer Tc expires, it is assumed that the user has no intention to continue the entire surface touch and the system control unit 50 advances to S400. When the entire surface touch to the touch bar 82 continues until the entire surface touch continuation timer Tc expires, it is assumed that the user intends to continue the entire surface touch and the system control unit 50 advances to an M-Fn bar customization setting process. In the M-Fn bar customization setting process, an M-Fn bar customization setting screen is displayed on the display unit 28 or the EVF 29. Details of the M-Fn bar customization setting process will be provided later with reference to FIG. 14.

Specifically, in S409, the system control unit 50 determines whether or not a touch-up from the touch bar 82 has been performed. When a touch-up has been performed, the system control unit 50 advances to S400, but otherwise the system control unit 50 advances to S410. In S410, the system control unit 50 determines whether or not a slide to the touch bar 82 has been performed. When a slide has been performed, the system control unit 50 advances to S411, but otherwise the system control unit 50 advances to S412. In S411, the system control unit 50 determines whether or not a touch-up from the touch bar 82 has been performed. When a touch-up has been performed, the system control unit 50 advances to S400, but otherwise the system control unit 50 advances to S410. When it is once determined that a slide has been performed (when a determination of Yes is made in S410), since the touch operation by the touch is no longer an entire surface touch, the system control unit 50 does not advance to S412. In S412, the system control unit 50 determines whether or not the entire surface touch continuation timer Tc has expired. When the entire surface touch continuation timer Tc has expired, the system control unit 50 advances to the M-Fn bar customization setting process, but otherwise the system control unit 50 advances to S409. Even when a determination that an entire surface touch has been started is not made in S408 and time measurement of the entire surface touch determination timer Ta is not started. No is determined in S412 and the system control unit 50 advances to S409.

While the M-Fn bar customization setting process (setting confirmation or setting change) can be started by selecting an item on the menu screen, it is a hassle to select, every time, a menu item representing M-Fn bar customization from a plurality of menu items. In consideration thereof, in the present embodiment, a short cut function for making a transition to the M-Fn bar customization setting process is assigned to an entire surface touch. Accordingly, by simply performing an entire surface touch, the user can confirm the M-Fn bar customization setting screen (confirmation screen of assigned functions) such as that shown in FIG. 15A and confirm any assigned function (a function assigned to a tap or a slide) of the touch bar 82. In addition, the user can promptly customize the touch bar 82 using the M-Fn bar customization setting screen.

Figure 13A:
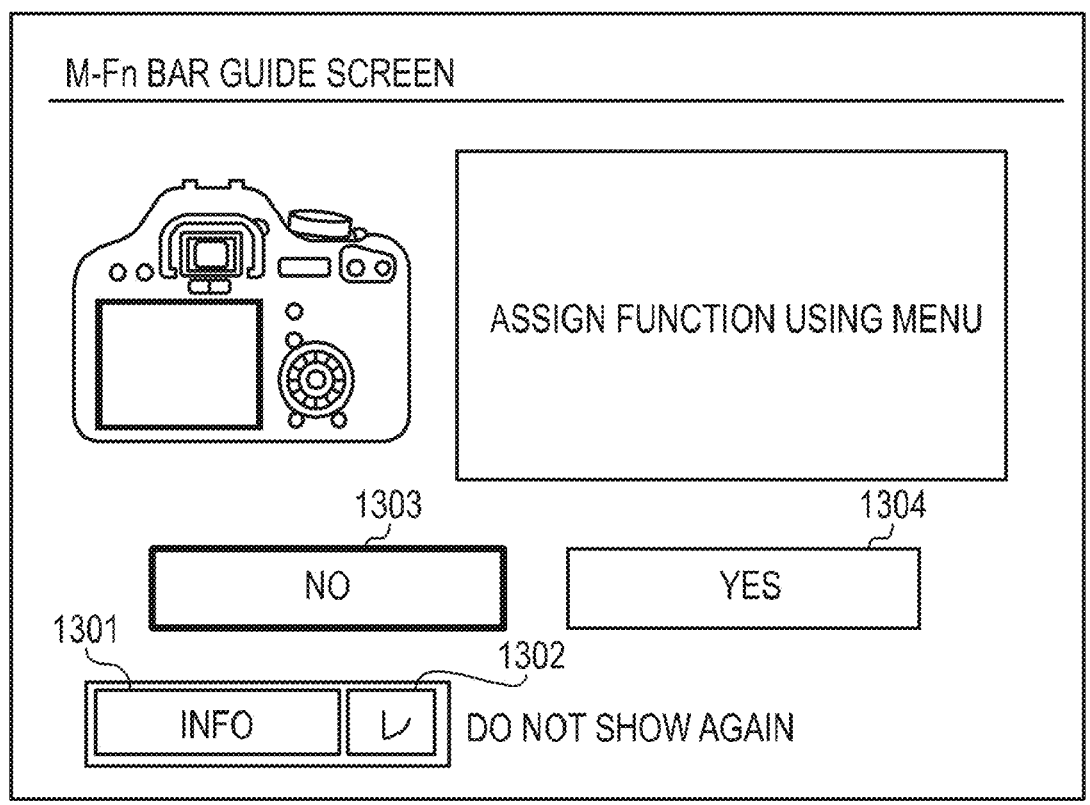
FIG. 13A represents a display example of an M-Fn bar guide screen.

Moreover, since the touch bar 82 is an operation member Which enables a wide variety of functions to be customized and set with respect to various operating methods, it is important that a novice be presented with an operation guide explaining how to use the touch bar 82. To this end, a screen to which a transition is to be made by an entire surface touch may be an operation explanation screen for novices related to the touch bar 82. In this case, a transition can be made to S414 via the operation explanation screen for novices. FIG. 13A shows an example of an M-Fn bar guide screen that is an operation explanation screen for novices. The M-Fn bar guide screen in FIG. 13A indicates that a function can be assigned to the touch bar 82, and is a guide screen related to the touch bar 82 as well as a guide screen related to M-Fn bar customization. In addition, a confirmation screen of assigned functions of the touch bar 82 need not be the M-Fn bar customization setting screen for customizing the touch bar 82. A transition may be made by an entire surface touch to a dedicated confirmation screen to be used to confirm assigned functions of the touch bar 82 instead of a setting screen to be used to customize the touch bar 82.

When the position of the touch-down in S401 is the left-side portion 82L of the touch bar 82, in S413, the system control unit 50 determines whether or not any function has already been assigned by the user to a touch operation (slide or tap) to the touch bar 82. When a function has already been assigned, the system control unit 50 advances to S420, but otherwise the system control unit 50 advances to S414. A function can be registered (assigned) for each type of touch operation and, in the present embodiment, a function can be assigned to each of a right tap, a left tap, and a slide. The assignment of a function is performed based on an operation for specifying an assigned function by the user on an M-Fn bar customization screen to be described later. In an initial factory setting (default setting), none of a left tap, a right tap, and a slide are assigned functions. Therefore, when using the digital camera 100 for the first time after purchasing the digital camera 100, No is determined in S413. Therefore, when a user unfamiliar with the touch bar 82 experimentally comes into contact with the touch bar 82, the system control unit 50 advances to S414 if a position touched by the user is the left-side portion 82L. In addition, since the M-Fn bar guide screen is displayed by a process to be described later, even the user unfamiliar with the touch bar 82 can understand how to use the M-Fn bar (how to register and use an assigned function).

In S414, the system control unit 50 performs an M-Fn bar guide display determination process. When a result of the determination is to display, an M-Fn bar guide screen (a guide screen prompting assignment of a function) such as that shown in FIG. 13A is displayed on the display unit 28 or the EVF 29. When a result of the determination is not to display, an M-Fn bar guide screen is not displayed. The M-Fn bar guide screen in FIG. 13A indicates that a function can be assigned to the touch bar 82, and is a guide screen related to the touch bar 82 as well as a guide screen related to M-Fn bar customization. Details of the M-Fn bar guide display determination process will be provided later with reference to FIG. 11. Although lock release is not performed because an arbitrary function is not assigned to the touch bar 82, since there is a possibility of an entire surface touch, the system control unit 50 advances to S406 after S414. In this manner, in the present embodiment, the M-Fn bar guide screen is displayed only when an operation (touch-down) to the touch bar 82 is detected and, at the same time, a function is not assigned to the touch bar 82. In addition, a user already familiar with functions of the touch bar 82 is highly likely to have assigned a function to the touch bar 82. Therefore, due to the process described above, a guide related to functions of the touch bar 82 can be presented only to users unfamiliar with the functions of the touch bar 82. In other words, a guide related to functions of an operation member can be presented in a hassle-reduced manner. Moreover, the M-Fn bar guide screen is not displayed when the right-side portion 82R on the touch screen of the touch bar 82 is touched, and the M-Fn bar guide screen is displayed in response to a start of a touch on the left-side portion 82L. A trigger region for displaying the M-Fn bar guide screen is restricted to the left-side portion 82L in this manner in order to prevent erroneous activation when the touch bar 82 is not intentionally touched in a similar manner to the operation region for switching between the locked state and the enabled state. In other words, while it is a hassle when the M-Fn bar guide screen is displayed despite the user having no intention to operate the touch bar 82, the possibility of such an occurrence is reduced. As described above, with respect to an operation member to which a function can be assigned by the user, displaying a guide related to the operation member in response to an operation performed on the operation member when no function is assigned is not only preferably applied to the touch bar 82 but also preferably applied to operation members of other types. For example, when a function can be assigned to operation members such as a push button, a rotating dial, a joystick, a pointing stick, a mouse, a touch pad, and a touch panel, a guide display related to the operation member is favorably performed in response to an operation in a function-unassigned state.

In S420, the system control unit 50 resets and then starts time measurement of a lock release timer Tr (in the present embodiment, 0.5 seconds) for switching the touch bar 82 from the locked state to the enabled state. Moreover, when the lock release timer Tr is short, since a switch to the enabled state is made even with a slight contact by a finger, the possibility of an occurrence of an erroneous operation increases. When the lock release timer Tr is long, since a longer tune is required for lock release, a start of operation is delayed and a photographic opportunity may slip away Therefore, in order to eliminate touch operations that are not an intentional operation for lock release by the user and to prevent erroneous operations, the lock release timer Tr is preferably 0.3 seconds or longer when set to a period of time that differs from 0.5 seconds. Furthermore, by setting the lock release timer Tr shorter than a lock timer Tl (details to be described later) for switching the touch bar 82 from the enabled state to the locked state, lock release can be swiftly performed while reducing erroneous operations. Moreover, a short lock timer Tl is a hassle since a switch is promptly made to the locked state, which makes it difficult to perform a continuous operation with respect to the touch bar 82. In addition, since there is no need to quickly lock the touch bar 82, the lock timer Tl is preferably 2 seconds or longer and 5 seconds or shorter. For example, when the lock timer Tl is 2 seconds, the lock release timer Tr is desirably 0.3 seconds or longer and shorter than 2 seconds.

Figure 7B:
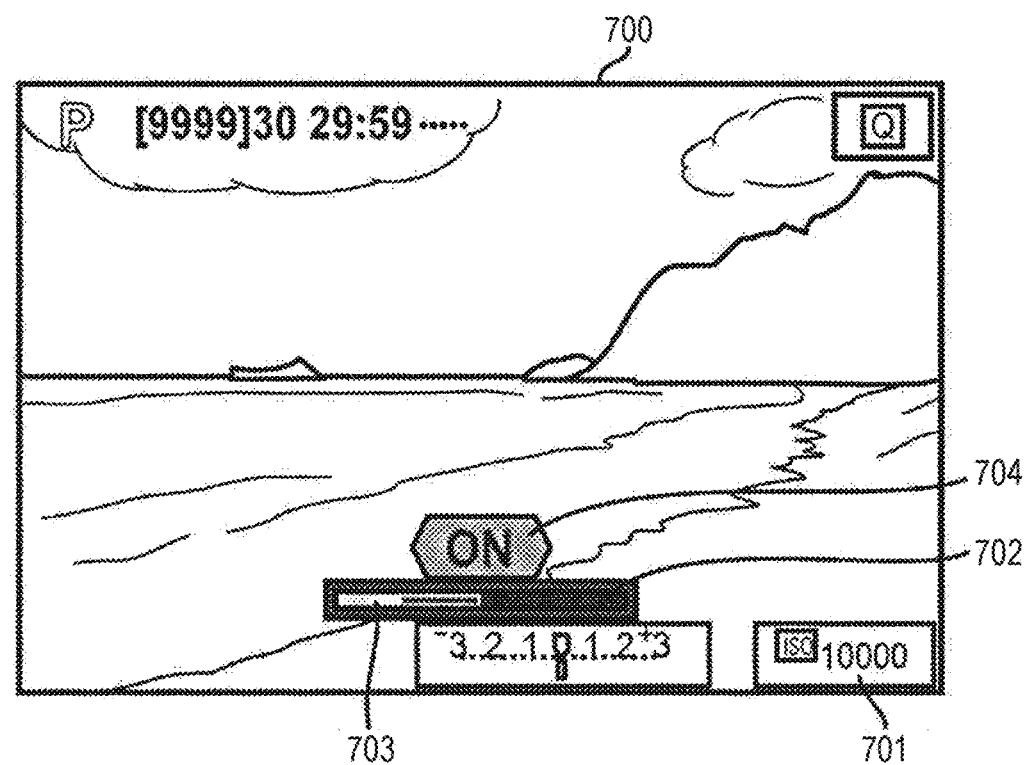

In S421, the system control unit 50 performs a lock release progress display. FIG. 7B shows a display example of a lock release progress display. When a photography standby screen such as that shown in FIG. 7A is displayed, the bar indicator 702 is displayed superimposed on the LV image 700 as shown in FIG. 7B in accordance with a touch-down to the left-side portion 82L and a progress bar display is performed using a left half of the bar indicator 702. A rectangle 703 represents a progress bar portion which indicates a progress status until lock release using the left half of the bar indicator 702 and which is displayed so as to be identifiable from a right half Indicating the left half of the bar indicator 702 shows that the lock release operation is performed by a touch with respect to the left-side portion 82L of the touch bar 82 and, at the current moment, the lock release operation is being performed correctly. A right side in the rectangle 703 is displayed in dark gray (gray close to black) and a left side in the rectangle 703 is displayed in light gray (gray close to white). Displaying the rectangle 703 in a left-side region of the bar indicator 702 in gray shows a position being touched and, at the same time, indicates the locked state in which a function corresponding to a tap is not executed even when the touch is released unlike a touch start display in the enabled state to be described later. In the rectangle 703, the light gray on the left side indicates a current progress rate until Tr elapses from a touch-down by the user on the left-side portion 82L of the touch bar 82, and a display range of the light gray sequentially spreads from left to right in accordance with the continuation time of the touch. The example shown in FIG. 7B reveals that the progress rate is around 50%. The dark gray on the right side indicates a remaining time until the lock release timer Tr expires. When the continuation time of the touch to the left-side portion 82L reaches the lock release timer Tr (0.5 seconds), the light gray portion of the rectangle 703 reaches a center of the bar indicator 702 to indicate that Tr has expired. In this manner, by displaying the rectangle 703 as the progress bar, the user is able to understand that a touch must be continued for a while in order to perform lock release. While the rectangle 703 is displayed as a progress bar in the present embodiment as a lock release progress display, a remaining time or a progress rate (percentage) may be displayed by a numerical value. An icon 704 represents a character string reading "ON" being displayed grayed out. Accordingly, it is shown that the touch operation currently being accepted is for releasing the lock to induce the enabled state and, at the same time. "ON" being grayed out indicates that the enabled state (ON) has not been reached at this moment.

In S422, the system control unit 50 determines whether or not the entire surface touch determination timer Ta has expired. When the entire surface touch determination timer Ta has expired, the system control unit 50 advances to S425, but otherwise the system control unit 50 advances to S423.

In S423, the system control unit 50 performs an entire surface touch start determination process similar to that performed in S408. When the start of an entire surface touch is determined in S423, time measurement of the entire surface touch continuation timer Tc is started.

In S424, the system control unit 50 determines whether or not a touch-up from the touch bar 82 has been performed. When a touch-up has been performed, the system control unit 50 advances to S431, but otherwise the system control unit 50 advances to S436.

In S425, the system control unit 50 determines whether or not the lock release timer Tr has expired. When the lock release timer Tr has expired or, in other words, when a touch has continued for a period of Tr without a slide being performed after a touch-down to the left-side portion 82L of the touch bar 82, the system control unit 50 advances to S426, but otherwise the system control unit 50 advances to S430.

In S426, the system control unit 50 releases the locked state of the touch bar 82 and causes the touch bar 82 to make a transition to the enabled state. Since a touch-on to the touch bar 82 must be continued for the period of the lock release timer Tr in order to make a transition to the enabled state, erroneous operations of lock release are reduced.

Figure 7C:
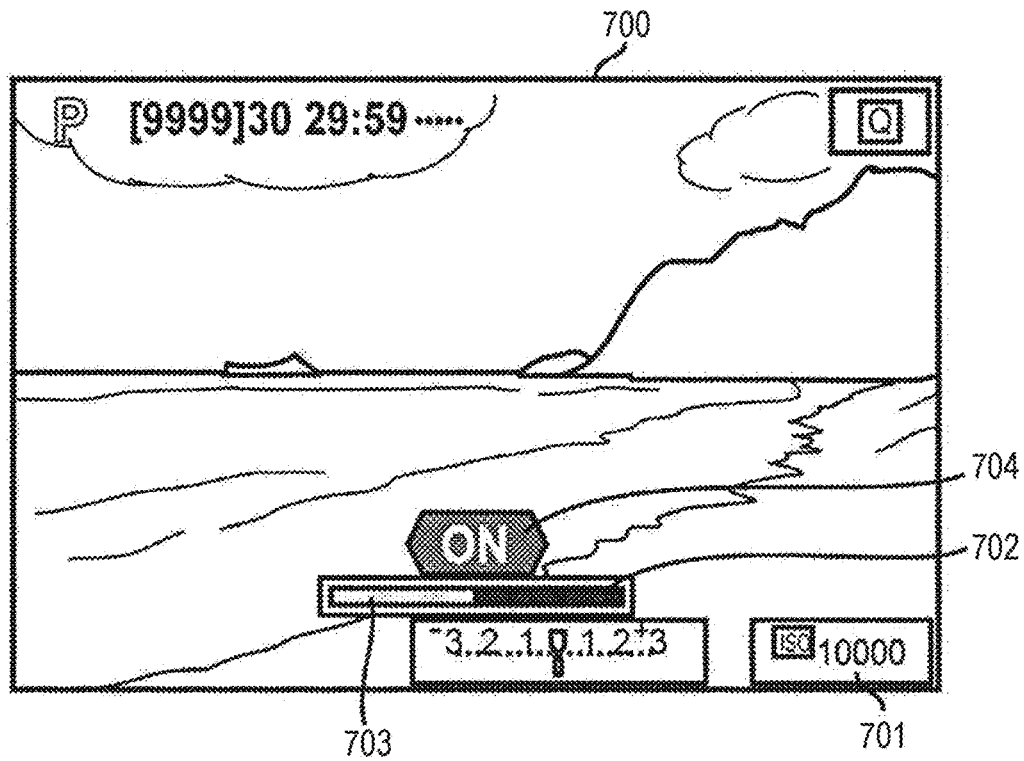
Figure 7D:
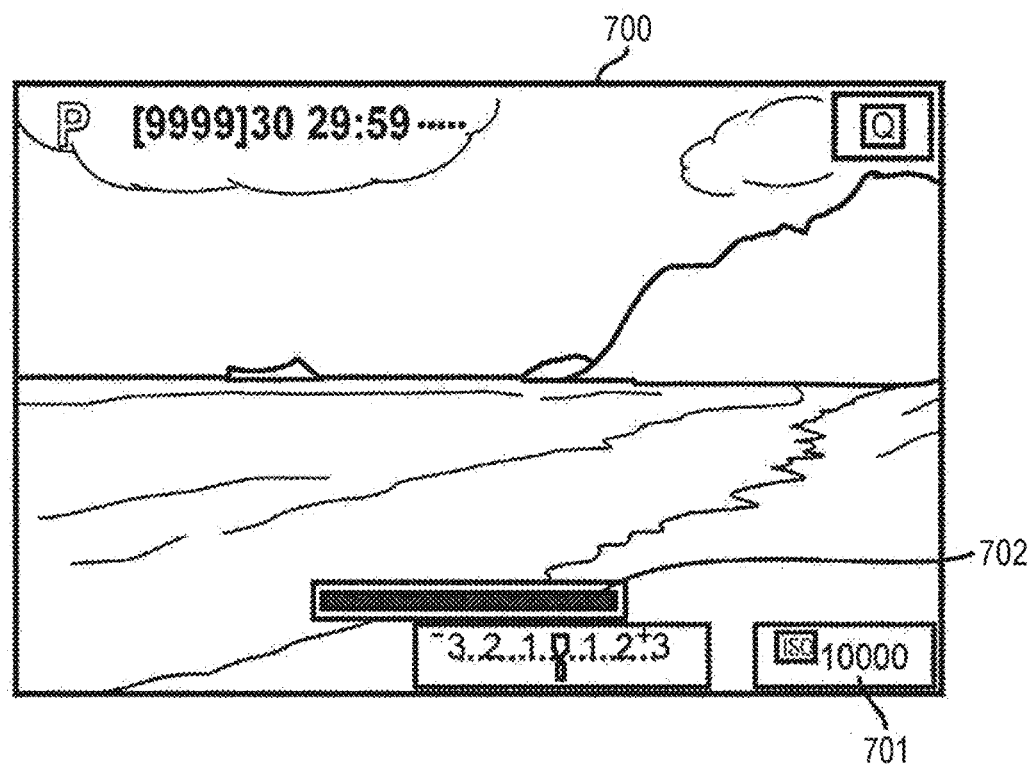

In S427, the system control unit 50 performs a lock release confirmation display on the display unit 28 or the EVF 29. FIG. 7C shows a display example of a lock release confirmation display. The light gray portion of the rectangle 703 described with reference to FIG. 7B has reached the center of the bar indicator 702, indicating that the progress rate is 100% (a touch to the left-side portion 82L has continued for a period of Tr). The icon 704 represents the character string reading "ON" being displayed in white (in other words, the gray-out has been released), indicating that the locked state of the touch bar 82 has been released and the enabled state (ON) is in effect.

In S428, the system control unit 50 determines whether or not a touch-up from the touch bar 82 has been performed. When a touch-up has been performed, the system control unit 50 advances to an enabled state process, but otherwise the system control unit 50 advances to S429. Details of the enabled state process will be provided later with reference to FIGS. 5A to 5C. Moreover, with a touch operation (a touch of a lock release operation) for switching to the enabled state, an assigned function having been assigned by the user to the touch bar 82 (a function assigned to a tap or a slide) is not executed. Subsequently, the assigned function is executed in accordance with a tap or a slide performed after it is once determined in S428 that the touch has been released.

In S429, the system control unit 50 performs a no operation display on the display unit 28 or the EVF 29. FIG. 7D shows a display example of a no operation display. The bar indicator 702 is displayed superimposed on the LV image 700. Nothing is particularly displayed inside the bar indicator 702, indicating that a touch operation that acts as a trigger for executing an assigned function being assigned to various operations of the touch bar 82 is not currently performed with respect to the touch bar 82. Accordingly, the user is able to realize that further continuing to touch the touch bar 82 does not result in the execution of any functions and, therefore, the touch should be released. When the touch is released in the locked state and the no operation display is performed, the bar indicator 702 is hidden and the display screen shown in FIG. 7A described earlier is restored after a while (once the item deletion timer Td expires). Due to such a display, the user can realize that the left touch has been aborted (a finger has separated from the touch bar 82 or the like). In addition, hiding the bar indicator 702 after a while enables the user to realize that the touch bar 82 is still in the locked state.

In S430, the system control unit 50 determines whether or not a touch-up from the touch bar 82 has been performed. When a touch-up has been performed, the system control unit 50 advances to S431, but otherwise the system control unit 50 advances to S433.

In S431, the system control unit 50 performs a no operation display such as that shown in FIG. 7D in a similar manner to S429. Accordingly, the user can realize that, although the fact itself that the touch bar 82 had been touched in an immediately previous touch operation is detected, a valid touch operation causing some kind of assigned function to be executed has not been performed. Moreover, since the locked state is not released and is maintained in this case, the locked state in which operations to the touch bar 82 cannot be accepted is indicated by hiding the bar indicator 702 once a prescribed period of time (Td to be described later) elapses from a touch-up.

In S432, the system control unit 50 starts time measurement of the item deletion timer Td until the bar indicator 702 is to be hidden. In addition, since the lock release timer Tr has not expired, the system control unit 50 advances to S400 while maintaining the locked state.

In S433, the system control unit 50 determines whether or not a slide to the touch bar 82 has been performed. In the present embodiment, based on a reference position Pref that is a touch position Ptd during the execution of S401 (touchdown) and a touch position Pc during the execution of S433, a movement amount M of the touch position on the touch bar 82 is calculated (Pref(=Ptd)−Pc|). Although a slide determination is not performed during time measurement of the entire surface touch determination timer Ta, a movement of a finger (the finger in contact with the touch bar 82) during time measurement of the entire surface touch determination timer Ta is to be included in the movement amount M. A determination that a slide has been performed is made when slide determination threshold W<movement amount M, but otherwise a determination that a slide has not been performed is made. In the present embodiment, the slide determination threshold W is the reference distance (=43) described earlier. When a slide has been performed, the system control unit 50 advances to S434, but otherwise the system control unit 50 advances to S436.

In S434, since the lock release operation has been aborted by the slide on the touch bar 82, the system control unit 50 displays a no operation display in a similar manner to S429 described earlier on the display unit 28 or the EVF 29. Moreover, the fact that a slide has been performed means that the touch operation is neither an entire surface touch nor a lock release operation. Therefore, subsequent to S434, operations other than a determination of a touch-up are not performed until the touch is released.

In S435, the system control unit 50 determines whether or not a touch-up from the touch bar 82 has been performed. The system control unit 50 waits until a touch-up is performed, and advances to S432 once a touch-up is performed. At this point, since the lock release timer Tr has not expired, the locked state is maintained.

In S436, the system control unit 50 determines whether or not time measurement of the lock release timer Tr is in progress. When time measurement is in progress (in other words, when a touch on the left-side portion 82L is continuing), the system control unit 50 advances to S437, but if not (in other words, when it is determined that an entire surface touch has been started), the system control unit 50 advances to S438. At this point, when it has been determined that an entire surface touch has been started, since the lock release timer Tr is stopped, No is determined in S436.

In S437, the system control unit 50 updates the lock release progress display having been displayed in S421 in accordance with a continuation time of the touch on the left-side portion 82L.

In S438, the system control unit 50 determines whether or not the entire surface touch continuation timer Tc has expired. When the entire surface touch continuation timer Tc has expired, the system control unit 50 advances to the M-Fn bar customization setting process including display of the M-Fn bar customization setting screen, but otherwise the system control unit 50 advances to S422. The M-Fn bar customization setting process will be described later with reference to FIG. 14.

Enabled State Process

Figure 5A:
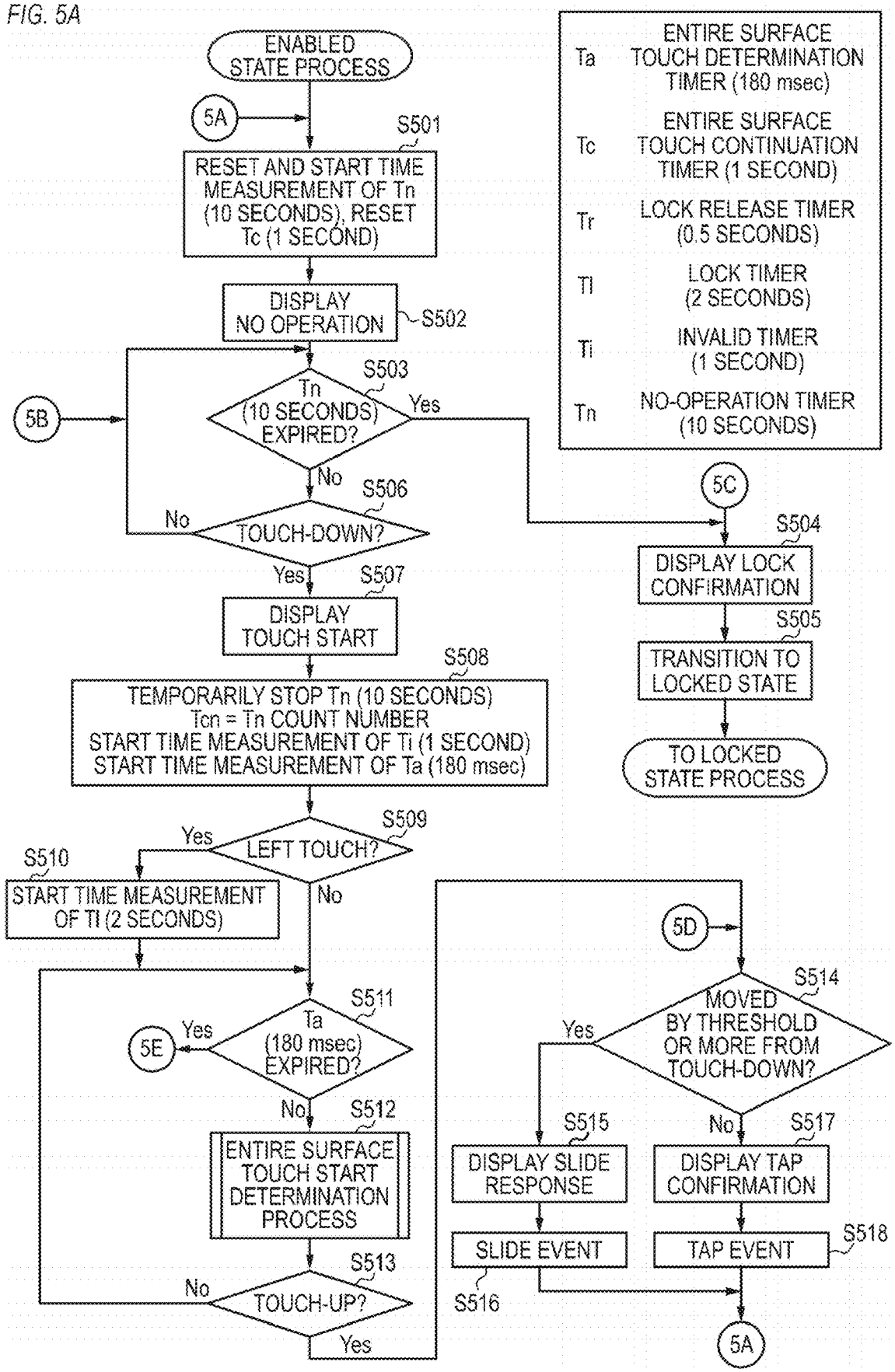
FIGS. 5A to 5C are flow charts of an enabled state process.
Figure 5B:
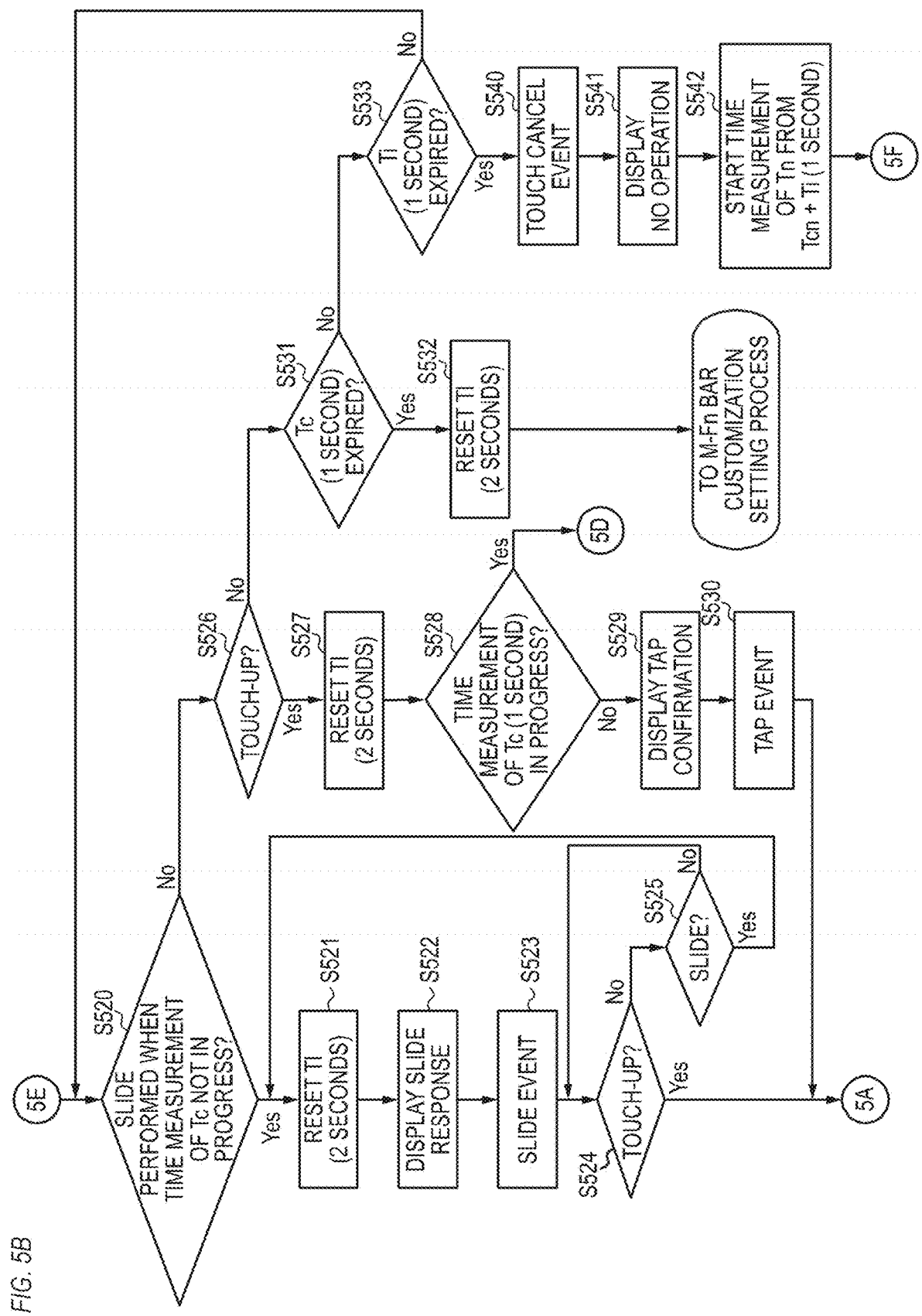
Figure 5C:
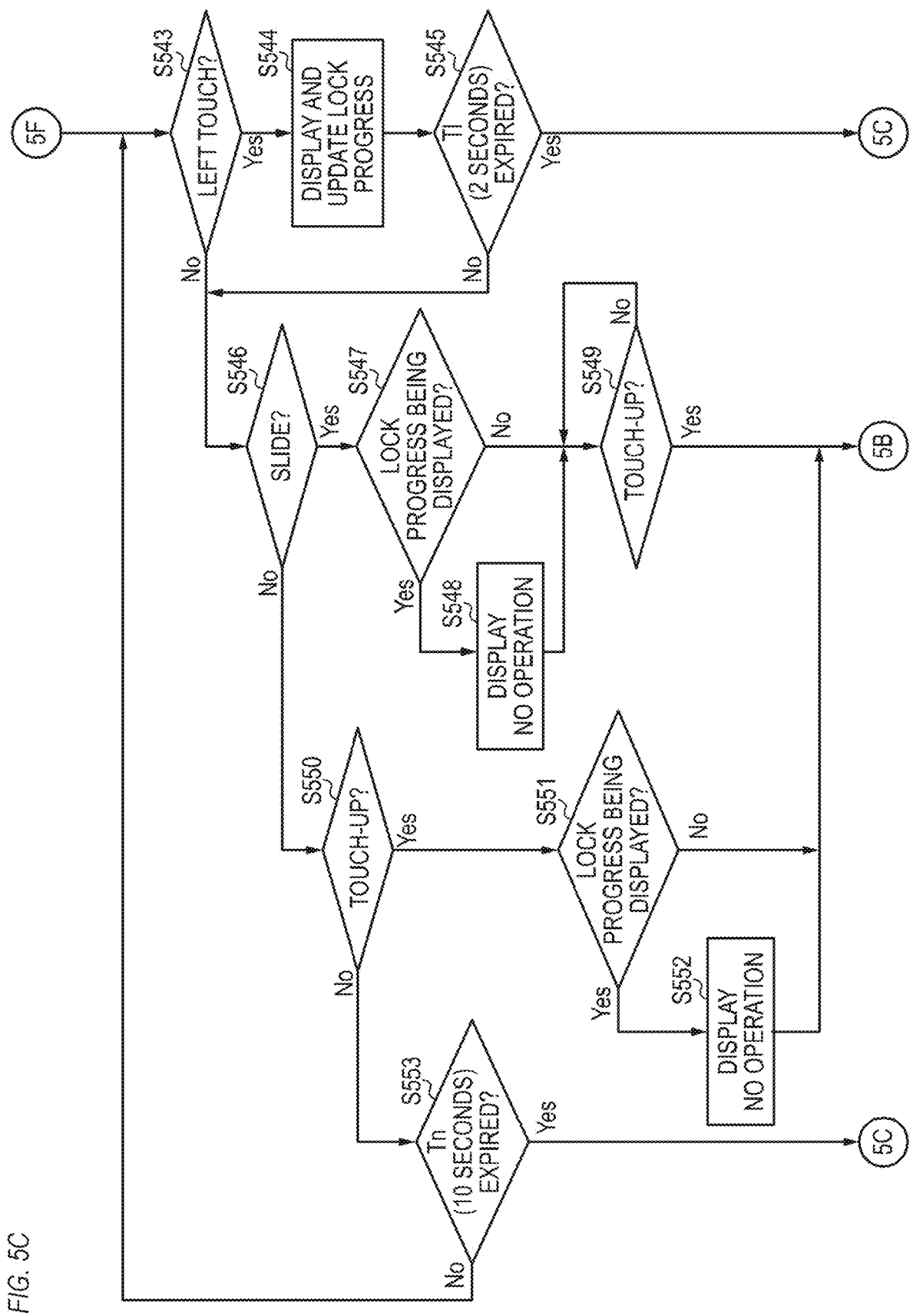

FIGS. 5A to 5C are flow charts showing details of an enabled state process. This process is realized as the system control unit 50 deploys a program recorded in the nonvolatile memory 56 on the system memory 52 and executes the program.

In S501, the system control unit 50 resets a no-operation timer Tn (in the present embodiment, 10 seconds) and starts time measurement of the no-operation timer Tn. In addition, the system control unit 50 resets the entire surface touch continuation timer Tc in a similar manner to S400.

Figure 8A:
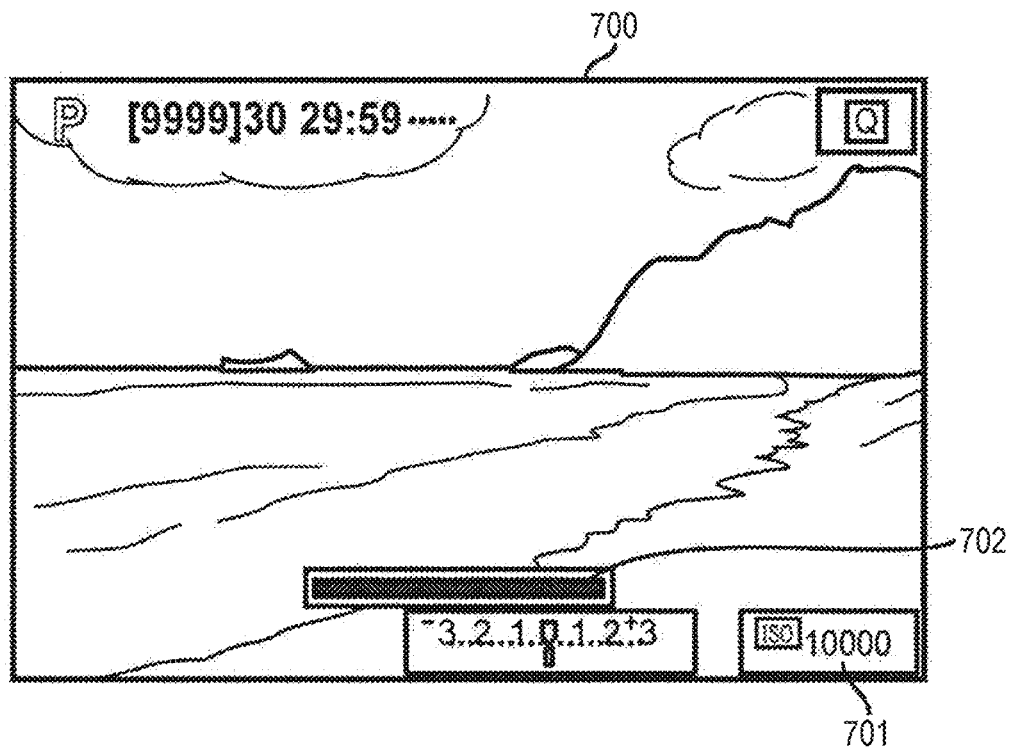
FIGS. 8A to 8F represent display examples of an operation response display with respect to various touch operations in an enabled state.

In S502, the system control unit 50 performs a no operation display on the display unit 28 or the EVF 29. A display example of a no operation display is shown in FIG. 8A. The display is similar to the display described earlier with reference to FIG. 7D, and the bar indicator 702 is displayed superimposed on the LV image 700. In the enabled state, in order to indicate a state in which a tap and a slide with respect to the touch bar 82 can be accepted, the bar indicator 702 is displayed regardless of whether or not a touch operation has been performed. In other words, in the locked state, the bar indicator 702 is hidden once the item deletion timer Td elapses after a touch-up is performed. Conversely, in the enabled state, the bar indicator 702 is not hidden even when the item deletion timer Id elapses after a touch-up is performed. Nothing is particularly displayed inside the bar indicator 702 in the no operation display, indicating that a touch operation that acts as a trigger for executing an assigned function being assigned to various operations of the touch bar 82 is not currently performed with respect to the touch bar 82. However, since the bar indicator 702 continues to be displayed even when a touch with respect to the touch bar 82 is not performed, the user can recognize that the enabled state which accepts a tap or a slide to the touch bar 82 is in effect. In other words, even when the touch bar 82 is not actually operated, whether or not the touch bar 82 is operable can be determined based on whether or not the bar indicator 702 is displayed. Moreover, while an assigned function is not executed when a tap or a slide is performed while the no operation display (FIG. 7D) is being performed in the locked state, an assigned function is executed when a tap or a slide is performed while the no operation display (FIG. 8A) is being performed in the enabled state. In order to have the user recognize a difference between these states, a display mode of the bar indicator 702 may be differentiated (for example, by changing a color of an outer frame) between the no operation display (FIG. 7D) in the locked state and the no operation display (FIG. 8A) in the enabled state.

In S503, the system control unit 50 determines whether or not the no-operation timer Tn has expired. When the no-operation timer Tn has expired (when a valid touch operation with respect to the touch bar 82 has not been performed during a period of Tn), the system control unit 50 advances to S504, but otherwise the system control unit 50 advances to S506.

Figure 7E:
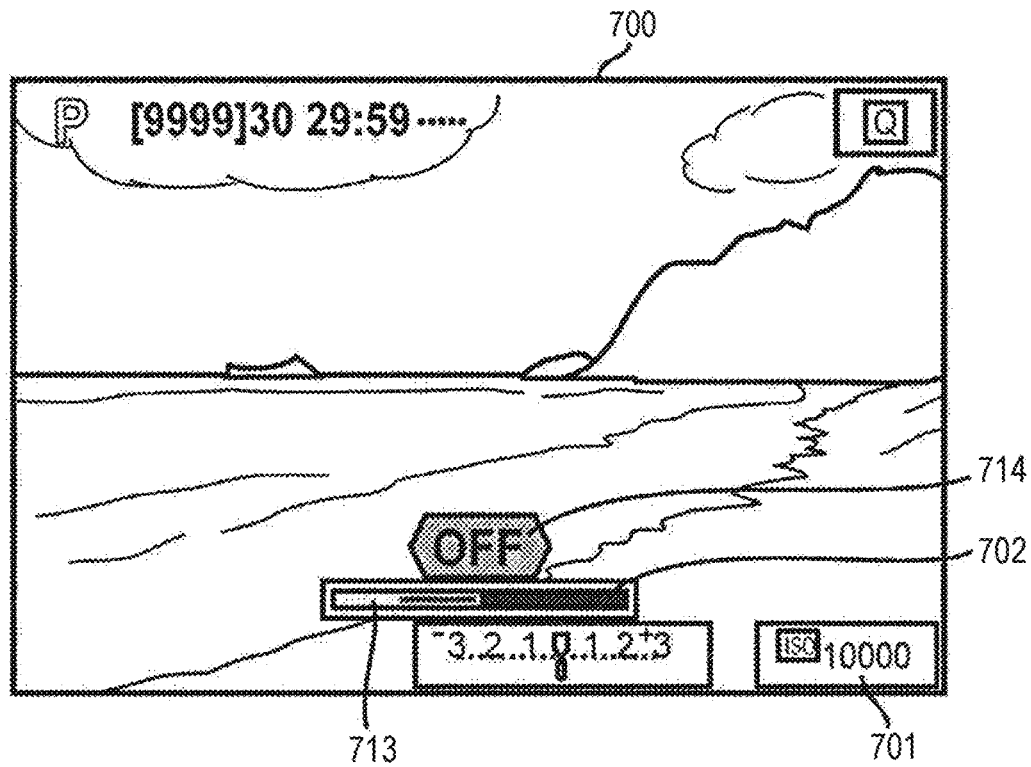
Figure 7F:
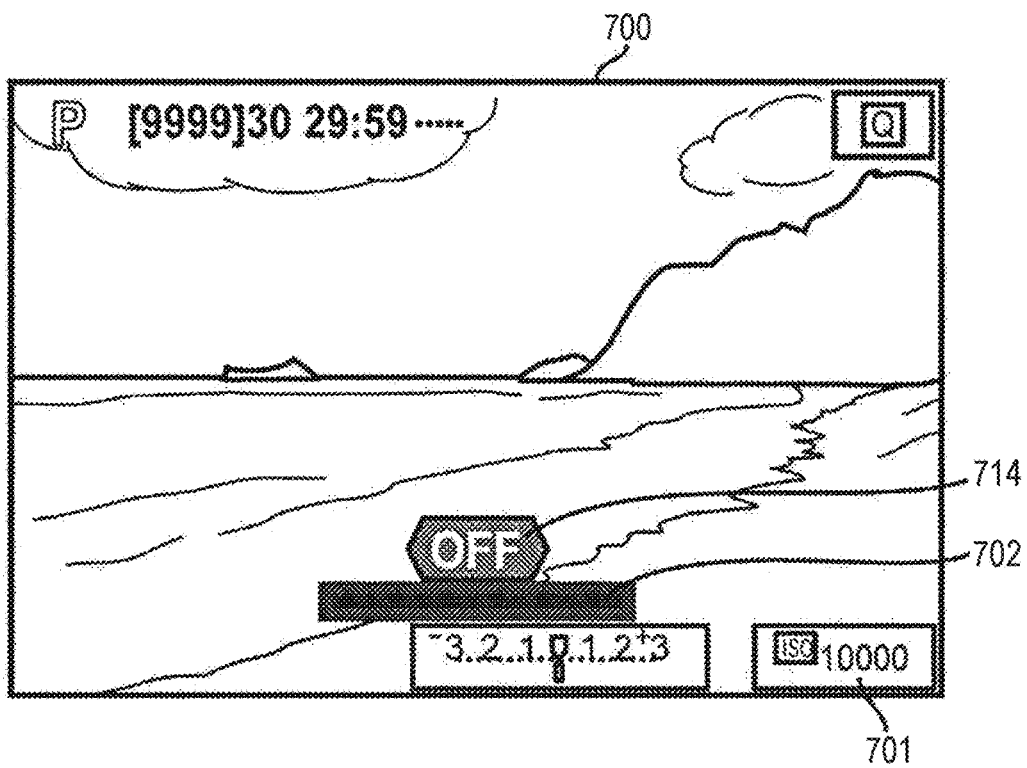

In S504, the system control unit 50 performs a lock confirmation display on the display unit 28 or the EVF 29. FIG. 7F shows a display example of a lock confirmation display. An icon 714 represents a character string reading "OFF" being displayed in white (in other words, gray-out has been released), indicating that the touch bar 82 has been switched from the enabled state to the locked state (OFF). A transition from the enabled state to the locked state is performed due to at least two factors, namely, a lock tinier Tl (to be described later) due to a lock operation and no operations during a period of the no-operation timer Tn. In a lock confirmation display when a transition to the locked state is made due to the expiration of the no-operation timer Tn, nothing is particularly displayed inside the bar indicator 702 as shown in FIG. 7F. In a lock confirmation display when a transition to the locked state is made due to the expiration of the lock timer Tl by a lock operation, a display mode in which a light gray portion of a rectangle 713 to be described later with reference to FIG. 7E has reached the center of the bar indicator 702 may be adopted as a differentiation from FIG. 7F.

In S505, the system control unit 50 causes the touch bar 82 to make a transition to the locked state. Subsequently, the system control unit 50 advances to the locked state process shown in FIGS. 4A and 4B. In the present embodiment, the no-operation timer Tn is 10 seconds. When the no-operation timer Tn is too short, the user must frequently perform lock release and operability declines, but when the no-operation timer Tn is too long, an erroneous operation in which the user erroneously comes into contact with the touch bar 82 without being aware of using the touch bar 82 is more likely to occur.

In S506, the system control unit 50 determines whether or not a touch-down on the touch bar 82 has been performed. When a touch-down has been performed, the system control unit 50 advances to S507, but otherwise the system control unit 50 advances to S503.

Figure 8B:
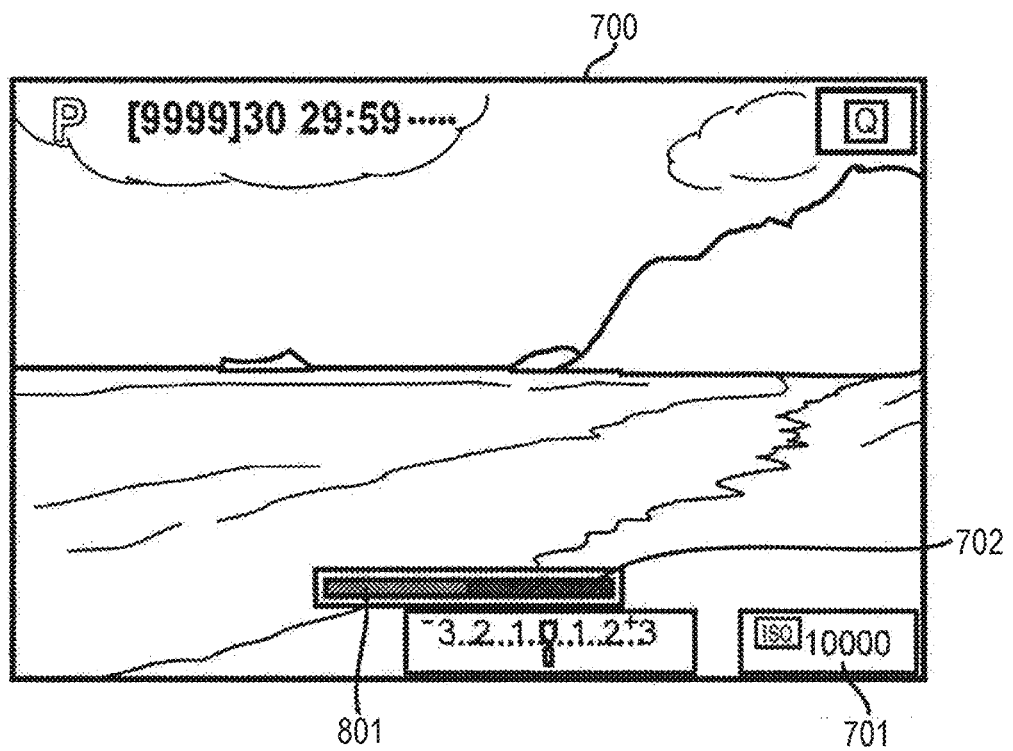

In S507, the system control unit 50 performs a touch start display on the display unit 28 or the EVF 29. FIG. 8B shows a display example of a touch start display. FIG. 8B represents a display example of a touch start display when a function is assigned to a left tap, the touch bar 82 is in the enabled state, and a touch-down is performed on the left-side portion 82L of the touch bar 82. A rectangle 801 is displayed in a display region in a left half of the bar indicator 702 to indicate that a touch-down of the keytop left-side portion 82L has been performed. When a touch-down on the keytop right-side portion 82R of the touch bar 82 is performed, a rectangle similar to the rectangle 706 is displayed in a right half of the bar indicator 702. From the appearance of the touch bar 82, it is difficult to recognize where a left/right boundary is, and the left/right boundary is particularly difficult to recognize when the touch bar 82 is operated while looking through the finder 17. By displaying a rectangle to indicate a portion where a touch-down had been performed as shown in FIG. 8B, the user is able to recognize whether a touch-down has been performed on the left side or the right side without having to recognize the left/right boundary from the appearance of the touch bar 82. The rectangle 801 is displayed with an outer frame colored in bright orange and an interior colored in dark orange (brown). Compared to a tap confirmation display to be described later, the presence of a dark orange portion makes the display less prominent. Accordingly, it is indicated that the current stage is a start of a touch, an operation has not been confirmed yet, and an event has not been issued. By looking at the rectangle 801 in FIG. 8B, the user can recognize that releasing the touch in this state constitutes a left tap while sliding the touch to the right is to be accepted as a slide from left to right.

In S508, the system control unit 50 resets the entire surface touch determination timer Ta and an invalid timer Ti, and starts time measurement of the entire surface touch determination timer Ta and time measurement of the invalid timer Ti. The invalid timer Ti is a timer for preventing any assigned function (a function assigned to a tap or a slide) from being activated by a long-time touch to the touch bar 82. In order to measure the time from a touch-down to the touch bar 82, the entire surface touch determination timer Ta and the invalid timer Ti are reset and respective time measurements thereof are started. In the present embodiment, the invalid timer Ti is 1 second, and when the invalid timer Ti is too short, a touch is promptly disabled and a slide operation can no longer be performed. Conversely, when the invalid timer Ti is too long, an erroneous activation of an assigned function by a touch not intended as an operation such as a touch due to gripping when carrying the digital camera 100 around is more likely to occur. In addition, the system control unit 50 temporarily stops the no-operation timer Tn since the current state is not a no-operation state and retains a count value Ten of the no-operation timer Tn at a time point of S508. In the present embodiment, the no-operation timer Tn is used to measure a period of a no-operation state from a time point of an end of a last valid operation (a touch operation which activates any assigned function). The count value Ten is used as a variable for determining an initial value of the no-operation timer Tn when a valid operation is not performed and a next no-operation state is detected.

Moreover, while the no-operation timer Tn is temporarily stopped in order to effectively utilize timer resources and enable a timer to be used by other camera functions, temporarily stopping the no-operation timer Tn upon a touch-down is not essential. Instead of temporarily stopping the no-operation timer Tn upon a touch-down, lock may not be performed when time measurement of the invalid timer Ti is in progress upon expiration of the no-operation timer Tn and lock may be performed when the no-operation timer Tn has expired upon expiration of the invalid timer Ti. Accordingly, an operation similar to temporarily stopping the no-operation timer Tn upon a touch-down can be realized. Timer resources can also be effectively utilized by stopping the no-operation timer Tn during a slide which is a valid operation and resetting and activating the no-operation timer Tn in accordance with a touch-up after the slide. The time measurement of the no-operation timer Tn may be continued when a touch operation not assigned with a function (a function corresponding to a present photography mode) is performed.

In S509, the system control unit 50 determines whether or not a position of the touch-down in S508 is the keytop left-side portion 82L of the touch bar 82. When the touch-down position is the keytop left-side portion 82L, since there is a possibility of an operation for locking the touch bar 82, the system control unit 50 advances to S510, but otherwise the system control unit 50 advances to S511.

In S510, the system control unit 50 starts time measurement of the lock timer Tl (in the present embodiment, 2 seconds).

In S511, the system control unit 50 determines whether or not the entire surface touch determination timer Ta has expired. When the entire surface touch determination timer Ta has expired, the system control unit 50 advances to S520, but otherwise the system control unit 50 advances to S512.

In S512, the system control unit 50 performs an entire surface touch start determination process (a determination process of whether or not an entire surface touch to the touch bar 82 has been started). Details of the entire surface touch start determination process will be provided later with reference to FIG. 6. When the start of an entire surface touch is determined in S512, time measurement of the entire surface touch continuation timer Tc is started.

In S513, the system control unit 50 determines whether or not a touch-up from the touch bar 82 has been performed before the entire surface touch determination timer Ta expires. When a touch-up has been performed, the system control unit 50 advances to S514, but otherwise the system control unit 50 advances to S511. In S511 to S513, whether or not a slide has been performed is not determined, and even if a slide operation is performed before a touch-up is determined in S513 or an expiration of Ta is determined in S511, a function assigned to a slide is not executed. This is because a period of Ta from the start of a touch is designated as a period for determining whether or not an entire surface touch has been started and therefore ignores a slide. When a process of an operation by a user who is about to start an entire surface touch is divided into minute units, first, a touch of a small area occurs as a tip of a ball of a finger makes contact with the touch bar 82 and, subsequently, a touch of a large area occurs as the entire ball of the finger is pressed against the touch bar 82. During this period, a variation in the touch area may cause a center of gravity of the touch to deviate and the detected touch position may possibly move in excess of the slide determination threshold W. However, this situation occurs during the process of an operation as an attempt to perform an entire surface touch and does not represent the user's intention to perform a slide. In consideration thereof, whether or not a slide has been performed is not determined during a period of Ta from the start of a touch in order to prevent a function assigned to a slide to be executed by such a movement of the touch position. In other words, when the user intentionally performs an entire surface touch, an erroneous operation determined as a slide due to shapes of the fingers and peculiarities of contact motions of the user can be prevented.

In S514, the system control unit 50 performs a slide determination (a determination of whether or not a slide to the touch bar 82 has been performed) which was not performed from S511 to S513. A determination that a slide has been performed is made when a difference |Ptd−Pc| between a touch position Ptd during the execution of S506 (touch-down) and a touch position Pc during the execution of S513 (touch-up) exceeds the slide determination threshold W. When a slide has been performed, the system control unit 50 advances to S515. Otherwise, since the touch time is equal to or shorter than the entire surface touch determination timer Ta (180 msec) or, in other words, the invalid timer Ti (>Ta) has not expired, the system control unit 50 determines that a tap has been performed and advances to S517. As described above, although a determination of a slide is not performed during a period of Ta in which a touch continues from a start of the touch, even within the period of Ta from the start of the touch, whether or not a slide has been performed is determined when the touch is released without starting an entire surface touch. In addition, the determination of whether or not a slide has been performed and a determination of a movement distance are performed retrospectively to a touch position (Ptd) at a time point of the start of the touch. Accordingly, a function can be executed after a touch-up even in response to a slide performed in a shorter period of time than Ta such as an operation involving quickly tracing (flicking) the touch bar 82, and the possibility of making the user feel that responsiveness to an operation is low is reduced. Moreover, when it is determined that a slide has been performed, a slide amount is calculated in a similar manner to S520 to be described later.

Figure 8C:
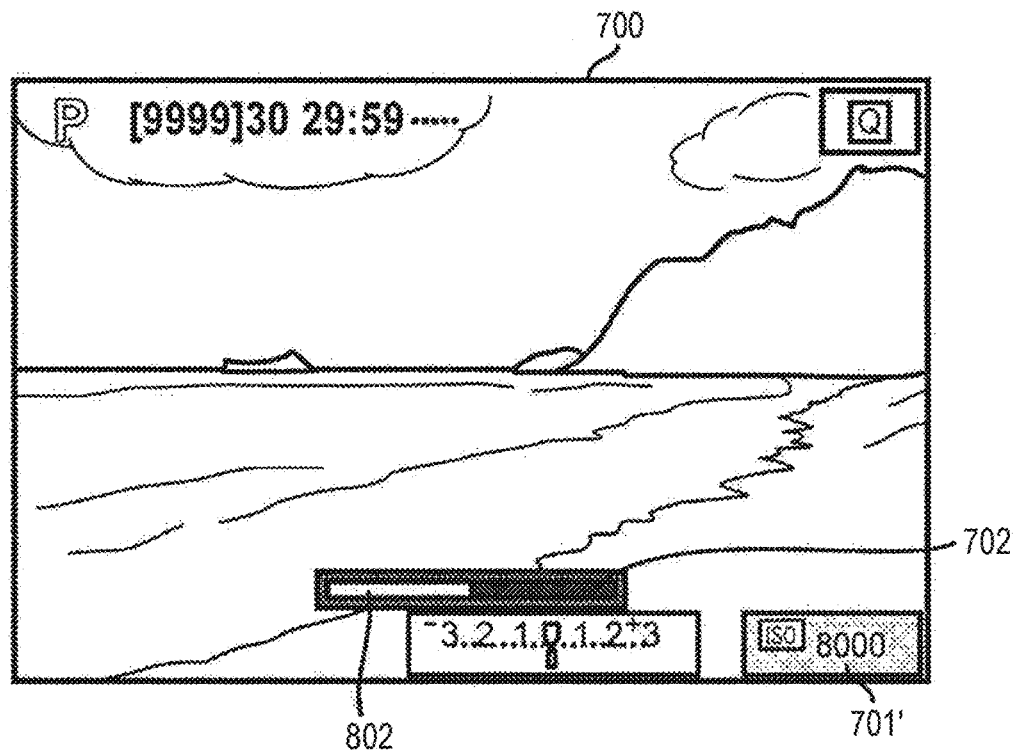
Figure 8D:
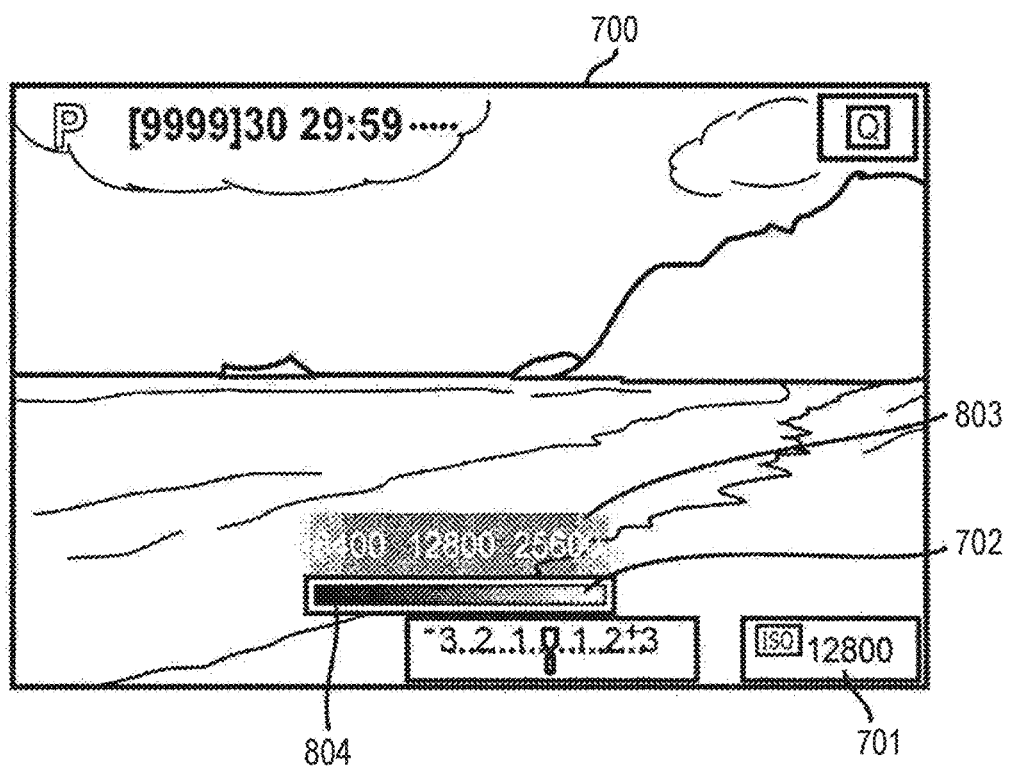

In S515, the system control unit 50 performs a slide response display on the display unit 28 or the EVF 29. FIG. 8D shows a display example of a slide response display. FIG. 8D represents a display example of a slide response display when change ISO sensitivity is assigned to a slide, the touch bar 82 is in the enabled state, and a slide operation from left to right is performed on the touch bar 82. A gradation 804 displayed on the bar indicator 702 is displayed such that a direction of shades of the gradation differs in correspondence with a direction of movement of the slide. In the example shown in FIG. 8D, making the gradation brighter from a left side to a right side represents the fact that a slide from left to right had been performed. At this point, in accordance with the slide from left to right, an ISO value gauge 803 displayed in correspondence with the bar indicator 702 is scrolled from a left side toward a right side. Conversely, when a slide from the right toward the left is performed, the slide from the right toward the left is represented by displaying a gradation that becomes brighter from a right side toward a left side on the bar indicator 702. In addition, in accordance with the slide from right to left, the ISO value displayed in correspondence with the bar indicator 702 is scrolled from a right side toward a left side. Matching a slide direction of the touch bar 82 with a scroll direction of a display item (the gauge 803) indicating a setting value enables a setting to be changed in an intuitive manner by a slide of the touch bar 82. In addition, the gradation 804 is displayed across the entire bar indicator 702 including both a left-side display region and a right-side display region of the bar indicator 702. This indicates that a slide operation can be performed over a wide region including the left-side portion 82L and the right-side portion 82R of the touch bar 82. Moreover, while a direction of a slide is represented by a color (brightness) of a gradation in the present embodiment, other methods may be used so that a direction of a slide can be visually understood. The gauge 803 is displayed in order to convey, in a readily understandable manner, how much the ISO value has changed due to a slide operation of the touch bar 82. The example shown in FIG. 8D represents a screen in a case in which a slide operation corresponding to one slide has been performed from a state where the ISO value is 10000, and an ISO value indicated by the gauge 803 has increased by ⅓ stages from 10000 to 12800. The setting display item 701 also represents the ISO value being changed to 12800 by the slide operation of the touch bar 82 in a similar manner to the gauge 803.

In S516, the system control unit 50 executes a slide event. Accordingly, when there is a function assigned to a slide, the assigned function is executed. For example, the ISO value is changed from 10000 to 12800 in accordance with a slide corresponding to 1 step from left to right. Moreover, S515 and S516 are substantially performed at the same time. Subsequently, the system control unit 50 returns to step 501 and repeats the processes. When the touch bar 82 is in the enabled state, a slide event or a tap event is executed even when a touch continuation time is short (for example, when the touch continuation time is shorter than a period of the lock release timer Tr (shorter than 0.5 seconds).

In S517, the system control unit 50 performs a tap confirmation display on the display unit 28 or the EVF 29. FIG. 8C shows a display example of a tap confirmation display. FIG. 8C represents a display example of a tap confirmation display when "shift one ISO sensitivity setting to the left" (FIG. 16A) is assigned to a left tap, the touch bar 82 is in the enabled state, and a touch-down is performed on the left-side portion 82L of the touch bar 82. A rectangle 802 is displayed in a left half of the bar indicator 702 to indicate that a left tap of the touch bar 82 has been performed. When a right tap to the touch bar 82 is performed, a rectangle similar to the rectangle 802 is displayed in a right half of the bar indicator 702. An inside of the rectangle 802 is colored in bright orange, resulting in a display with a brighter interior color than the dark orange of the rectangle 801 for a touch start display. By displaying the inside of the bar indicator 702 in different display modes in this manner, the user can recognize whether a touch-down has been performed or a touch-up (tap) has been performed. FIG. 8C represents a screen in a case where a left tap is performed from the state of the ISO value being 10000 as shown in FIG. 8B, and a setting display item 701' represents that the ISO value has been changed to 8000 by the left tap on the touch bar 82. The setting display item 701' is displayed with an orange (a highlight color) background and a bold frame so as to indicate that a setting change has been made and is displayed highlighted as compared to the setting display item 701 (semi-transparent black normal color with a normal color background) in FIG. 8A.

Figure 8E:
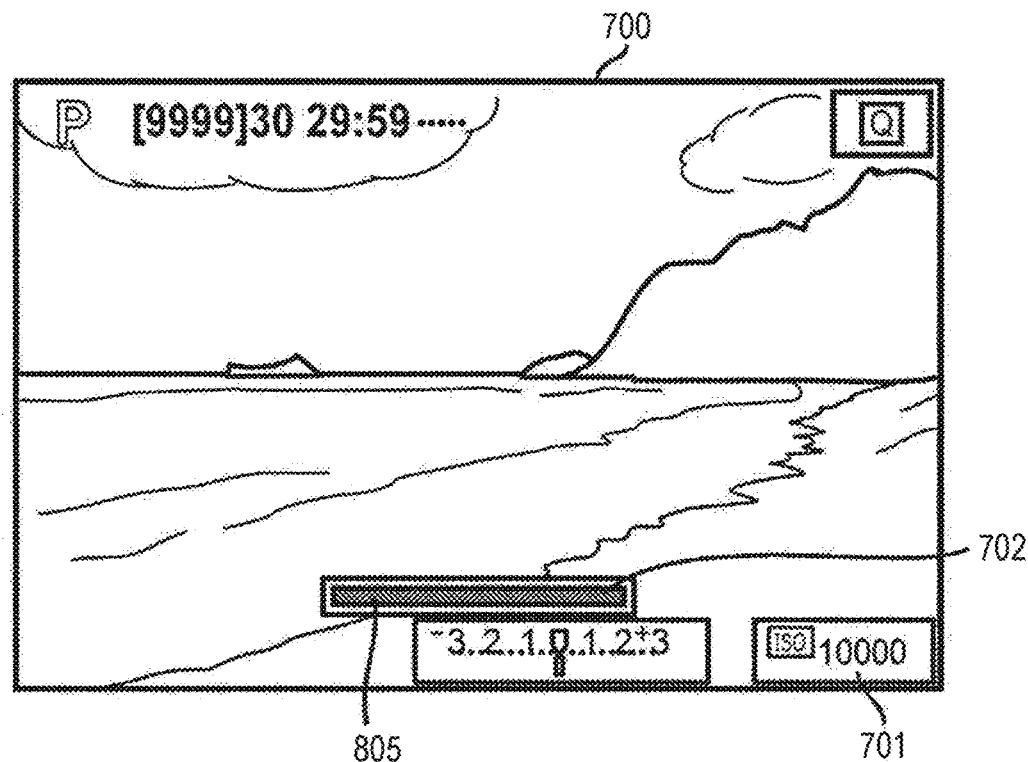
Figure 8F:
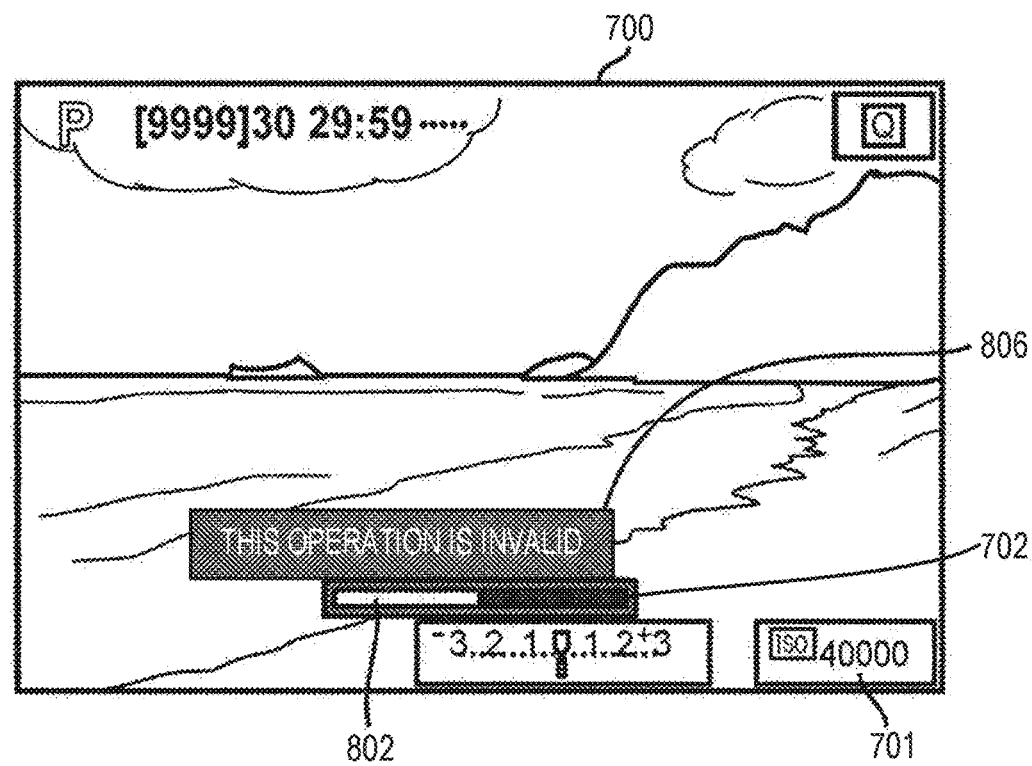

FIG. 8F shows another example of a tap confirmation display. Even if an operation of a left tap is confirmed, when a function corresponding to the operation cannot be activated due to some kind of condition such as a function not being assigned to a left tap, a display to the effect that the operation is invalid is performed as shown in FIG. 8F. A guidance 806 is a message display indicating that a function assigned to the performed operation cannot be activated. The rectangle 802 represents that a touch-up (tap) of the touch bar 82 has been performed. By checking the guidance 806 and the rectangle 802, the user is able to recognize that a tap operation itself has been performed but a function cannot be activated (there is no function to be executed). While a text (guidance) describing that a function cannot be activated is displayed in the present embodiment, an icon indicating the fact that the function cannot be activated may be displayed or the bar indicator 702 may be displayed so as to represent the fact that the function cannot be activated. In addition, when a function is also not assigned to a slide, a display indicating that a function cannot be activated is displayed in a similar manner to the guidance 806 when performing a slide response display.

In S518, the system control unit 50 executes a tap event. Accordingly, when there is a function assigned to a tap, the assigned function is executed. For example, the ISO value is changed from 10000 to 8000. Moreover, S517 and S518 are substantially performed at the same time. Subsequently, the system control unit 50 returns to step 501 and repeats the processes.

In S520, when time measurement of the entire surface touch continuation timer Tc is not being performed or, in other words, when a start of an entire surface touch has not been detected in a period of Ta from the start of a touch, the system control unit 50 determines whether or not a slide on the touch bar 82 has been performed. In an initial (first time) S520, the reference position Pref of a slide determination is the touch position Ptd upon execution of S506 (touch-down). In addition, based on the reference position Pref and the touch position Pc during the execution of S520, a movement amount M of the touch position on the touch bar 82 is calculated (|Pref(=Ptd)−Pc|). Although the slide determination of S520 (and S525 and S546 to be described later) is not performed during time measurement of the entire surface touch determination timer Ta, in the determination after the expiration of Ta, a movement of a finger (the finger in contact with the touch bar 82) during time measurement of the entire surface touch determination timer Ta is to be included in the movement amount M. A determination that a slide has been performed is made when slide determination threshold W<movement amount M, but otherwise a determination that a slide has not been performed is made. When a slide has been performed, the system control unit 50 advances to S521, but otherwise the system control unit 50 advances to S526. Accordingly, when the movement amount M of the touch position exceeds the slide determination threshold W during time measurement of the entire surface touch determination timer Ta, the function of the slide is not executing during the time measurement of Ta. In addition, when Ta expires without an entire surface touch being started and without separation of the touch, the function of the slide is executed upon expiration of Ta. Furthermore, when a start of an entire surface touch has been detected within a period of Ta from a start of a touch and time measurement of the entire surface touch continuation timer Tc is being performed, the system control unit 50 advances to S526 without determining whether or not a slide has been performed. Accordingly, a determination that a slide has been performed by a movement of a touch position which had varied before the start of an entire surface touch can be prevented from being made. Moreover, instead of not making a determination of a slide in S520 when a start of an entire surface touch has been detected within a period of Ta from a start of a touch, a determination of a slide may be made after updating the reference position Pref with a touch position at a time point of the start of the entire surface touch or a time point of expiration of Ta instead of Ptd. In this case, the process of S529 to be described later is not performed and the system control unit 50 advances to S529 from S527.

In S520, when a slide has been performed, the system control unit 50 also performs the following process. When a slide in a direction from the finder 17 toward the mode changeover switch 60 is defined as a + (plus) direction and an opposite direction as a − (minus) direction, a slide mount n (the number of stages or the number of steps of a slide) satisfying expression 1 below is obtained using the movement amount M and the slide determination threshold W.

$$n \times W \leq M < (n+1) \times W \qquad \text{(expression 1)}$$

The slide amount n is an integer portion excluding a remainder of a quotient produced by dividing M by W. After calculating the slide amount n, the system control unit 50 updates the reference position Pref using expression 2 below.

$$\text{Pref} = \text{Pref} + n \times W \qquad \text{(expression 2)}$$

In S521, the system control unit 50 resets the lock timer Tl. This is done because a slide has been detected in S520 and, therefore, the currently performed touch operation is not a lock operation.

In S522, the system control unit 50 performs a slide response display in a similar manner to S515.

In S523, in a similar manner to S516, the system control unit 50 executes a slide event (a function assigned to a slide) in accordance with the slide amount n calculated in S520. For example, when change ISO sensitivity is assigned to a slide and the slide amount n is 2, ISO sensitivity is raised by ⅔ stages from an ISO sensitivity value set prior to the slide.

S524 and S525 (particularly S525) are processes for detecting a continuous slide. In S524, the system control unit 50 determines whether or not a touch-up from the touch bar 82 has been performed. When a touch-up has been performed, the system control unit 50 advances to S501, but otherwise the system control unit 50 advances to S525. Moreover, since the touch-up in S524 is a touch-up after a slide, a tap event (a function assigned to a tap) is not executed. In S525, the system control unit 50 performs a process (the determination of whether or not a slide on the touch bar 82 has been performed, the calculation of the slide amount n, the update of the reference position Pref, and the like) similar to S520 with the exception of the determination of whether or not time measurement of Tc is in progress. When a slide has been performed, the system control unit 50 advances to S521, but otherwise the system control unit 50 advances to S524.

In S526, the system control unit 50 determines whether or not a touch-up from the touch bar 82 has been performed. When a touch-up has been performed, the system control unit 50 determines that a tap has been performed because the invalid timer Ti has not expired and advances to S527, but otherwise the system control unit 50 advances to S531.

Since a tap has been detected, in S527, the system control unit 50 resets the lock timer Tl.

In S528, the system control unit 50 determines whether or not time measurement of the entire surface touch continuation timer Tc is in progress or, in other words, whether or not a start of an entire surface touch has been detected in a period of Ta from the start of a touch. When the time measurement of the entire surface touch continuation timer Tc is in progress, the system control unit 50 advances to S514, but otherwise the system control unit 50 advances to S529. When the time measurement of the entire surface touch continuation timer Tc is in progress and the system control unit 50 advances to S514, if a slide from a touch-down position has been performed, a function assigned to the slide is executed. In other words, although a function in accordance with a slide is not executed during a continuation of a touch even when a touch position is moved after an entire surface touch is started within a period of Ta from the start of the touch, the function of a slide corresponding to a movement of the touch position from a time point of the start of the touch is executed at a time point of separation of the touch.

In S529, the system control unit 50 performs a tap confirmation display in a similar manner to S517.

In S530, the system control unit 50 executes a tap event (a function assigned to a tap) in a similar manner to S518. Subsequently, the system control unit 50 advances to S501.

In S531, the system control unit 50 determines whether or not the entire surface touch continuation timer Tc has expired. The entire surface touch continuation timer Tc is a timer which is started when a determination that an entire surface touch has been performed is made in S512. In this case, a state where the entire surface touch continuation timer Tc is measuring a continuation time of an entire surface touch exists when an entire surface touch is determined at least once and a touch-up has not been subsequently performed. When the entire surface touch determination tinier Ta has expired, the system control unit 50 advances to S532, but otherwise the system control unit 50 advances to S533.

Since an entire surface touch equal to or longer than the entire surface touch continuation timer Tc has been performed, in S532, the system control unit 50 resets the lock timer Tl. Subsequently, the system control unit 50 advances to the M-Fn bar customization setting process. Details of the M-Fn bar customization setting process will be provided later with reference to FIG. 14.

As described above, in the present embodiment, a slide event or a tap event is not executed during a time measurement period of the entire surface touch determination timer Ta. Accordingly, when the user intentionally performs an entire surface touch, an erroneous operation determined as a slide due to shapes of the fingers and peculiarities of contact motions of the user can be prevented. In addition, when the entire surface touch determination timer Ta expires without an entire surface touch being detected (Yes in S511), the M-Fn bar customization setting process is not executed even when an entire surface touch is subsequently detected, and when a slide or a tap is detected, an event thereof is executed at a time point of detection. On the other hand, when the entire surface touch determination timer Ta expires upon detection of an entire surface touch, the M-Fn bar customization setting process is executed after the entire surface touch continuation timer Tc expires (after the end of the time measurement period of the entire surface touch continuation timer Tc). Accordingly, a function corresponding to a touch operation such as a slide, a tap, or an entire surface touch can be prevented from being erroneously (unintentionally) executed and the function corresponding to the touch operation can be executed in a preferable manner. Moreover, since the keytop left-side portion 82L of the touch bar 82 is a region that is difficult to touch unless done so intentionally, when a touch-down is detected in the keytop left-side portion 82L, the possibility that an entire surface touch is performed is low. Therefore, when a start position of a touch operation (a position of a touch-down) is the keytop left-side portion 82L, an event of a slide or a tap may be executed at a time point of detection of the slide or the tap instead of starting time measurement of the entire surface touch determination timer Ta. In other words, when the start position of a touch operation (the position of a touch-down) is the keytop left-side portion 82L, the system control unit 50 may advance to S509 and S510 without starting the time measurement of the entire surface touch determination timer Ta in S508 and then advance to S520 without performing the determination of S511.

In S533, the system control unit 50 determines whether or not the invalid timer Ti has expired. As described earlier, the invalid timer Ti is a timer for canceling a touch operation that has become a long touch and for preventing an assigned function of the touch bar 82 from being executed when a touch-on of the touch bar 82 continues for a duration of the invalid timer Ti or more. When the invalid timer Ti has expired, the system control unit 50 advances to S540, but otherwise the system control unit 50 advances to S520.

In S540, the system control unit 50 issues a touch cancel event and disables touch operations to the touch bar 82. When a touch cancel event is issued, the fact that a touch cancel state is in effect is stored in the system memory 52 until a touch-up is performed. Moreover, when the invalid timer Ti expires, the system control unit 50 may inquire the user as to whether a touch cancel event is to be executed and determine whether or not to execute a touch cancel event in accordance with a response to the inquiry.

In S541, by displaying a screen such as that shown in FIG. 8A on the display unit 28 or the EVF 29, the system control unit 50 clearly indicates to the user that the current touch operation has been disabled.

In S542, the system control unit 50 restarts the time measurement of the no-operation timer Tn. Since the execution of a touch cancel in S540 disables a previous touch operation, a no-operation state can be considered to be continuing. Therefore, the no-operation timer Tn starts a count from a count value of Tcn+Ti (restarts a count from a count value obtained by adding Ti to the stopped no-operation timer Tn) instead of starting a count from a count value of 0. In other words, time is to be measured for a period from a previous valid touch operation. Accordingly, a transition to the locked state is to be made in accordance with a continuation for a period of a length of Tn of a state where a touch operation with respect to the touch bar 82 other than a touch operation satisfying conditions for a touch to be canceled (other than a canceled touch). In other words, in accordance with a period in which a state where a touch operation to the touch bar 82 other than the canceled touch operation reaching Tn, a transition is made to the locked state regardless of whether or not there had been a canceled touch operation before the period reached Tn. Accordingly, a transition can be made to the locked state even when the touch bar 82 is unintentionally touched and the touch is continued.

In S543, the system control unit 50 determines whether or not a left touch (a touch to the keytop left-side portion 82L of the touch bar 82) is being performed in order to determine whether or not to make a transition to the locked state. When a left touch is being performed, the system control unit 50 advances to S544, but otherwise the system control unit 50 advances to S546.

In S544, the system control unit 50 performs a lock progress display and an update on the display unit 28 or the EVF 29. FIG. 7E shows a display example of a lock progress display. In the present embodiment, in a similar manner to switching from the locked state to the enabled state, the touch bar 82 can be switched from the enabled state to the locked state by performing a long touch for a period equal to or longer than Tl with respect to the keytop left-side portion 82L of the touch bar 82. The lock progress display is a reverse of the lock release progress display and represents how much longer a touch must be continued in order to switch from the enabled state to the locked state by a lock operation. As shown in FIG. 7E, the bar indicator 702 is displayed superimposed on the LV image 700 and a progress bar display is performed using a left half of the bar indicator 702. A rectangle 713 represents a progress bar portion which indicates a progress status until a lock using the left half of the bar indicator 702 and which is displayed so as to be identifiable from a right half. Indicating the left half of the bar indicator 702 shows that the lock operation is performed by a touch with respect to the left-side portion 82L of the touch bar 82 and, at the current moment, the lock operation is being performed correctly. A right side in the rectangle 713 is displayed in dark gray (gray close to black) and a left side in the rectangle 713 is displayed in light gray (gray close to white). The light gray on the left side indicates a current progress rate until Tl elapses from a touch-down by the user on the left-side portion 82L of the touch bar 82, and a display range of the light gray sequentially spreads from left to right in accordance with the continuation time of the touch. The example shown in FIG. 7E reveals that the progress rate is around 50%. The dark gray on the right side indicates a remaining time until the lock tinier Tl expires. When the continuation time of the touch to the left-side portion 82L reaches the lock timer Tl (2 seconds), the light gray portion of the rectangle 713 reaches the center of the bar indicator 702 to indicate that Tl has expired. In this manner, by displaying the rectangle 713 as the progress bar, the user is able to understand that a touch must be continued for a while in order to perform a lock. While the rectangle 713 is displayed as a progress bar in the present embodiment as a lock progress display, a remaining time or a progress rate (percentage) may be displayed by a numerical value. The icon 714 represents a character string reading "OFF" being displayed graved out. Accordingly, it is shown that the touch operation currently being accepted is for switching from the enabled state to the locked state (OFF) and, at the same time, "OFF" being grayed out indicates that the locked state (OFF) has not been reached at this moment.

In S545, the system control unit 50 determines whether or not the lock timer Tl has expired. When the lock timer Tl has expired, the system control unit 50 advances to S504 to perform a lock confirmation display and to make a transition to the locked state. When the lock timer Tl has not expired, the system control unit 50 advances to S546. As described above, in the present embodiment, a continuation time (Tl) of a touch with respect to the left-side portion 82L necessary for a lock is set longer than a continuation time (Tr) of a touch with respect to the left-side portion 82L necessary for a lock release. In addition, by making both touches long touches of a prescribed time or longer, switching between the locked state and the enabled state is prevented from being performed by an unintentional function of the user. When the continuation time (Tr) of a touch for releasing the locked state to switch to the enabled state is too long, the user is unable to perform quick operations and may end up missing a photographic opportunity. Therefore, Tr is set to 0.3 seconds or longer and shorter than 2 seconds so that a lock release operation does not take too much time while preventing erroneous operations. On the other hand, since a slide operation is also possible in the enabled state, there is a possibility that touch time increases due to indecision on the part of the user with respect to, for example, whether a finger should be slid after touch-down or whether a tap should be performed instead of a slide. Alternatively, when attempting to carefully perform a slide by a small slide amount, there is a possibility that a slide does not occur for a while after touch-down due to a slow touch-move. In this manner, even with a touch operation not intended to be a lock operation, a touch period may end up being longer in the enabled state than in the locked state. In such a case, a transition to the locked state against the intention of the user is a hassle since a touch operation intended by the user is no longer accepted. Therefore, T1 which is a time threshold of a lock operation is set to 2 seconds or longer and 5 seconds or shorter which is longer than Tr to reduce the possibility of an unintentional transition to the locked state. As described above, a configuration is adopted which enables a touch operation to be swiftly started by releasing a touch operation-restricted state (locked state) and, at the same time, which reduces the possibility that a touch operation is prevented from being performed due to an inadvertent transition to the restricted state (locked state).

In S546, the system control unit 50 determines whether or not a slide on the touch bar 82 has been performed in a similar manner to S520 without determining whether or not time measurement of Tc is in progress. When a slide has been performed, the system control unit 50 advances to S547, but otherwise the system control unit 50 advances to S550. Moreover, even when a slide has been performed, since a touch cancel event has already been issued, the calculation of the slide amount n, the update of the reference position Pref, the execution of a function assigned to a slide, and the slide response display are not performed. In other words, since the determination of a slide at this point is performed in order to determine whether or not a lock operation has been aborted, a slide as an execution trigger of an assigned function is ignored.

In S547, the system control unit 50 determines whether or not a lock progress display is being executed. When a lock progress display is being executed, the system control unit 50 advances to S548, but otherwise the system control unit 50 advances to S549.

In S548, the system control unit 50 hides the lock progress display (a display of the progress bar inside the bar indicator 702) displayed up to then on the display unit 28 or the EVF 29, and updates the display with the no operation display shown in FIG. 8A. Accordingly, the user can recognize that a left touch of a lock operation has been aborted and a standby state of the enabled state has been restored without performing a lock.

In S549, the system control unit 50 determines whether or not a touch-up from the touch bar 82 has been performed. The system control unit 50 waits until a touch-up is performed, and advances to S503 once a touch-up is performed. Since the present state is a state where a touch cancel event has been executed, an event other than a lock due to a left touch is not performed. In addition, since it has been determined in S546 that a slide has been performed, a lock operation due to a left touch also does not occur. Therefore, only a touch-up is awaited. Moreover, when the system control unit 50 advances to S503 from a touch cancel state, the process of S501 is not performed and Tn is not reset. This is because, since a touch cancel event has occurred and a lock operation due to a left touch has not been performed, it is assumed that the present touch is not a result of an intentional operation by the user but, rather, it can be considered that a state of non-operation substantially continues from the end of a previous operation.

In S550, the system control unit 50 determines whether or not a touch-up from the touch bar 82 has been performed.

When a touch-up has been performed, the system control unit 50 advances to S551, but otherwise the system control unit 50 advances to S553.

In S551, the system control unit 50 determines whether or not a lock progress display is being executed. When a lock progress display is being executed, the system control unit 50 advances to S552, but otherwise the system control unit 50 advances to S503.

In S552, the system control unit 50 clearly indicates that a left touch for a lock has ended prematurely by causing a display screen on the display unit 28 or the EVF 29 to transition from the screen shown in FIG. 7E to the screen shown in FIG. 8A. Subsequently, the system control unit 50 advances to S503.

In S553, the system control unit 50 determines whether or not the no-operation timer Tn has expired. When the no-operation timer Tn has expired, the system control unit 50 determines that a no-operation state has continued for a period corresponding to the no-operation timer Tn and advances to S504, but otherwise the system control unit 50 advances to S543. In this manner, after a touch cancel event occurs, a transition is made to the locked state upon expiration of Tn even if a touch-up has not been performed. As is apparent from FIGS. 5A to 5C, in a state where the invalid tinier Ti has not expired (No in S533), the no-operation timer Tn is reset (S501) in accordance a touch-up (Yes in S524 or S526). On the other hand, in a state where the invalid timer Ti has expired (Yes in S533), such control is not performed. Therefore, when there is a previous valid operation of the touch bar 82 in a state where the invalid timer Ti has expired, the no-operation timer Tn is measuring time from the valid operation.

Entire Surface Touch Start Determination Process

Figure 6:
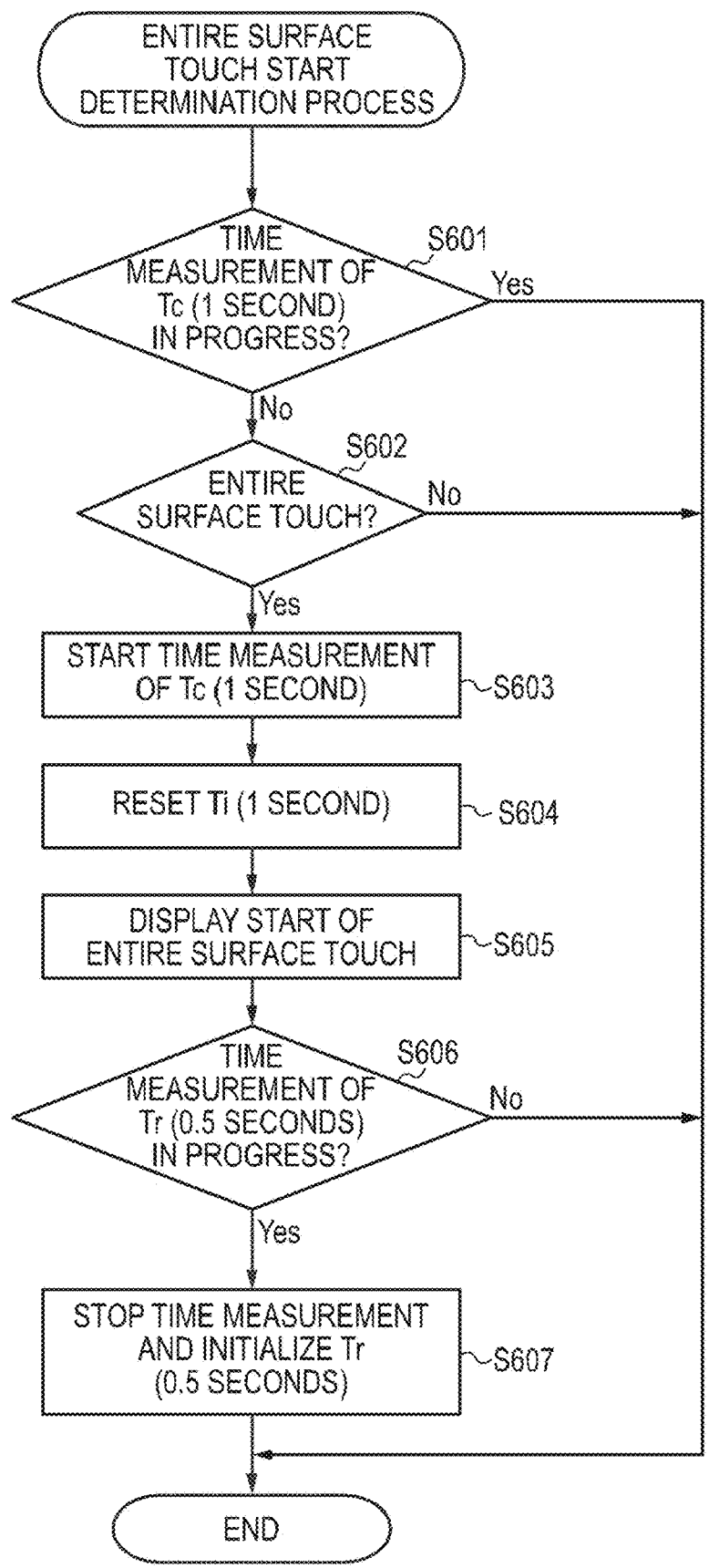
FIG. 6 is a flow chart of an entire surface touch start determination process.

FIG. 6 is a flow chart showing details of an entire surface touch start determination process. This process is realized as the system control unit 50 deploys a program recorded in the nonvolatile memory 56 on the system memory 52 and executes the program.

In S601, the system control unit 50 determines whether or not time measurement of the entire surface touch continuation timer Tc is in progress. When time measurement of the entire surface touch continuation timer Tc is in progress, since it can be assumed that an entire surface touch to the touch bar 82 has already started, the system control unit 50 ends the entire surface touch start determination process, but otherwise the system control unit 50 advances to S602.

In S602, the system control unit 50 determines whether or not an entire surface touch to the touch bar 82 has been performed. As described earlier, the system control unit 50 reads voltage (a voltage output value) of each of the touch sensor electrodes 302a, 302b, and 302c. When a voltage variation amount (a variation amount of voltage from a base voltage exceeds the entire surface touch determination threshold for all of the touch sensor electrodes 302a, 302b, and 302c, the system control unit 50 determines that a finger is covering the entire surface of the touch bar 82 and determines the touch operation as an entire surface touch. Details of the entire surface touch determination threshold will be provided later with reference to FIGS. 9A to 9C. The system control unit 50 advances to S603 when an entire surface touch has been performed but otherwise ends the entire surface touch start determination process, but if the touch continues and the entire surface touch determination timer Ta does not end, the entire surface touch start determination process is to be performed once again.

In S603, with the start of an entire surface touch, the system control unit 50 starts time measurement of the entire surface touch continuation timer Tc. In this case, the entire surface touch start determination process after the time measurement of the entire surface touch continuation timer Tc is started does not advance to S602 as a result of the determination in S601. By adopting such a flow, even if a contact state of a finger changes after it is determined that an entire surface touch has been performed and the voltage variation amount falls below the entire surface touch determination threshold, an end of the entire surface touch is not determined. In other words, when it is once determined during the time measurement of the entire surface touch determination timer Ta that an entire surface touch has been performed, the entire surface touch is considered continuing even when the voltage variation amount falls below the entire surface touch determination threshold.

In S604, the system control unit 50 resets the invalid tinier Ti.

In S605, the system control unit 50 performs an entire surface touch start display on the display unit 28 or the EVF 29 in order to visually inform the user that a state where an entire surface touch is being performed on the touch bar 82 is in effect. FIG. 8E shows a display example of an entire surface touch start display. By displaying a rectangle 805 across the entire surface of the bar indicator 702, the user can recognize that an entire surface touch is being performed.

In S606, the system control unit 50 determines whether or not time measurement of the lock release timer Tr is in progress. When time measurement of the lock release timer Tr is not in progress, the system control unit 50 ends the entire surface touch start determination process, but otherwise the system control unit 50 advances to S607.

In S607, the system control unit 50 stops the time measurement of the lock release timer Tr and initializes the lock release timer Tr.

A transition of screens for response display in accordance with operations to the touch bar 82 which are realized by the processes in FIGS. 4A, 4B, and 5A to 5C described above will now be explained with reference to FIGS. 7A to 7F and FIGS. 8A to 8F. In this case, it is assumed that a function of reducing the ISO value by ⅓ stages is assigned to a left tap of the touch bar 82, a function of increasing the ISO value by ⅓ stages is assigned to a right tap of the touch bar 82, and a function of increasing or reducing the ISO value by ⅓ stages for each slide stage is assigned to a slide of the touch bar 82.

When the digital camera 100 is activated in the photography mode, since an initial state is the locked state, the photography standby screen shown in FIG. 7A is displayed but the bar indicator 702 is not displayed. Touching the left-side portion 82L from this state causes a lock release progress display to be performed as shown in FIG. 7B. When the touch to the left-side portion 82L is continued and the lock is released, a lock release confirmation display is performed as shown in FIG. 7C. When the touch is released while the lock release progress display shown in FIG. 7B is being displayed, the lock release progress display is aborted, the bar indicator 702 is displayed as shown in FIG. 7D for a prescribed amount of time, and the bar indicator 702 is hidden after the prescribed amount of time (after a lapse of Td) and the display state shown in FIG. 7A is restored. Conversely, touching the left-side portion 82L in the enabled state causes a lock progress display to be performed as shown in FIG. 7E. When the touch to the left-side portion 82L is continued and the lock is in effect, a lock confirmation display is performed as shown in FIG. 7F.

In the enabled state, the bar indicator 702 is always displayed as shown in FIG. 8A even when a touch is not being performed (in other words, regardless of whether or not a touch operation is being performed). Touching the left-side portion 82L from this state causes a touch start display to be performed as shown in FIG. 8B. When the touch is promptly released in this state, the tap confirmation display shown in FIG. 8C or FIG. 8F is performed. When a slide is performed from the state shown in FIG. 8B, the slide response display shown in FIG. 8D is performed. The display in FIG. 8E is performed when an entire surface touch is started from the state shown in FIG. 8A. As described above, since response displays are performed so as to enable the user to recognize what is being performed with respect to various operations to the touch bar 82, the user can perform operations while confirming which operation is being recognized by the apparatus. In particular, when operations are being performed while bringing the eye into contact with the finder 17, since the touch bar 82 is not directly visible, which position is being touched cannot be confirmed by directly looking at the touch bar 82. However, since the operations can be performed while viewing these response displays that are displayed on the EVF 29, even when the eye is in contact with the finder 17, the user can comfortably perform operations without any doubt as to which position is being touched and what kind of operation is being detected. Accordingly, quick changes to the photographic settings can be made using the touch bar 82 even while looking into the finder and photography can be performed at the photographic settings intended by the user without missing out on photographic opportunities.

Entire Surface Touch Determination Threshold

Figure 9A:
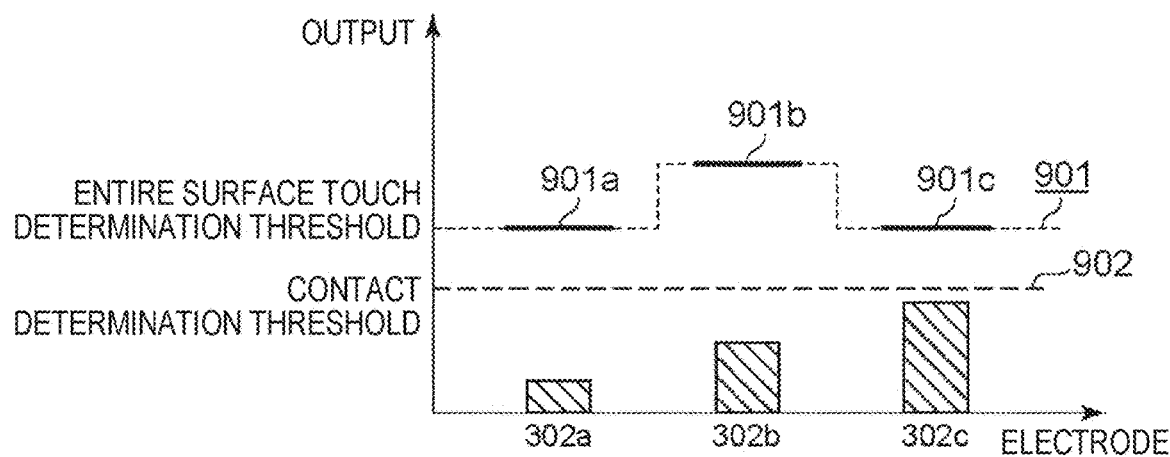
FIGS. 9A to 9C are diagrams showing details of an entire surface touch determination threshold.
Figure 9B:
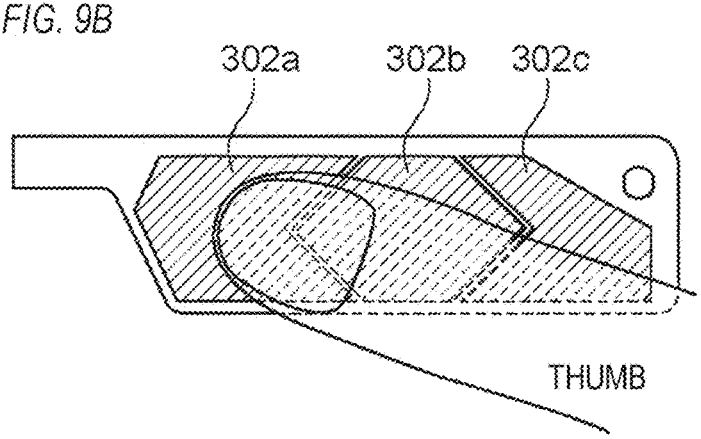

Next, an entire surface touch determination threshold in each touch sensor electrode of the touch bar 82 will be described with reference to FIGS. 9A to 9C. FIG. 9A shows an example of an entire surface touch determination threshold 901. The entire surface touch determination threshold 901 is set for each electrode, and entire surface touch determination thresholds 901a, 901b, and 901c are respectively set for the touch sensor electrodes 302a, 302b, and 302c. The entire surface touch determination thresholds 901a, 901b, and 901c will be collectively referred to as the entire surface touch determination threshold 901. The entire surface touch determination threshold 901b is larger than the entire surface touch determination thresholds 901a and 901c. In addition, while the entire surface touch determination thresholds 901a and 901c have the same value in the present embodiment, different values may be adopted in accordance with an arrangement or a shape of the touch bar 82. The entire surface touch determination thresholds 901a, 901b, and 901c are all larger than a contact determination threshold 902. As described earlier in all of the touch sensor electrodes 302a, 302b, and 302c, when a voltage variation amount (a variation amount of voltage from a base voltage) equals or exceeds an entire surface touch determination threshold corresponding to each electrode, it is determined that a finger is covering the entire surface of the touch bar 82. In this case, a state is created where a detected value equal to or exceeding the entire surface touch determination threshold 901 is detected in a range (a prescribed range or more) of the touch sensor electrodes 302a to 302c among the plurality of touch sensor electrodes. In addition, when a prescribed period of time (Tc) elapses after this condition is satisfied without a touch-up or a slide, the touch operation is determined as an entire surface touch. Moreover, the voltage variation amount detected by each detecting electrode is a detected value which increases as a finger that is an operating body approaches. FIG. 9A also shows the contact determination threshold 902. When the voltage variation amount of any of the touch sensor electrodes 302a, 302b, and 302c exceeds the contact determination threshold 902, a finger is determined to be in contact (touch-on) with the touch bar 82.

As shown in FIG. 9A, the entire surface touch determination threshold 901 is set larger than the contact determination threshold 902. In other words, a threshold related to a determination of a function activated by a touch of a large contact area (contact size) which is equal to or larger than a prescribed value is set larger than a threshold related to a determination of a function activated by a touch of a small contact area which is smaller than the prescribed value. Accordingly, an erroneous operation determined as an entire surface touch can be prevented. For example, even when a ball of a finger of the user approaches the right side of the touch bar 82 when the user performs a touch-down on the left side of the touch bar 82 with the right hand, since the entire surface touch determination threshold 901 is larger than the contact determination threshold 902, it is unlikely that the approach is to be erroneously determined as an entire surface touch. Moreover, when the user intentionally performs an entire surface touch, the user is more likely to securely cover the entire surface of the touch bar 82. Therefore, since a contact area of the finger in a keytop portion on each electrode increases, voltage or a voltage variation amount of each touch sensor electrode increases as compared to a normal touch-down. Therefore, even when the entire surface touch determination threshold 901 is set larger than the contact determination threshold 902, an intentional entire surface touch can be properly detected.

When the user performs an entire surface touch by, for example, starting contact with the touch bar 82 from a ball of a finger and finally bringing the fingertip into contact with the touch bar 82, a rise in voltage is slowest in the touch sensor electrode 302a. In this case, a start of the entire surface touch is determined when the voltage variation amount of the touch sensor electrode 302a exceeds the entire surface touch determination threshold 901. Conversely, when the user starts contact with the touch bar 82 from a fingertip and finally brings the ball of the finger into contact with the touch bar 82, a start of the entire surface touch is determined when the voltage variation amount of the touch sensor electrode 302c exceeds the entire surface touch determination threshold 901.

In addition, the touch bar 82 is arranged so that an entire surface touch is performed by obliquely extending the thumb of the right hand gripping the grip portion 90. Therefore, when performing an entire surface touch, depending on a shape or a peculiarity of a finger, respective touch areas of the touch sensor electrodes 302a and 302c may become smaller than the touch area of the touch sensor electrode 302b as shown in FIG. 9B. In this case, the respective voltage variation amounts of the touch sensor electrodes 302a and 302c become smaller than the voltage variation amount of the touch sensor electrode 302b.

Figure 9C:
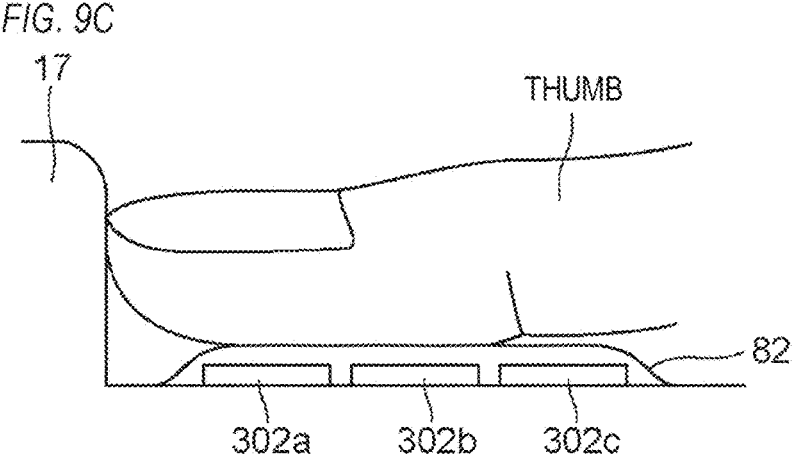

Furthermore, when performing an entire surface touch, depending on a shape or a peculiarity of a finger, a finger may separate from the touch bar 82 in a portion close to the fingertip or a joint as shown in FIG. 9C. In addition, since the finder 17 (projected portion) is located ahead of the touch bar 82, a fingertip may strike the finder 17 when touching the touch bar 82 and the finger may become more readily separated from the touch bar 82 on the side of the finder 17 (on a fingertip side). These factors also cause the respective touch areas of the touch sensor electrodes 302a and 302c to become smaller than the touch area of the touch sensor electrode 302b and the respective voltage variation amounts of the touch sensor electrodes 302a and 302c to become smaller than the voltage variation amount of the touch sensor electrode 302b.

Therefore, having the touch sensor electrodes 302a, 302b, and 302c share an entire surface touch determination threshold may result in a longer period of time until a determination that an entire surface touch has started is made or may prevent an entire surface touch from being determined with high accuracy. In consideration thereof, as shown in FIG. 9A, the entire surface touch determination threshold 901 is set such that the entire surface touch determination threshold of each of the touch sensor electrodes 302a and 302c is smaller than the entire surface touch determination threshold of the touch sensor electrode 302b. In other words, the entire surface touch determination threshold of end-side electrodes of the touch bar 82 is set smaller than the entire surface touch determination threshold of a center-side electrode of the touch bar 82. Moreover, end-side electrodes refer to electrodes arranged at an end in a first direction (for example, a rightward direction) and an end in an opposite direction (for example, a leftward direction) which are parallel to the keytop (a detection surface) of the touch bar 82 among a plurality of detecting electrodes. Accordingly, the period of time until a determination that an entire surface touch has started is made can be reduced and an entire surface touch can be determined with high accuracy. In addition, reducing the period of time until a determination that an entire surface touch has started is made enables the entire surface touch determination timer Ta to be shortened. Since a slide determination is not performed during the entire surface touch determination timer Ta, making the entire surface touch determination timer Ta shorter contributes toward improving operability of a slide.

As described above, by setting the entire surface touch determination threshold lamer than the contact determination threshold and setting the entire surface touch determination threshold of an end-side electrode smaller than the entire surface touch determination threshold of a center electrode, erroneous operations of the touch bar 82 can be reduced and, at the same time, operability of the touch bar 82 can be improved. Moreover, setting the entire surface touch determination threshold larger than the contact determination threshold may be applied to a touch operation member which realizes touch sensing (touch detection) according to another system. For example, setting the entire surface touch determination threshold larger than the contact determination threshold may be applied to a touch panel adopting a pressure-sensitive system, and when a detected value increases as pressure of a touch increases, a threshold for determining a touch when pressure is applied to a wide area may be set larger than a threshold for determining a touch when pressure is applied to a small area, and an end threshold may be set smaller than a center threshold. Moreover, the term entire surface touch as is used in the present embodiment refers to a touch performed over a wider area than a touch performed over a normal area and is not limited to an operation involving touching an entire touch detection surface as long as the touch is detected in distinction from a touch with a normal area.

Process when Always Usable

FIGS. 10A and 10B are flow charts showing details of a control process when the touch bar 82 is always usable. This process is realized as the system control it 50 deploys a program recorded in the nonvolatile memory 56 on the system memory 52 and executes the program. When the M-Fn bar erroneous operation prevention function is set to "disabled (always usable)", the process shown in FIGS. 10A and 10B is performed instead of the processes in FIGS. 4A, 4B, and 5A to 5C (the M-Fn bar erroneous operation prevention function will be described later). When the erroneous operation prevention function is set to "disabled (always usable)", immediacy of an operation is prioritized over erroneous operation prevention and an operation can be swiftly performed without having to perform a lock release operation and the like.

Since S1000 to S1003 are processes respectively similar to S400 to S403 in FIG. 4A, a description thereof will be omitted.

In S1004, the system control unit 50 starts time measurement of the entire surface touch determination timer Ta and time measurement of the invalid timer Ti.

Since S1005 to S1012 are processes respectively similar to S511 to S518 in FIG. 5A, a description thereof will be omitted. However, the system control unit 50 advances to S1000 after the process of S1010 or S1012.

In S1020, the system control unit 50 determines whether or not a function has already been assigned to a touch operation (a slide or a tap) on the touch bar 82 in a similar manner to S413 in FIG. 4A. When a function has already been assigned, the system control unit 50 advances to S1021, but otherwise the system control unit 50 advances to S1040. Since the process of S413 described earlier is a process when the touch bar 82 is in the locked state, the process is performed when a left touch of the touch bar 82 is performed. However, when the touch bar 82 is always operable, a determination of whether or not a function has already been assigned may be performed when another touch operation is performed. Therefore, the process of S1020 is to be performed regardless of a location of a touch-down on the touch bar 82. Moreover, in order to ignore touch-downs that are not intentional, the determination of S1020 may be performed only when a left touch is performed in a similar manner to the locked state.

In S1021, the system control unit 50 performs a process (the determination of whether or not a slide on the touch bar 82 has been performed, the calculation of the slide amount n, the update of the reference position Pref, and the like) similar to S520 in FIG. 5B with the exception of the determination of whether or not time measurement of Tc is in progress. When a slide has been performed, the system control unit 50 advances to S1022, but otherwise the system control unit 50 advances to S1026.

In S1022, by displaying a screen such as that shown in FIG. 8D on the display unit 28 or the EVF 29 in a similar manner to S522 in FIG. 5B, the system control unit 50 clearly indicates to the user that a slide determination has been made. While the lock timer Tl is reset in S521 and the screen shown in FIG. 8D is displayed in S522 When it is determined in S520 that a slide has been performed in FIG. 5B described earlier, when the touch bar 82 is always operable, the lock timer Tl is not operated. Therefore, when it is determined in S1021 that a slide has been performed, the screen shown in FIG. 8D is displayed in S1022 without resetting the lock timer Tl.

S1023, S1024, and S1025 are respectively similar to S523, S524, and S525 in FIG. 5B.

In S1026, the system control unit 50 determines whether or not a touch-up from the touch bar 82 has been performed in a similar manner to S526 in FIG. 5B. When a touch-up has been performed, the system control unit 50 determines that a tap has been performed because the invalid tinier Ti has not expired and advances to S1027, but otherwise the system control unit 50 advances to S1029.

In S1027, the system control unit 50 displays the fact that a tap has been confirmed on the display unit 28 or the EVF 29 in a similar manner to S529 in FIG. 5B. While the lock timer Tl is reset in S527 and a tap confirmation display is performed in S529 when it is determined in S526 that a touch-up has been performed in FIG. 5B, when the touch bar 82 is always operable, the lock timer Tl is not operated. Therefore, when it is determined in S1026 that a touch-up has been performed, a tap confirmation display is performed in S1027 without resetting the lock timer Tl.

S1028, S1029, S1031, and S1032 are respectively similar to S530, S531, S533, and S540 in FIG. 5B. While the lock timer Tl is reset in S532 and the system control unit 50 advances to the M-Fn bar customization setting process when it is determined in S531 that the entire surface touch continuation timer Tc has expired in FIG. 5B, when the touch bar 82 is always operable, the lock timer Tl is not operated. Therefore, when it is determined in S1029 that the entire surface touch continuation timer Tc has expired, the system control unit 50 advances to the M-Fn bar customization setting process without resetting the lock timer Tl.

In S1033, the system control unit 50 displays a screen such as that shown in FIG. 7D or FIG. 8A on the display unit 28 or the EVF 29.

In S1034, the system control unit 50 starts time measurement of the item deletion tinier Td. Subsequently, the system control unit 50 advances to S1001. In FIGS. 4A, 4B, and 5A to 5C, a screen display (display of the fact that the touch bar 82 is not touched) such as that shown in FIG. 7D is switched between temporary display and maintaining display in accordance with switching between the locked state and the enabled state of the touch bar 82 in order to indicate whether or not the touch bar 82 is operable. However, when the touch bar 82 is always operable, since there is no need to indicate whether or not the touch bar 82 is operable, there is also no need to maintain display of the fact that the touch bar 82 is not touched. In addition, as described earlier, as less unnecessary items as possible are desirably displayed on the live view image. Therefore, in FIG. 10, time measurement of the item deletion timer Td is promptly started after display of the screen shown in FIG. 7D or FIG. 8A.

S1040 and S1041 are respectively similar to S414 and S406 in FIG. 4A. However, in S1041, the system control unit 50 advances to S1000 when a touch-up has been performed, but otherwise the system control unit 50 advances to S1042.

In S1042, the system control unit 50 determines whether or not the entire surface touch continuation timer Tc has expired. When the entire surface touch continuation timer Tc has expired, the system control unit 50 advances to the M-Fn bar customization setting process, but otherwise the system control unit 50 advances to S1041.

M-Fn Bar Guide Display Determination Process

Figure 11:
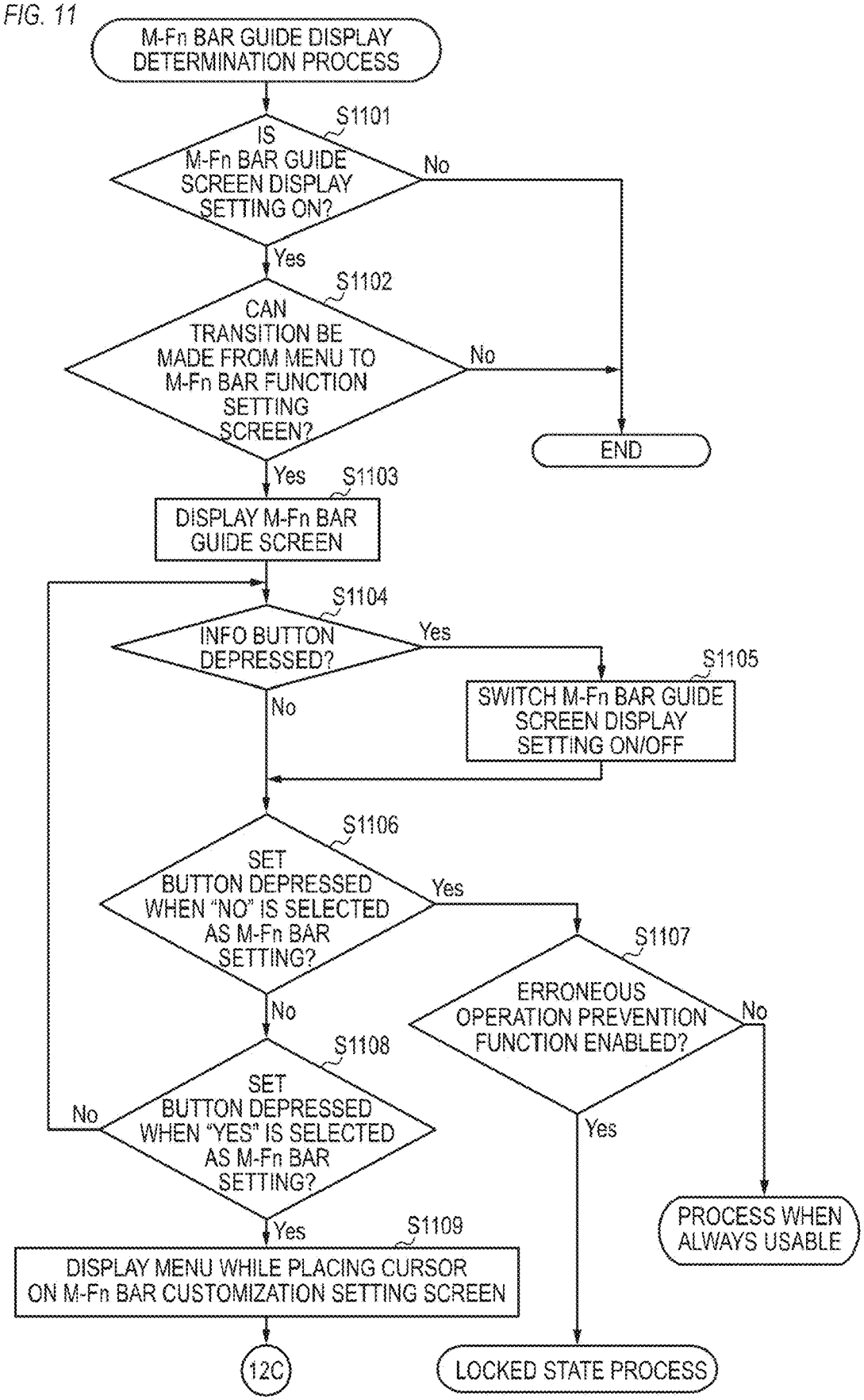
FIG. 11 is a flow chart of an M-Fn bar guide display determination process.

FIG. 11 is a flow chart showing details of the M-Fn bar guide display determination process in S414 in FIG. 4A and S1040 in FIG. 10A described earlier. This process is realized as the system control unit 50 deploys a program recorded in the nonvolatile memory 56 on the system memory 52 and executes the program.

In S1101, the system control unit 50 determines whether or not an M-Fn bar guide screen display setting is ON. When the M-Fn bar guide screen display setting is ON, the system control unit 50 advances to S1102, but otherwise the M-Fn bar guide display determination process is ended. The M-Fn bar guide screen display setting can be configured by a user operation in S1105 to be described later, and setting contents are recorded in the nonvolatile memory 56.

In S1102, the system control unit 50 determines whether or not a transition can be made from the menu screen (a setting menu screen) to the M-Fn bar customization setting screen. When a transition can be made, the system control unit 50 advances to S1103, but otherwise the M-Fn bar guide display determination process is ended. For example, there is a function named My Menu that enables a user to register an item of the menu screen. In addition, there is a setting item named "display only My Menu" which causes, when the menu screen is displayed by depressing the menu button 81, only My Menu to be displayed and a normal menu screen constituted by menu items set in advance to be hidden. When the "display only My Menu" setting is enabled, the normal menu screen including a menu item named the "M-Fn bar customization setting screen" is not displayed. Therefore, the system control unit 50 determines that a transition cannot be made from the menu screen to the M-Fn bar customization setting screen (No in S1102).

In S1103, the system control unit 50 displays an M-Fn bar guide screen (a guide screen prompting assignment of a function) such as that shown in FIG. 13A on the display unit 28 or the EVF 29.

In S1104, the system control unit 50 determines whether or not an INFO button included in the operating unit 70 has been depressed. In other words, this is a determination as to whether or not an operation for switching the M-Fn bar guide screen display setting on or off has been performed. A determination that the INFO button has been depressed is also made when there is a touch operation with respect to an INFO button icon 1301. When the INFO button has been depressed, the system control unit 50 advances to S1105, but otherwise the system control unit 50 advances to S1106.

In S1105, the system control unit 50 switches the M-Fn bar guide screen display setting on or off and records the setting in the system memory 52 or the nonvolatile memory 56. When the M-Fn bar guide screen display setting is on, a check box 1302 of the M-Fn bar guide screen is checked, but when the M-Fn bar guide screen display setting is off, the check box 1302 is unchecked.

In S1106, the system control unit 50 determines whether or not the SET button 75 has been depressed in a state where a "No" button 1303 for not performing M-Fn bar customization is selected. When the SET button 75 has been depressed in a state where the "No" button 1303 is selected, the system control unit 50 advances to S1107, but otherwise the system control unit 50 advances to S1108.

In S1107, the system control unit 50 determines whether or not the M-Fn bar erroneous operation prevention function is set to "enabled (temporarily usable)". When the M-Fn bar erroneous operation prevention function is set to "enabled (temporarily usable)", the system control unit 50 advances to the locked state process shown in FIGS. 4A and 4B, but otherwise (when the M-Fn bar erroneous operation prevention function is set to "disabled (always usable)"), the system control unit 50 advances to the process when always usable shown in FIGS. 10A and 10B.

In S1108, the system control unit 50 determines whether or not the SET button 75 has been depressed in a state where a "Yes" button 1304 for performing M-Fn bar customization is selected. When the SET button 75 has been depressed in a state where the "Yes" button 1304 is selected, the system control unit 50 advances to S1109, but otherwise the system control unit 50 advances to S1104.

Figure 12A:
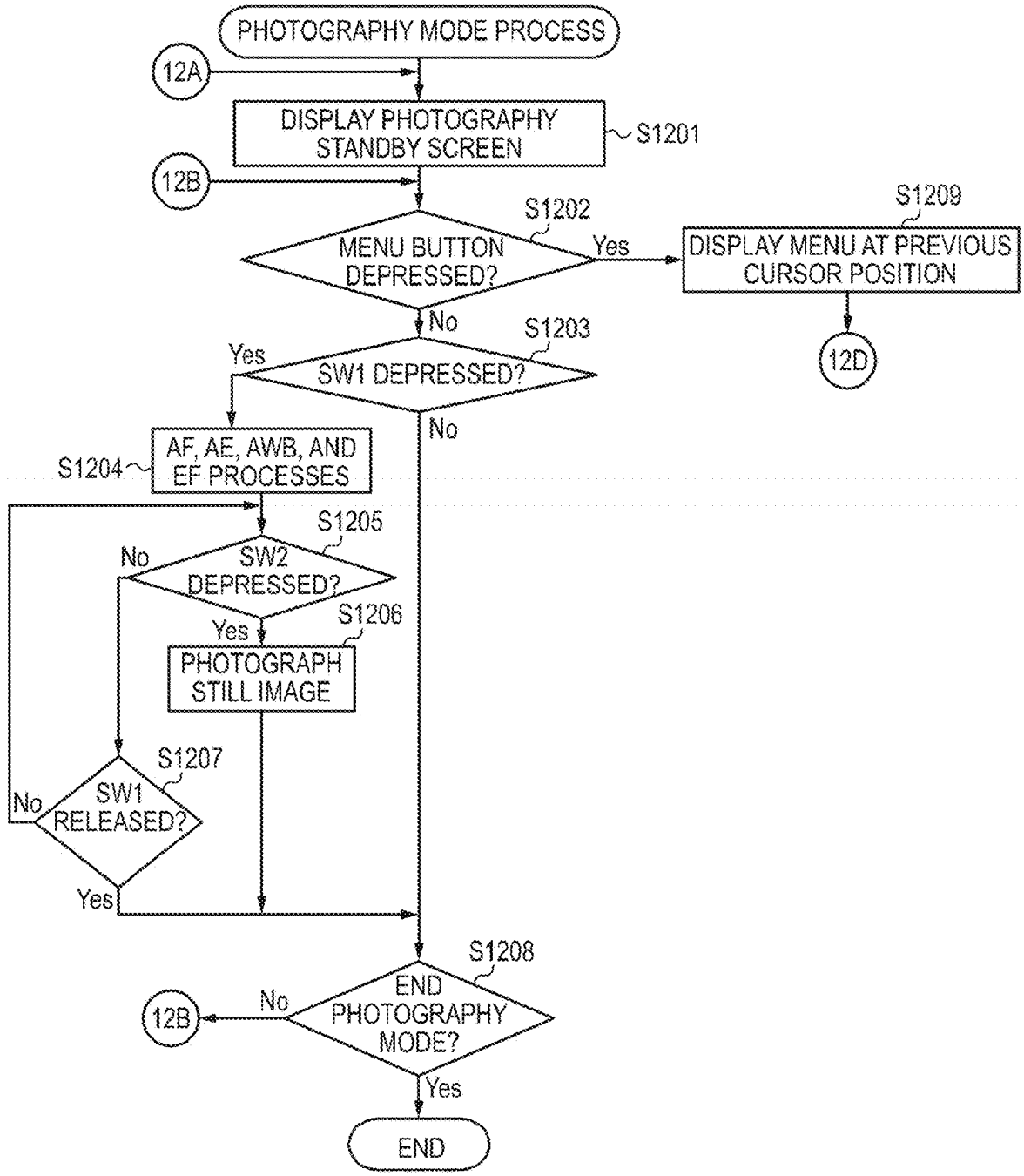
FIGS. 12A and 12B are flow charts of a photography mode process.
Figure 12B:
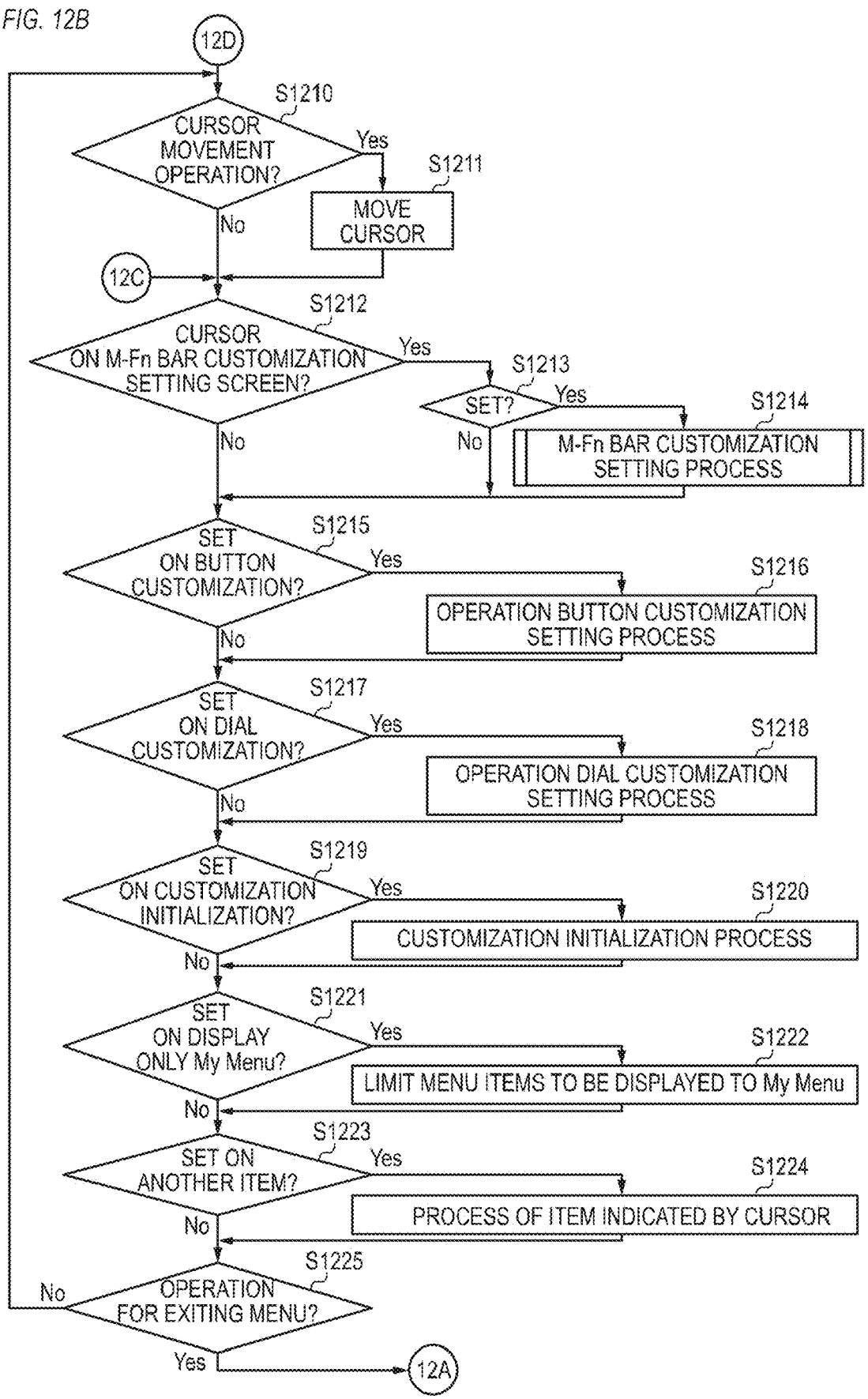
Figure 13B:
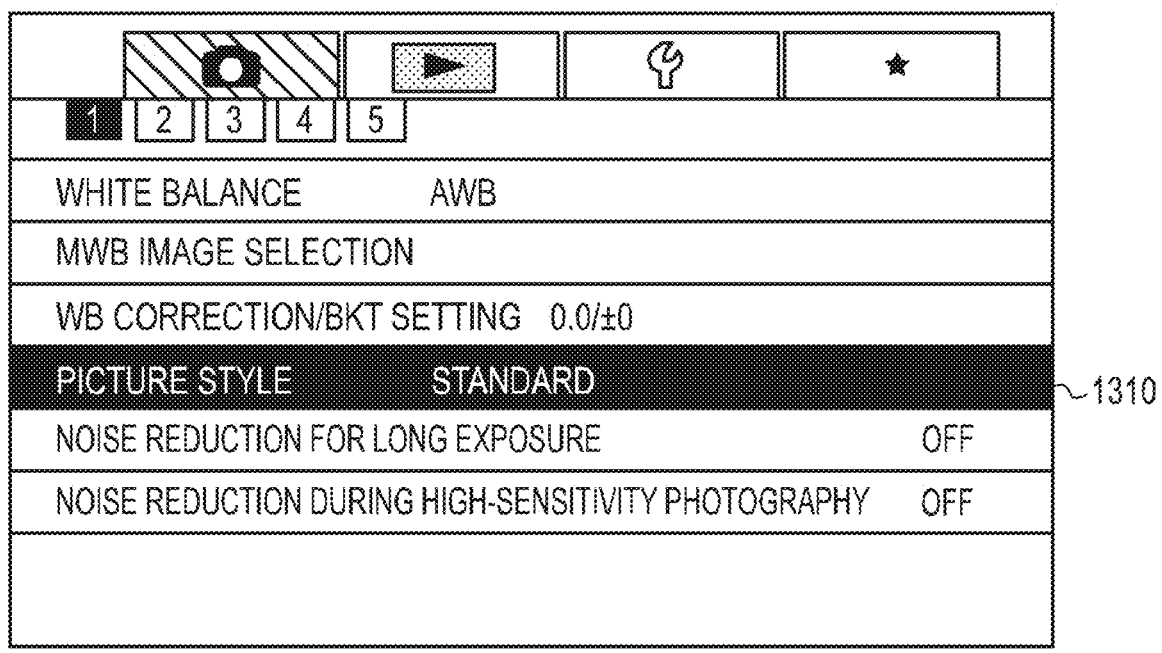
FIG. 13B represents a display example of a menu screen.
Figure 13C:
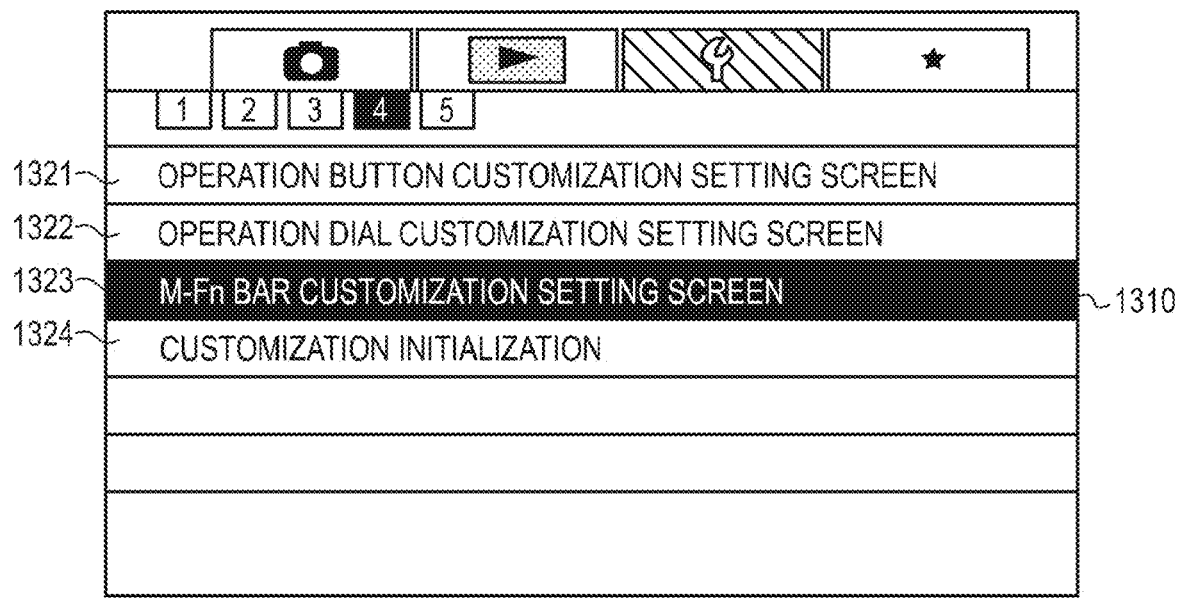
FIG. 13C represents a display example of a menu screen.

In S1109, the system control unit 50 displays a menu screen in a state where a cursor 1310 is positioned on an item 1323 of the M-Fn bar customization setting screen as shown in FIG. 13C on the display unit 28 or the EVF 29. In other words, the menu screen is displayed by highlighting the item 1323 of the M-Fn bar customization setting screen so that the item 1323 can be distinguished from other menu items. Subsequently, the system control unit 50 advances to S1212 in FIG. 12B. Performing display as shown in FIG. 13C enables operations including depressing the menu button 81 for displaying the menu screen, moving a cursor, and selecting the item 1323 to be omitted before making a transition to the M-Fn bar customization setting screen. In addition, instead of making a transition from the M-Fn bar guide screen directly to the M-Fn bar customization setting screen, the menu screen in a state where the cursor 1310 is positioned on the item 1323 of the M-Fn bar customization setting screen is temporarily displayed. Accordingly, the user can readily realize that a transition can be made to the M-Fn bar customization setting screen from the menu screen displayed by depressing the menu button 81. In other words, even when a transition is made to the M-Fn bar customization setting screen according to an irregular procedure, the user is able to recognize a regular procedure in which the menu button 81 is depressed to display the menu screen and then a transition is made to the M-Fn bar customization setting screen. As described earlier, the M-Fn bar guide screen is displayed only in a state where a function is unassigned to the touch bar 82. Therefore, after assigning a function from the M-Fn bar customization setting screen, a transition from the M-Fn bar guide screen to the M-Fn bar customization setting screen can no longer be made. However, performing a display such as that shown in FIG. 13C when making a transition from the M-Fn bar guide screen to the M-Fn bar customization setting screen causes the user to recognize a regular procedure in which the menu button 81 is depressed. Therefore, even after assigning a function, the user can make a transition to the M-Fn bar customization setting screen without hesitation by selecting the item 1323 of the M-Fn bar customization setting screen after depressing the menu button 81 and displaying the menu screen, and perform a setting change operation.

In the present embodiment, an example has been described in which, when the M-Fn bar guide screen that is displayed in response to a start of a touch on the left-side portion 82L of the touch bar 82 is being displayed, the screen shown in FIG. 13C is displayed in accordance with an operation involving selecting the "Yes" button 1304 and depressing the SET button 75. However, a trigger operation for displaying the screen shown in FIG. 13C may be another operation as long as the operation enables a transition to be made to the M-Fn bar customization setting screen without depressing the menu button 81. For example, a transition may be made to the screen shown in FIG. 13C without displaying the M-Fn bar guide screen in accordance with an operation with respect to the touch bar 82.

Figure 14:
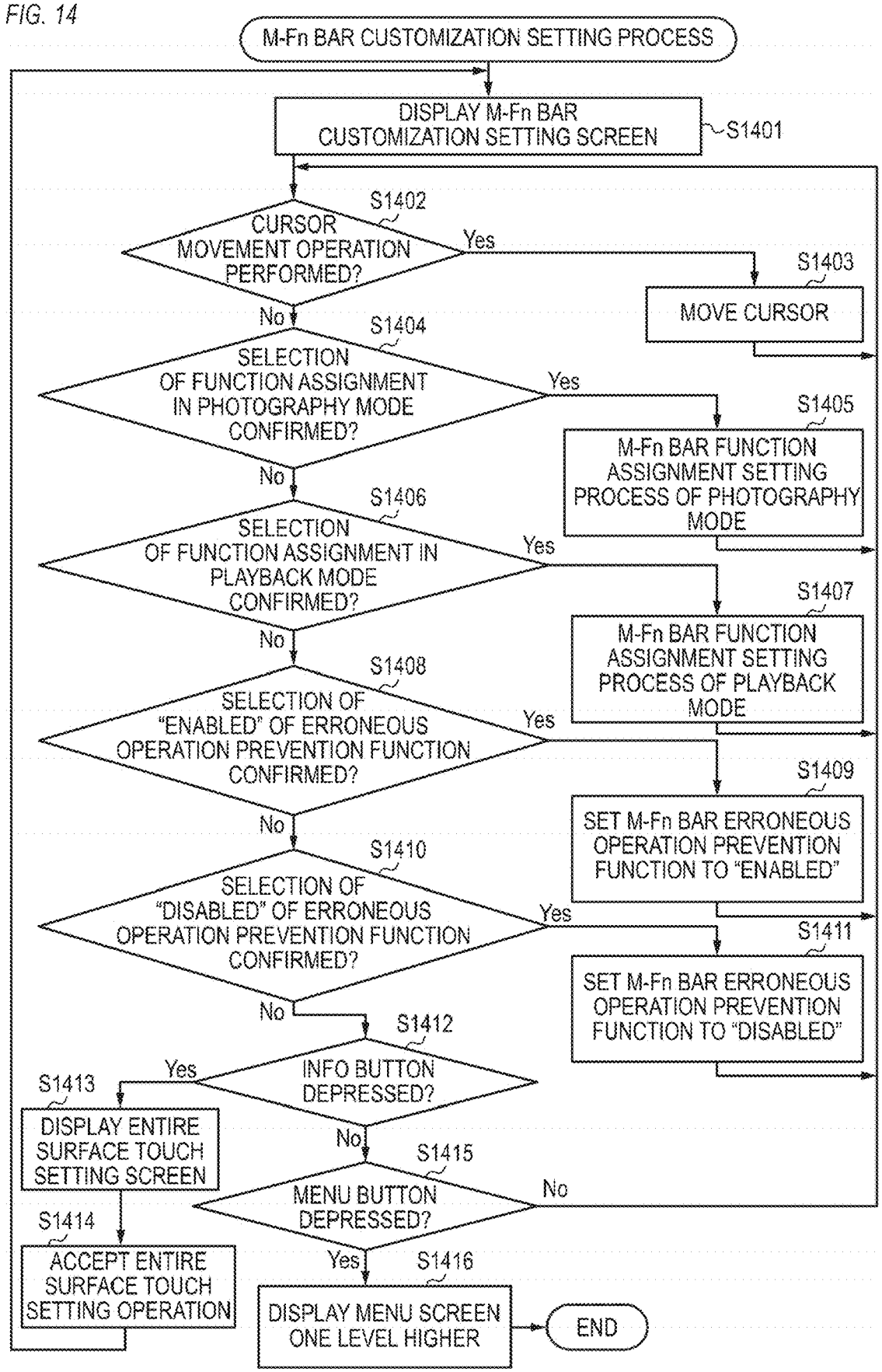
FIG. 14 is a flow chart of an M-Fn bar customization setting process.

In addition, while an example of advancing to S1212 in FIG. 12B after displaying the screen shown in FIG. 13C in S1109 has been described in the present embodiment, the M-Fn bar customization setting screen may be displayed by automatically advancing to S1401 in FIG. 14 after the lapse of a prescribed amount of time (a few seconds).

Furthermore, while a case of making a transition to the M-Fn bar customization setting screen for assigning a function to the touch bar 82 has been described, this case is not restrictive and the transition can be also applied to other setting items. In other words, the transition is applicable to cases where, with respect to a specific setting item of which a setting change can be performed on a specific setting screen under a hierarchy in which a menu item had been selected from the menu screen, a transition is made to the specific setting screen without depressing the menu button 81 from a state where the menu screen is not displayed. In this case, instead of making a transition directly to the specific setting screen, a menu screen is displayed and a menu item of the specific setting screen is highlighted. Accordingly, the user can recognize how to advance to the specific setting screen when the menu screen is displayed by a normal procedure including depressing the menu button 81.

Photography Mode Process

FIGS. 12A and 12B are flow charts showing details of a photography mode process performed in the digital camera 100. This process is realized as the system control unit 50 deploys a program recorded in the nonvolatile memory 56 on the system memory 52 and executes the program. The process shown in FIGS. 12A and 12B is started when the photography mode is set. Moreover, it is assumed that the processes related to the touch bar 82 described with reference to FIGS. 4A to 10B are being performed in parallel to the process shown in FIGS. 12A and 12B.

In S1201, the system control unit 50 starts live view photography by the imaging unit 22 and displays a photography standby screen on the display unit 28 or the EVF 29. A display example of a photography standby screen is as described with reference to FIG. 7A.

In S1202, the system control unit 50 determines whether or not the menu button 81 has been depressed. When the menu button 81 has been depressed, the system control unit 50 advances to S1209, but otherwise the system control unit 50 advances to S1203.

In S1203, the system control unit 50 determines whether or not the shutter button 61 has been half-pressed and the first shutter switch signal SW1 has been generated. When the first shutter switch signal SW1 has been generated, the system control unit 50 advances to S1204, but otherwise the system control unit 50 advances to S1208.

In S1204, in accordance with the first shutter switch signal SW1, the system control unit 50 starts a photography preparation operation of an AF (automatic focusing) process, an AE (automatic exposure) process, an AWB (automatic white balance) process, an EF (preliminary light emission before flash) process, and the like. When a setting value such as a shutter speed value is changed using the touch bar 82, the changed setting value is reflected on the photography preparation operation.

In S1205, the system control unit 50 determines whether or not the shutter button 61 has been full-pressed and the second shutter switch signal SW2 has been generated. When the second shutter switch signal SW2 has been generated, the system control unit 50 advances to S1206, but otherwise the system control unit 50 advances to S1207.

In S1206, in accordance with various configured photographic settings, the system control unit 50 starts a series of operations of a still image photography process from reading a signal from the imaging unit 22 to writing a captured image into the recording medium 200 as an image file. When a setting value such as an ISO value is changed using the touch bar 82, the changed setting value is reflected on the still image photography process.

In S1207, the system control unit 50 determines whether or not the half-press on the shutter button 61 has been released. When the half-press on the shutter button 61 has been released, the system control unit 50 advances to S1208, but otherwise the system control unit 50 advances to S1205.

In S1208, the system control unit 50 determines whether or not the photography mode is to be ended. When the photography mode is to be ended, the system control unit 50 ends the photography mode, but otherwise the system control unit 50 advances to S1202.

In S1209, the system control unit 50 displays the menu screen on the display unit 28 or the EVF 29 so that a cursor is displayed at a previous cursor position stored in the system memory 52. FIG. 13B shows an example of a menu screen on which a cursor is placed on a previous cursor position. On the menu screen, a plurality of large tabs (a top layer, first layer options), a plurality of small tabs (first layer options) corresponding to a selected large tab, and a plurality of menu items (third layer options) as a menu screen corresponding to a selected small tab are displayed. As the large tabs, a photographic setting tab, a playback setting tab, a device setting tab, and a My Menu tab are displayed from the left in this order, and the photographic setting tab is selected in the example shown in FIG. 13B. Five small tabs from 1 to 5 belong to the photographic setting tab, and a plurality of menu items are associated with each small tab. When a small tab is selected, a list of menu items corresponding to the selected small tab is displayed. In the example shown in FIG. 13B, among the small tabs included in the photographic setting tab, the small tab of "1" is selected and a plurality of corresponding menu items are displayed. The cursor 1310 is a selection frame for selecting any of a plurality of menu items, and in the example shown in FIG. 13B, the cursor 1310 is placed on the menu item "picture style". Moreover, when "display only My Menu tab" is set, the photographic setting tab, the playback setting tab, and the device setting tab among the large tabs are hidden and only the My Menu tab is displayed. While the present embodiment describes an example in which, when displaying the menu screen in S1209 in response to the menu button 81 being depressed, the menu screen is displayed at a previous cursor position (in other words, in a state where a previously last-selected menu item is selected), this example is not restrictive. A menu screen may be displayed by selecting a menu item satisfying a condition that the menu item is a top menu item of a menu screen or a menu screen may be displayed without selecting any menu item.

In S1210, the system control unit 50 determines whether or not each operation member of the operating unit 70 has been operated and a movement of the cursor 1310 has been instructed. A cursor movement instruction can be issued by performing a touch operation, rotating the sub electronic dial 73, or operating the four-way key 74. When there is a desired menu item in a plurality of menu items currently being displayed, the user can either touch the item, rotate the sub electronic dial 73, or operate the upward and downward key of the four-way key 74 to move the cursor 1310 to the desired menu item. When a desired menu item is not included in a plurality of menu items currently being displayed, a large tab and/or a small tab may be switched to another tab by touching the tab or operating the four-way key 74 to display a menu item list displaying the desired menu item. Subsequently, the cursor 1310 is moved to the desired menu item. For example, selecting the item 1323 of "M-Fn bar customization setting screen" of the screen shown in FIG. 13C from the state shown in FIG. 13B requires the following operation. First, the large tab is switched from the photographic setting tab to the device setting tab, the small tab "4" is selected, and the cursor 1310 is moved to the item 1323 of "M-Fn bar customization setting screen". When a movement of the cursor 1310 has been instructed, the system control unit 50 advances to S1211, but otherwise the system control unit 50 advances to S1212.

In S1211, the system control unit 50 moves the cursor 1310 in accordance with the instruction of S1210, and records the position of the cursor 1310 after the movement in the system memory 52 or the nonvolatile memory 56.

In S1212, the system control unit 50 determines whether or not the cursor 1310 is on the item 1323 of the M-Fn bar customization setting screen. In other words, the system control unit 50 determines whether or not the state of the menu screen is the state shown in FIG. 13C. When the cursor 1310 is on the item 1323 of the M-Fn bar customization setting screen, the system control unit 50 advances to S1213, but otherwise the system control unit 50 advances to S1215.

In S1213, the system control unit 50 determines whether or not the SET button 75 has been depressed. When the SET button 75 has been depressed (in a state where the cursor 1310 is on the item 1323 of the M-Fn bar customization setting screen), the system control unit 50 advances to S1214, but otherwise the system control unit 50 advances to S1215.

In S1214, the system control unit 50 performs an M-Fn bar customization setting process. Details of the M-Fn bar customization setting process will be provided later with reference to FIG. 14.

In S1215, the system control unit 50 determines whether or not the SET button 75 has been depressed in a state where the cursor 1310 is on an item 1321 of an operation button customization setting screen. When the SET button 75 has been depressed in a state where the cursor 1310 is on the item 1321 of the operation button customization setting screen, the system control unit 50 advances to S1216, but otherwise the system control unit 50 advances to S1217.

In S1216, the system control unit 50 sets a function of a customizable button included in the operating unit 70 (operation button customization setting process).

In S1217, the system control unit 50 determines whether or not the SET button 75 has been depressed in a state where the cursor 1310 is on an item 1322 of an operation dial customization setting screen. When the SET button 75 has been depressed in a state where the cursor 1310 is on the item 1322 of the operation dial customization setting screen, the system control unit 50 advances to S1215. Otherwise, the system control unit 50 advances to S1219.

In S1218, the system control unit 50 sets a function of a customizable rotating operation member included in the operating unit 70 (operation dial customization setting process).

In S1219, the system control unit 50 determines whether or not the SET button 75 has been depressed in a state where the cursor 1310 is on an item 1324 of customization initialization. When the SET button 75 has been depressed in a state where the cursor 1310 is on the item 1324 of customization initialization, the system control unit 50 advances to S1220, but otherwise the system control unit 50 advances to S1221.

In S1220, the system control unit 50 performs a customization initialization process of restoring settings of M-Fn customization, operation button customization, and operation dial customization to a state at the time of purchase of the camera (initial factory settings). Even when the check box 1302 shown in FIG. 13A is checked so as to hide the M-Fn bar guide screen, when the customization initialization process is performed, the check box 1302 is cleared and the M-Fn bar guide screen is to be displayed. In addition, due to the initialization process, a slide, a left tap, and a right tap of the M-Fn bar (the touch bar 82) are restored to a default state where no function is assigned thereto and the M-Fn bar erroneous operation prevention function is set to "enabled (temporarily usable)".

In S1221, the system control unit 50 determines whether or not the SET button 75 has been depressed in a state where the cursor 1310 is on an item (not shown since the item belongs to a tab other than those of the examples shown in FIGS. 13B and 13C) of "display only My Menu". When the SET button 75 has been depressed in a state where the cursor 1310 is on the item (not shown) of "display only My Menu", the system control unit 50 advances to S1222, but otherwise the system control unit 50 advances to S1223.

In S1222, the system control unit 50 limits items (menu items) to be displayed on the menu screen to the items registered in My Menu. When an item of the M-Fn bar customization setting screen is not registered in My Menu, limiting the menu items to items registered in My Menu results in hiding the items of the M-Fn bar customization setting screen. In addition, a determination that a transition cannot be made from the menu screen to the M-Fn bar customization setting screen is to be made in S1102 in FIG. 11.

In S1223, the system control unit 50 determines whether or not the SET button 75 has been depressed in a state where the cursor 1310 is on another item. When the SET button 75 has been depressed in a state where the cursor 1310 is on another item, the system control unit 50 advances to S1224, but otherwise the system control unit 50 advances to S1225.

In S1224, the system control unit 50 performs a process of the item on which the cursor 1310 was placed.

In S1225, the system control unit 50 determines whether or not an operation causing an exit from the menu screen has been performed. When an operation has been performed, the system control unit 50 advances to S1201, but otherwise the system control unit 50 advances to S1210.

M-Fn Bar Customization Setting Process

FIG. 14 is a flow chart showing details of the M-Fn bar customization setting process of S1214 in FIG. 123 described earlier. This process is realized as the system control unit 50 deploys a program recorded in the nonvolatile memory 56 on the system memory 52 and executes the program.

In S1401, the system control unit 50 displays the M-Fn bar customization setting screen on the display unit 28 or the EVF 29.

FIG. 15A represents a display example of an M-Fn bar customization setting screen. A function in the photography mode and a function in the playback mode can be individually assigned to the touch bar 82. An item 1501 indicates a function group in the photography mode and an item 1502 indicates a function group in the playback mode. A function group is a group of assigned functions. A detailed description of a function group will be given later.

A radio button 1503 is a radio button for setting the M-Fn bar erroneous operation prevention function described above to "enabled (temporarily usable)", and indicates whether or not the M-Fn bar erroneous operation prevention function is set to "enabled (temporarily usable)". When the radio button 1503 is checked, the M-Fn bar erroneous operation prevention function is set to "enabled (temporarily usable)". A radio button 1504 is a radio button for setting the M-Fn bar erroneous operation prevention function described above to "disabled (always usable)", and indicates whether or not the M-Fn bar erroneous operation prevention function is set to "disabled (always usable)". When the radio button 1504 is checked, the M-Fn bar erroneous operation prevention function is set to "disabled (always usable)".

The M-Fn bar erroneous operation prevention function is, literally, a function for preventing an erroneous operation of the M-Fn bar (the touch bar 82) and is a function for preventing, for example, unintentionally operating the touch bar 82 while attempting to operate the digital camera 100. When the M-Fn bar erroneous operation prevention function is set to "enabled (temporarily usable)", an assigned function can be executed by a slide or a tap of the touch bar 82 only during a certain period after a lock release operation (a specific operation) in the photography mode. An assigned function cannot be executed by a slide or a tap of the touch bar 82 during other periods. In the playback mode, an assigned function can always be executed by a slide or a tap of the touch bar 82 even when the M-Fn bar erroneous operation prevention function is "enabled (temporarily usable)". Alternatively, when the M-Fn bar erroneous operation prevention function is "enabled (temporarily usable)", an execution of an assigned function may be restricted in the playback mode in a similar manner to in the photography mode. In other words, in the playback mode, an assigned function can be made executable by a slide or a tap of the touch bar 82 only during a certain period (a period until Tn expires) after a lock release operation and the assigned function can be made unexecutable by a slide or a tap during other periods. When the M-Fn bar erroneous operation prevention function is set to "disabled (always usable)", the process described with respect to FIGS. 10A and 10B is realized and an assigned function can always be executed by a slide or a tap of the touch bar 82.

As described earlier, since a contact state of an entire surface touch is a special contact state that is unlikely to occur during normal operations, the possibility that an entire surface touch is performed by an unintentional operation is low. In addition, an assigned function of an entire surface touch is not a function for changing a photographic or playback setting but is a function for causing a transition of display screens. Therefore, even when an entire surface touch is unintentionally performed, a change in a setting value related to photography or playback which can be assigned to a left tap, a right tap, and a slide does not occur in a direct manner. In other words, a result of photography or an operation of playback is not affected. For these reasons, in the present embodiment, the enabled state of an entire surface touch is maintained regardless of whether other operations of which settings are customizable are enabled or disabled. In other words, even when the M-Fn bar erroneous operation prevention function is "enabled (temporarily usable)" and the touch bar 82 is in the locked state, an entire surface touch is always enabled. In addition, a shortcut can be taken to the M-Fn bar customization setting screen by an entire surface touch. Accordingly, by performing an entire surface touch, the user can confirm various states including an enabled/disabled state and can readily configure an enabled/disabled setting.

An INFO button icon 1505 is an operation guide of an entire surface touch setting (an entire surface press setting) of the touch bar 82. Depressing the INFO button included in the operating unit 70 causes a transition to an M-Fn bar entire surface touch setting screen. In addition, the INFO button icon 1505 is configured as a touch button, and a transition to the M-Fn bar entire surface touch setting screen is made even by touching a portion corresponding to the INFO button icon 1505 on the touch panel 70*a*. Details of the entire surface touch settings will be provided later.

A cursor 1506 is a selection cursor for selecting any of a plurality of options on the M-Fn bar customization setting screen.

In S1402, the system control unit 50 determines whether or not each operation member of the operating unit 70 has been operated and a movement of the cursor 1506 has been instructed. A cursor movement operation can be performed by directly touching an option or by operating the four-way key 74. When a movement of the cursor 1506 has been instructed, the system control unit 50 advances to S1403, but otherwise the system control unit 50 advances to S1404.

In S1403, the system control unit 50 moves the cursor 1506 so that another option is selected in accordance with the instruction issued in S1402.

In S1404, the system control unit 50 determines whether or not each operation member of the operating unit 70 has been operated and a function group (the item 1501) in the photography mode has been selected and determined on the M-Fn bar customization setting screen. For example, it is determined that a function group in the photography mode has been selected and determined when the SET button 75 is depressed in a state where the cursor 1506 is on the item 1501. It is also determined that a function group in the photography mode has been selected and determined when a touch operation with respect to the item 1501 is performed in a state where the cursor 1506 is on the item 1501. When a function group in the photography mode has been selected and determined, the system control unit 50 advances to S1405, but otherwise the system control unit 50 advances to S1406.

In S1405, the system control unit 50 performs an M-Fn bar function assignment setting process corresponding to the photography mode. In the M-Fn bar function assignment setting process corresponding to the photography mode, the system control unit 50 sets a function group or assigned functions (functions to be respectively assigned to a slide, a left tap, and a right tap) of the touch bar 82 in the photography mode in accordance with a user operation.

In S1406, the system control unit 50 determines whether or not each operation member of the operating unit 70 has been operated and a function group (the item 1502) in the playback anode has been selected and determined on the M-Fn bar customization setting screen. When a function group in the playback mode has been selected and determined, the system control unit 50 advances to S1407, but otherwise the system control unit 50 advances to S1408.

In S1407, the system control unit 50 performs an M-Fn bar function assignment setting process corresponding to the playback mode. In the M-Fn bar function assignment setting process corresponding to the playback mode, the system control unit 50 sets a function group or assigned functions (functions to be respectively assigned to a slide, a left tap, and a right tap) of the touch bar 82 in the playback mode in accordance with a user operation.

In S1408, the system control unit 50 determines whether or not each operation member of the operating unit 70 has been operated and "enabled (temporarily usable)" (the radio button 1503) of the M-Fn bar erroneous operation prevention function has been selected and determined on the M-Fn bar customization setting screen. When "enabled (temporarily usable)" of the M-Fn bar erroneous operation prevention function has been selected and determined, the system control unit 50 advances to S1409, but otherwise the system control unit 50 advances to S1410.

In S1409, the system control unit 50 sets the M-Fn bar erroneous operation prevention function to "enabled (temporarily usable)" and records the setting in the system memory 52 or the nonvolatile memory 56.

In S1410, the system control unit 50 determines whether or not each operation member of the operating unit 70 has been operated and "disabled (always usable)" (the radio button 1504) of the M-Fn bar erroneous operation prevention function has been selected and determined on the M-Fn bar customization setting screen. When "disabled (always usable)" of the M-Fn bar erroneous operation prevention function has been selected and determined, the system control unit 50 advances to S1411, but otherwise the system control unit 50 advances to S1412.

In S1411, the system control unit 50 sets the M-Fn bar erroneous operation prevention function to "disabled (always usable)" and records the setting in the system memory 52 or the nonvolatile memory 56.

In S1412, the system control unit 50 determines whether or not an INFO button included in the operating unit 70 has been depressed. When the INFO button has been depressed or the INFO button icon 1505 has been touched, the system control unit 50 advances to S1413, but otherwise the system control unit 50 advances to S1415.

Figure 15B:
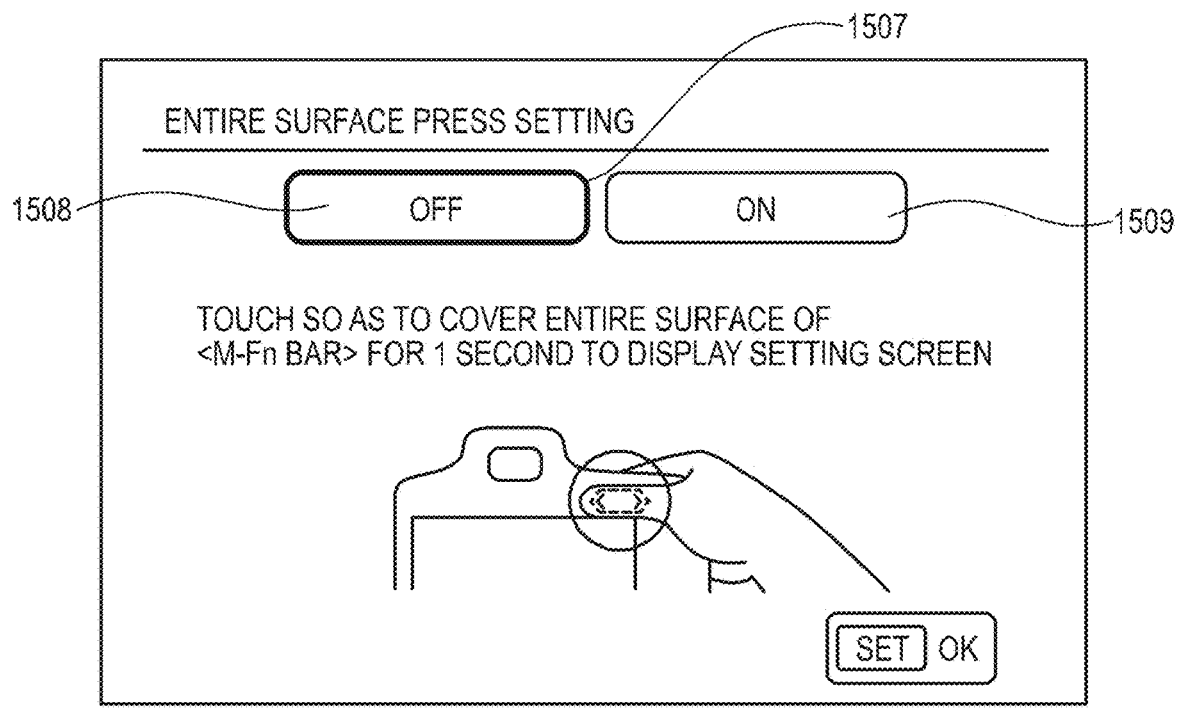
FIG. 15B represents a display example of an entire surface press setting screen.

In S1413, the system control unit 50 displays an M-Fn bar entire surface touch setting screen on the display unit 28 or the EVF 29. FIG. 15B shows an example of the M-Fn bar entire surface touch setting screen. As described earlier, an entire surface touch of the touch bar 82 is an operation of coming into contact with the touch bar 82 so as to cover an entire surface of the touch bar 82. The entire surface touch setting that is performed using the M-Fn bar entire surface touch setting screen is a setting of whether or not a function for displaying the M-Fn bar customization setting screen is to be enabled when an entire surface touch is continued for approximately 1 second.

In S1414, the system control unit 50 accepts an operation for an entire surface touch setting that is performed using each operation member of the operating unit 70. For example, an operation for selecting and determining OFF 1508 or ON 1509 using a cursor 1507 shown in FIG. 15B or the like is accepted. When OFF 1508 has been selected and determined, the system control unit 50 disables the entire surface touch setting (a function for displaying the M-Fn bar customization setting screen when an entire surface touch is continued for approximately 1 second) and records the setting in the system memory 52 or the nonvolatile memory 56. On the other hand, when ON 1509 has been selected and determined, the system control unit 50 enables the entire surface touch setting and records the setting in the system memory 52 or the nonvolatile memory 56. When the entire surface touch setting is enabled, as described earlier, an entire surface touch is started within a period of the entire surface touch determination timer Ta from the start of the touch and, subsequently, when the entire surface touch continuation timer Tc expires, the system control unit 50 performs the M-Fn bar customization setting process as a function assigned in advance. When the entire surface touch setting is disabled, time measurement of the entire surface touch determination timer Ta is not started even when a touch is started and the entire surface touch start determination process is also not performed. In this case, even before a period of Ta from a touch-down expires, when a slide is performed, a function assigned to the slide is executed.

In S1415, the system control unit 50 determines whether or not the menu button 81 has been depressed. When the menu button 81 has been depressed, the system control unit 50 advances to S1416, but otherwise the system control unit 50 advances to S1402.

In S1416, the system control unit 50 displays a menu screen one level above the M-Fn bar customization setting screen on the display unit 28 or the EVF 29, ends the M-Fn bar customization process, and advances to S1215 in FIG. 12B.

As already described, in the touch bar 82, a function to be executed when operations of a slide, a left tap, and a right tap are performed can be individually customized by the user in accordance with usage. However, the number of functions that can be assigned to each operation of a slide, a left tap, and a right tap is considerably large. Therefore, adopting all assignable functions as options results in an enormous number of selectable combinations of functions to be assigned to the respective operations and, consequently, makes it difficult for the user to quickly and readily customize functions in accordance with usage. In consideration thereof, in the present embodiment, a plurality of assignable functions are classified into function groups per usage, and the user is to first select a function group in accordance with usage. Subsequently, by limiting functions selectable in the selected function group only to functions suitable for the function group, the options of functions to be assigned are reduced. Accordingly, function assignment can be carried out quickly and readily. In addition, since all functions executed in accordance with each of a slide, a left tap, and a right tap are functions included in a selected group, operability of the touch bar 82 is improved.

An example of function assignment corresponding to the photography mode is shown in FIGS. 16A to 16C. In FIGS. 16A to 16C, circled function groups represent default (initial factory setting) function groups, and circled functions represent default functions when a corresponding function group is selected. In the example shown in FIGS. 16A to 16C, function groups include "unassigned", "ISO sensitivity", "white balance", "focus/information display", "moving image photography", "flexible AE", "AF", and "user-customized". A function group in the photography mode is selected from these function groups, and functions included in the selected function group are selected as functions in the photography mode. The default function group is "unassigned". When the function group "unassigned" is selected, respective operations of a slide, a left tap, and a right tap are disabled (an entire surface touch is enabled).

When the function group of "ISO sensitivity", "white balance", "focus/information display", "moving image photography", "flexible AE", or "AF" is selected, only functions suitable for the selected function group can be selected and assigned. For example, when the function group "ISO sensitivity" is selected, by default, a function of "change ISO sensitivity" is assigned to a slide, a function of "shift one ISO sensitivity setting to the left" is assigned to a left tap, and a function of "shift one ISO sensitivity setting to the right" is assigned to a right tap. When the user does not like the default assignments, the user can assign a different function included in the function group "ISO sensitivity". In this case, the function of "shift one ISO sensitivity setting to the left" is the same as a function when performing a slide operation of one stage to the left, and the function of "shift one ISO sensitivity setting to the right" is the same as a function when performing a slide operation of one stage to the right. As shown in FIGS. 16A to 16C, in the present embodiment, in each function group, a plurality of functions assignable to a slide differ from a plurality of functions assignable to a left tap or a right tap. Accordingly, a function appropriate for each operation can be readily assigned. Moreover, "flexible AE" is a function group in which each of exposure-related setting values of a shutter speed, an aperture (F value), and an ISO sensitivity can be arbitrarily set by the user or automatically set. Setting values of a shutter speed, an aperture (F value), and an ISO sensitivity displayed on the display unit 28 or the EVF 29 can be considered options (selection items), and any of the options (selection items) can be selected. A selection operation can also be performed by an operation other than operations with respect to the touch bar 82 and, depending on a function assignment to a slide or a tap, a selection operation can be performed by a slide or a tap. In addition, a function assignment can be made to a slide or a tap such that any of selected items (a shutter speed, an aperture (F value), and an ISO sensitivity) is set to an arbitrarily setting value or automatically set (reset) by a slide or a tap.

When the function group "user-customized" is selected, all functions assignable in at least any of all function groups can be assigned. A state where the function group "user-customized" is selected can also be described as a state where a function group is not selected.

The assigned functions of each function group are stored in the nonvolatile memory 56 for each function group. For example, the assigned functions of a slide, a left tap, and a right tap set in the function group "ISO sensitivity" remain stored even after changing the function group to other than "ISO sensitivity". Subsequently, when the function group is set to "ISO sensitivity" once again, the previously stored assigned functions of a slide, a left tap, and a right tap of "ISO sensitivity" are assigned to a slide, a left tap, and a right tap.

An example of function assignment corresponding to the playback mode is shown in FIG. 17. In FIG. 17, circled function groups represent default function groups, and circled functions represent default functions when a corresponding function group is selected. In the example shown in FIG. 17, function groups include "unassigned", "function shortcut", and "image feeding". A function group in the playback mode is selected from these function groups, and functions included in the selected function group are selected as functions in the playback mode. The default function group is "unassigned". When the function group "unassigned" is selected, respective operations of a slide, a left tap, and a right tap are disabled. When the function group of "function shortcut" or "image feeding" is selected, only functions suitable for the selected function group can be selected and assigned. The function group "function shortcut" is a function group related to attribute settings such as rating and protect.

In the function assignment corresponding to the playback mode, "user-customized" is absent from the function groups unlike in the photography mode. This is because, while using a combination of functions belonging to a same function group as a combination of assigned functions in the playback mode realizes good usability, using a combination of functions belonging to different function groups may cause usability to decline. For example, when a function of the function group "image feeding" is used in combination with another function of the function group "image feeding", operability of image feeding improves and usability increases. However, when a function of the function group "image feeding" is used in combination with a function of the function group "function shortcut", operability of image feeding may decline and usability may deteriorate.

While the present invention has been described in detail based on a preferred embodiment thereof, the present invention is not limited to the specific embodiment and various modes without departing from the scope of the invention are also included in the present invention. In addition, the embodiments described above simply represent an embodiment of the present invention and the embodiments can also be combined with each other in an appropriate manner.

In addition, while the various controls described above as controls to be performed by the system control unit 50 may be carried out by one piece of hardware, or a plurality of pieces of hardware (for example, a plurality of processors or circuits) may control an entire apparatus by sharing processes. Furthermore, while an example in which the present invention is applied to a digital camera (an imaging apparatus) has been described in the embodiment presented above, the present invention is not limited to this example and can be applied to any electronic device capable of accepting user operations. For example, the present invention can be applied to a personal computer, a PDA, a mobile phone terminal, a mobile image viewer, a printer apparatus, a digital photo frame, a music player, a game device, an electronic book reader, a video player, and the like. The present invention can also be applied to a display apparatus (including a projection apparatus), a tablet terminal, a smartphone, an AI speaker, a domestic electrical appliance, a vehicle-mounted apparatus, medical equipment, and the like.

In addition, besides an imaging apparatus main body, the present invention can also be applied to a control apparatus which remotely controls an imaging apparatus (including a network camera) by communicating with the imaging apparatus via wired or wireless communication. Examples of an apparatus which remotely controls an imaging apparatus include a smartphone, a tablet PC, and a desktop PC. An imaging apparatus can be remotely controlled by notifying the imaging apparatus of commands for performing various operations and settings from a control apparatus based on operations and processes performed in the control apparatus. Furthermore, the control apparatus may be configured to receive a live view image photographed by the imaging apparatus via wired or wireless communication and to display the live view image.

Examples of Application to Other Electronic Devices

Figure 18A:
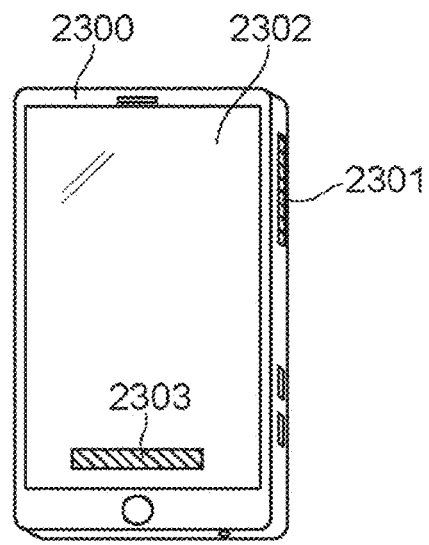
FIGS. 18A to 18D are external views of other electronic devices mounted with a touch bar.
Figure 18B:
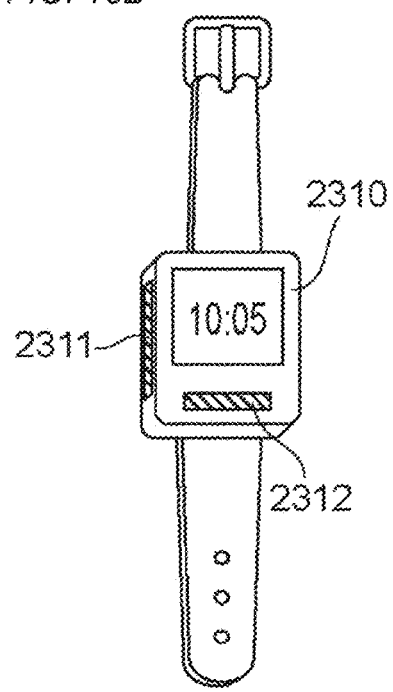
Figure 18C:
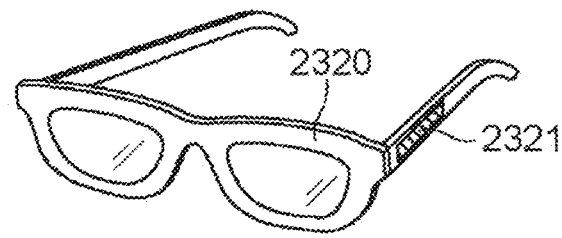
Figure 18D:
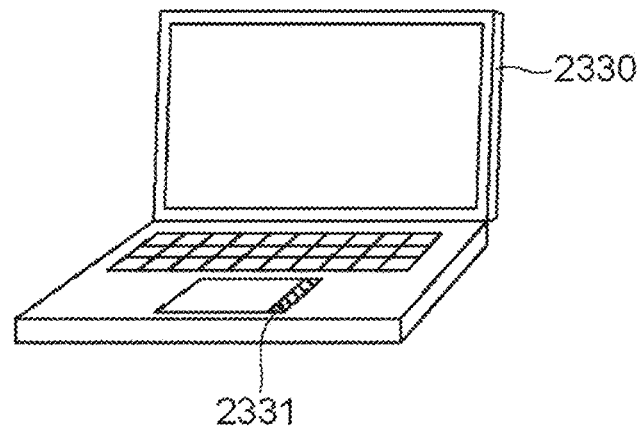

For example, the present invention may be applied in relation to other touch operation members in place of the touch bar 82 described in the embodiment presented above. For example, the present invention may be applied in relation to a touch sensor provided at another position of the digital camera 100 (an annular touch sensor around a lens barrel, a linear touch sensor provided along a side of the display unit 28, or the like). In addition, the present invention may be applied in relation to a touch bar 2301 that is a linear touch sensor provided on a side surface of a smartphone 2300 shown in FIG. 18A. Furthermore, even when a touch sensor itself is not linear, the present invention may be applied in relation to a display item 2303 which is a touch operation item linearly displayed in a part of a touch panel 2302 and of which a one-dimensional position can be designated. In addition, the present invention may be applied in relation to a touch bar 2311 provided on a side surface or a touch bar 2312 provided on a front surface of a smartwatch 2310 (a small wristwatch-type electronic device) shown in FIG. 18B. Furthermore, the present invention may be applied in relation to a touch bar 2321 provided in an ear hook of an eyeglass-type electronic device 2320 (a wearable electronic device, a smartglass) such as that shown in FIG. 18C. In addition, the present invention may be applied in relation to a touch bar 2331 provided in a region along one side of a touch pad (the region may or may not constitute a part of the touch pad) provided in a notebook-type personal computer (a notebook PC) 2330 shown in FIG. 18D.

Other Embodiments

Embodiment(s) of the present invention can also be realized by a computer of a system or apparatus that reads out and executes computer executable instructions one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-215914, filed on Nov. 8, 2017, and Japanese Patent Application No. 2018-125380, filed on Jun. 29, 2018, which are hereby incorporated by reference herein in its entirety.

What is claimed is:
1. An imaging apparatus, comprising:
a finder;
a grip portion on a side of a first direction relative to the finder;
a touch operation member provided on a rear surface of the imaging apparatus on a side of the first direction relative to the finder, on a side of a second direction relative to the grip portion, the second direction being opposite to the first direction, and on a side of a third direction relative to a center of the imaging apparatus, the third direction being perpendicular to the first direction and being oriented from the center toward the finder; and
a memory and at least one processor and/or at least one circuit to perform the operations of the following units:
a control unit configured to control the imaging apparatus so as to execute a first function in accordance with a slide operation in the first direction with respect to the touch operation member and to execute a second function in accordance with a slide operation in the second direction with respect to the touch operation member, wherein
the touch operation member is provided on a side of the third direction relative to a display provided on the rear surface of the imaging apparatus.
2. The imaging apparatus according to claim 1, wherein the first direction is rightward in a case of viewing the imaging apparatus from the rear surface side, and the second direction is leftward in a case of viewing the imaging apparatus from the rear surface side.
3. The imaging apparatus according to claim 1, wherein the touch operation member is provided at a location where the slide operation in the first direction and the slide operation in the second direction can be performed by the thumb of a hand holding the grip portion while looking into the finder.
4. The imaging apparatus according to claim 1, wherein the touch operation member is provided on the rear surface of the imaging apparatus on a side of the second direction relative to a thumb rest portion on which the thumb of the hand holding the grip portion is to be rested.
5. The imaging apparatus according to claim 1, wherein the control unit controls the imaging apparatus so as to execute a third function in accordance with a tap operation which is an operation involving touching the touch operation member and releasing the touch without moving a touch position.
6. The imaging apparatus according to claim 5, wherein the control unit controls the imaging apparatus so as to execute the third function in accordance with the tap operation with respect to a first position of the touch operation member and to execute a fourth function in accordance with the tap operation with respect to a second position of the touch operation member, the second position being on a side of the second direction relative to the first position.
7. The imaging apparatus according to claim 1, further comprising
a dial member operable by a finger of a same hand of which the finger is capable of touching the touch operation member, wherein
the first direction is the same as an operating direction in a case of rotating the dial member.
8. The imaging apparatus according to claim 7, wherein the first direction is perpendicular to a rotational axis of the dial member.
9. The imaging apparatus according to claim 1, wherein the at least one processor and/or the at least one circuit further performs the operations of the following units:
display controlling unit configured to control a display in which a position of a display surface is a position that differs from an operation surface of the touch operation member, such that:
in a case of changing a photographic setting in accordance with the slide operation in the first direction with respect to the touch operation member, a display item indicating a setting value of the photographic setting is displayed by scrolling in a particular direction which is parallel to the first direction; and
in a case of changing the photographic setting in accordance with the slide operation in the second direction with respect to the touch operation member, a display item indicating a setting value of the photographic setting is displayed by scrolling in a direction which is parallel to the second direction and is opposite to the particular direction.

10. The imaging apparatus according to claim 1, wherein a display is not provided at a location where the touch operation member is provided.

11. The imaging apparatus according to claim 1, further comprising
a display in which a position of a display surface is a position that differs from an operation surface of the touch operation member.

12. The imaging apparatus according to claim 1, wherein a width of the touch operation member in the first direction is longer than a width of the touch operation member in a direction perpendicular to the first direction.

13. The imaging apparatus according to claim 1, wherein the touch operation member is provided on a most end in the third direction among a plurality of operation members provided on the rear surface of the imaging apparatus.

14. The imaging apparatus according to claim 1, wherein the touch operation member is provided on a most end in the second direction among a plurality of operation members provided on the rear surface of the imaging apparatus, and provided on a side of the first direction relative to the finder, excluding a touch panel provided on the rear surface of the imaging apparatus.

15. A control method for an imaging apparatus including a finder, a grip portion on a side of a first direction relative to the finder, and a touch operation member provided on a rear surface of the imaging apparatus on a side of the first direction relative to the finder, on a side of a second direction relative to the grip portion, the second direction being opposite to the first direction, and on a side of a third direction relative to a center of the imaging apparatus, the third direction being perpendicular to the first direction and being oriented from the center toward the finder, the control method comprising:
controlling the imaging apparatus so as to execute a first function in accordance with a slide operation in the first direction with respect to the touch operation member; and
controlling the imaging apparatus so as to execute a second function in accordance with a slide operation in the second direction with respect to the touch operation member, wherein
the touch operation member is provided on a side of the third direction relative to a display provided on the rear surface of the imaging apparatus.

16. A non-transitory computer readable medium that stores a program, wherein
the program causes a computer to execute a control method for an imaging apparatus including a finder, a grip portion on a side of a first direction relative to the finder, and a touch operation member provided on a rear surface of the imaging apparatus on a side of the first direction relative to the finder, on a side of a second direction relative to the grip portion, the second direction being opposite to the first direction, and on a side of a third direction relative to a center of the imaging apparatus, the third direction being perpendicular to the first direction and being oriented from the center toward the finder,
the control method includes:
controlling the imaging apparatus so as to execute a first function in accordance with a slide operation in the first direction with respect to the touch operation member; and
controlling the imaging apparatus so as to execute a second function in accordance with a slide operation in the second direction with respect to the touch operation member, and
the touch operation member is provided on a side of the third direction relative to a display provided on the rear surface of the imaging apparatus.

17. An imaging apparatus, comprising:
a finder;
a grip portion on a side of a first direction relative to the finder;
a touch operation member provided on a rear surface of the imaging apparatus on a side of the first direction relative to the finder, on a side of a second direction relative to the grip portion, the second direction being opposite to the first direction, and on a side of a third direction relative to a center of the imaging apparatus, the third direction being perpendicular to the first direction and being oriented from the center toward the finder; and
a memory and at least one processor and/or at least one circuit to perform the operations of the following units:
a control unit configured to control the imaging apparatus so as to execute a first function in accordance with a slide operation in the first direction with respect to the touch operation member and to execute a second function in accordance with a slide operation in the second direction with respect to the touch operation member, wherein
the touch operation member is provided on a most end in the third direction among a plurality of operation members provided on the rear surface of the imaging apparatus.

18. A control method for an imaging apparatus including a finder, a grip portion on a side of a first direction relative to the finder, and a touch operation member provided on a rear surface of the imaging apparatus on a side of the first direction relative to the finder, on a side of a second direction relative to the grip portion, the second direction being opposite to the first direction, and on a side of a third direction relative to a center of the imaging apparatus, the third direction being perpendicular to the first direction and being oriented from the center toward the finder, the control method comprising:
controlling the imaging apparatus so as to execute a first function in accordance with a slide operation in the first direction with respect to the touch operation member; and
controlling the imaging apparatus so as to execute a second function in accordance with a slide operation in the second direction with respect to the touch operation member, wherein
the touch operation member is provided on a most end in the third direction among a plurality of operation members provided on the rear surface of the imaging apparatus.

19. A non-transitory computer readable medium that stores a program, wherein
the program causes a computer to execute a control method for an imaging apparatus including a finder, a grip portion on a side of a first direction relative to the finder, and a touch operation member provided on a rear surface of the imaging apparatus on a side of the first direction relative to the finder, on a side of a second direction relative to the grip portion, the second direction being opposite to the first direction, and on a side of a third direction relative to a center of the imaging apparatus, the third direction being perpendicular to the first direction and being oriented from the center toward the finder, the control method includes:
- controlling the imaging apparatus so as to execute a first function in accordance with a slide operation in the first direction with respect to the touch operation member; and
- controlling the imaging apparatus so as to execute a second function in accordance with a slide operation in the second direction with respect to the touch operation member, and the touch operation member is provided on a most end in the third direction among a plurality of operation members provided on the rear surface of the imaging apparatus.

* * * * *